US011831436B2

(12) United States Patent
Jeon et al.

(10) Patent No.: US 11,831,436 B2
(45) Date of Patent: Nov. 28, 2023

(54) HARQ FEEDBACK FOR GRANT-FREE TRANSMISSION

(71) Applicant: Comcast Cable Communications, LLC, Philadelphia, PA (US)

(72) Inventors: Hyoungsuk Jeon, Oakton, VA (US); Esmael Hejazi Dinan, Herndon, VA (US); Alireza Babaei, Fairfax, VA (US); Hua Zhou, Herndon, VA (US); Kyungmin Park, Arlington, VA (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 845 days.

(21) Appl. No.: 16/146,415

(22) Filed: Sep. 28, 2018

(65) Prior Publication Data

US 2019/0097762 A1   Mar. 28, 2019

Related U.S. Application Data

(60) Provisional application No. 62/564,692, filed on Sep. 28, 2017.

(51) Int. Cl.
*H04L 1/16* (2023.01)
*H04W 28/04* (2009.01)
(Continued)

(52) U.S. Cl.
CPC .......... *H04L 1/1671* (2013.01); *H04L 1/1812* (2013.01); *H04L 1/1854* (2013.01);
(Continued)

(58) Field of Classification Search
CPC ... H04L 1/1671; H04L 1/1812; H04L 1/1854; H04L 1/1864; H04W 28/04; H04W 72/1268; H04W 72/14
See application file for complete search history.

(56) References Cited

U.S. PATENT DOCUMENTS 8,553,713 B2 * 10/2013 Li ................. H04L 1/0027
370/438
9,106,419 B2 *  8/2015 Chen ................. H04W 52/42
(Continued)

FOREIGN PATENT DOCUMENTS

WO       2017204595 A1    11/2017

OTHER PUBLICATIONS

Ericsson, "Summary of e-mail discussion on DCI content", Sep. 18-21, 2017, R1-1716581 (Year: 2017).*
(Continued)

*Primary Examiner* — Bailor C Hsu
(74) *Attorney, Agent, or Firm* — Banner & Witcoff, Ltd.

(57) ABSTRACT

Systems, apparatuses, and methods are described for wireless communications. A base station may transmit wireless device-specific downlink control information comprising HARQ feedback to a wireless device. Coordinating a plurality of HARQ feedbacks may result in complicated processing at the base station and/or a delay to schedule a HARQ feedback for the wireless device. The transmission of the downlink control information may not require HARQ feedback from a wireless device. By reducing the transmission of HARQ feedback, the channel capacity utilized for error correction transmissions can be reduced, thereby enhancing resource utilization.

26 Claims, 28 Drawing Sheets

(51) Int. Cl.

| | |
|---|---|
| *H04W 72/14* | (2009.01) |
| *H04W 72/12* | (2023.01) |
| *H04L 1/18* | (2023.01) |
| *H04L 1/1607* | (2023.01) |
| *H04L 1/1812* | (2023.01) |
| *H04W 72/1268* | (2023.01) |
| *H04L 1/1829* | (2023.01) |
| *H04W 72/23* | (2023.01) |

(52) U.S. Cl.
CPC ........... *H04L 1/1864* (2013.01); *H04W 28/04* (2013.01); *H04W 72/1268* (2013.01); *H04W 72/23* (2023.01)

(56) References Cited

U.S. PATENT DOCUMENTS

| | | | |
|---|---|---|---|
| 9,839,018 | B2* | 12/2017 | Berggren ............... H04L 5/0053 |
| 10,568,071 | B2* | 2/2020 | Park ....................... H04W 72/042 |
| 2009/0257408 | A1 | 10/2009 | Zhang et al. |
| 2011/0003555 | A1 | 1/2011 | Guo |
| 2011/0032895 | A1 | 2/2011 | Englund et al. |
| 2013/0250924 | A1* | 9/2013 | Chen ....................... H04L 1/1819 370/336 |
| 2013/0343273 | A1 | 12/2013 | Barbieri et al. |
| 2014/0098761 | A1 | 4/2014 | Lee et al. |
| 2014/0362832 | A1 | 12/2014 | Rudolf et al. |
| 2014/0369242 | A1* | 12/2014 | Ng ........................ H04L 5/1469 370/280 |
| 2015/0016352 | A1 | 1/2015 | Bressanelli et al. |
| 2015/0055576 | A1* | 2/2015 | Zhang .................... H04L 5/0094 370/329 |
| 2015/0208386 | A1 | 7/2015 | Yang et al. |
| 2015/0327107 | A1 | 11/2015 | Kim et al. |
| 2015/0334769 | A1 | 11/2015 | Kim et al. |
| 2016/0128028 | A1* | 5/2016 | Malli ....................... H04L 1/1861 370/336 |
| 2016/0150440 | A1 | 5/2016 | Lee et al. |
| 2016/0278073 | A1 | 9/2016 | Dinan |
| 2017/0359850 | A1* | 12/2017 | Loehr .................. H04W 72/042 |
| 2017/0367054 | A1* | 12/2017 | Kim ....................... H04L 1/0007 |
| 2018/0042043 | A1* | 2/2018 | Babaei ............... H04W 72/1289 |
| 2018/0070403 | A1 | 3/2018 | Uemura et al. |
| 2018/0124648 | A1 | 5/2018 | Park et al. |
| 2018/0139734 | A1 | 5/2018 | Babaei et al. |
| 2018/0167931 | A1* | 6/2018 | Papasakellariou .... H04L 1/1887 |
| 2018/0167932 | A1* | 6/2018 | Papasakellariou .... H04L 1/1861 |
| 2018/0176937 | A1 | 6/2018 | Chen et al. |
| 2018/0183551 | A1 | 6/2018 | Chou et al. |
| 2018/0241499 | A1* | 8/2018 | Einhaus ................ H04L 5/0046 |
| 2018/0278368 | A1* | 9/2018 | Kim ....................... H04L 1/0043 |
| 2018/0288746 | A1* | 10/2018 | Zhang ................... H04L 1/0031 |
| 2018/0317213 | A1* | 11/2018 | Islam ................ H04W 72/0406 |
| 2019/0288789 | A1* | 9/2019 | Li ........................ H04W 28/24 |
| 2019/0306876 | A1* | 10/2019 | Golitschek Edler von Elbwart ... H04L 5/0053 |
| 2020/0359387 | A1* | 11/2020 | Su ........................ H04W 72/23 |
| 2021/0219329 | A1* | 7/2021 | Zhou ..................... H04W 72/23 |

OTHER PUBLICATIONS

U.S. Appl. No. 16/100,974, Activation of Grant-Free Transmission, filed Aug. 10, 2018.
U.S. Appl. No. 16/125,310, Configured Grant and Dynamic Grant Transmission, filed Sep. 7, 2018.
U.S. Appl. No. 16/171,966, Activation and Deactivation of Configured Grant, filed Oct. 26, 2018.
R2-1706645 3GPP TSG-RAN WG2 NR Ad Hoc, Qingdao, China, Jun. 27-29, 2017, Source: ZTE, Title: Consideration on the multiple SPS and grant free.
R2-1706687 3GPP TSG-RAN WG2 NR Ad Hoc, Qingdao, China, Jun. 27-29, 2017, Source: InterDigital, Title: SPS and Grant-free operation for NR.
R2-1707098 3GPP TSG-RAN WG2 NR Ad Hoc, Qingdao, China, Jun. 27-29, 2017, Source: Samsung, Title: Uplink SPS and Grant-free Transmission Aspects.
R2-1707174 3GPP TSG-RAN WG2 NR Ad Hoc, Qingdao, China, Jun. 27-29, 2017, Source: Ericsson, Title: Grant Free and Semi-Persistent Scheduling in NR.
R2-1707247 3GPP TSG-RAN WG2 NR Ad Hoc, Qingdao, China, Jun. 27-29, 2017, Source: Huawei, HiSilicon, Title: Modelling of Grant free and SPS.
R2-1707268 3GPP TSG-RAN WG2 NR Ad Hoc, Qingdao, China, Jun. 27-29, 2017, Source: MediaTek Inc., Title: Comparison of SPS and grant-free schemes.
R2-1707500 3GPP TSG-RAN WG2 NR Ad Hoc, Quingdao, China, Jun. 27-29, 2017, Source: Vice-Chairwoman (InterDigital), Title: Report from NR User Plane Break-Out Session.
R2-170873Z 3GPP TSG RAN WG2 #99, Berlin, Germany, Aug. 21-25, 2017, Source: InterDigital, Title: SPS and grant free operation.
R2-1708956 3GPP TSG RAN WG2 #99, Berlin, Germany, Aug. 21-25, Z017, Source: Huawei, HiSilicon, Title: Considerations on SPS and TTI-bundling in EN-DC.
R2-1709125 3GPP TSG RAN WG2 #99, Berlin, Germany, Aug. 21-25, Z017, Source: Qualcomm, Title: On reliable transmission of URLLC data.
R2-1709264 3GPP TSG RAN WG2 #99, Berlin, Germany, Aug. 21-25, 2017, Source: Huawei, HiSilicon, Title: Discussion on type 1 grant-free for connected mode UE.
R2-1710134 3GPP TSG RAN WG2 Meeting #99bis, Prague, Czech Republic, Oct. 9-13, 2017, Source: OPPO, Title: SPS operations for BWP switching.
R2-1710662 3GPP TSG RAN WG2 Meeting #99bis, Prague, Czech Republic, Oct. 9-13, 2017, Source: InterDigital, Inc., Title: SPS and grant free operation.
R2-1710958 3GPP TSG RAN WG2 Meeting #99bis, Prague, Czech Republic, Oct. 9-13, 2017, Source: vivo, Title: Duplication deactivation due to Scell or BWP deactivation.
R2-1711441 3GPP TSG RAN WG2 Meeting #99bis, Prague, Czech Republic, Oct. 9-13, 2017, Source: Huawei, HiSilicon, Title: MAC impact of bandwidth part activation/deactivation.
R2-1711613 3GPP TSG RAN WG2 Meeting #99bis, Prague, Czech Republic, Oct. 9-13, 2017, Source: LG Electronics, Title: PHR for wider bandwidth operation.
R2-1711643 3GPP TSG RAN WG2 Meeting #99bis, Prague, Czech Republic, Oct. 9-13, 2017, Source: Intel Corporation, Title: Activation of SCell containing BWPs.
R2-1711856 3GPP TSG-RAN WG2 #99bis, Prague, Czech Republic, Oct. 9-13, 2017, Source: RAN2, Title: LS to RAN1 on SPS and Grant-free.
R2-1711904 3GPP TSG RAN WG2 Meeting #99bis, Prague, Czech Republic, Oct. 9-13, 2017, Source: Qualcomm Incorporated, Title: UE Power Saving during Active State.
R2-1711993 3GPP TSG-RAN WG2 #99bis, Prague, Czech Republic, Oct. 9-13, 2017, Source: RAN2, Title: LS to RAN1 on SPS and Grant-free.
R1-1707166 3GPP TSG-RAN WG1 #89, Hangzhou, China, May 15-19, 2017, Source: ZTE, Title: HARQ for URLLC UL Grant-free transmission.
R1-1715535 3GPP TSG RAN WG1 Meeting NR Ad Hoc, Nagoya, Japan, Sep. 18-21, 2017, Source: Lenovo, Motorola Mobility, Title: HARQ-ACK codebook size determination for CA with different numerologies.
R1-1715548 3GPP TSG RAN WG1 Meeting NR Ad Hoc, Nagoya, Japan, Sep. 18-21, 2017, Source: Nokia, Nokia Shanghai Bell, Title: Remaining issues on UL transmission without grant.
R1-1715562 3GPP TSG RAN WG1 Meeting NR Ad Hoc, Nagoya, Japan, Sep. 18-21, 2017, Source: ZTE, Sanechips, Title: Further discussion on UL transmission without grant.
R1-1715645 3GPP TSG RAN WG1 Meeting NR Ad Hoc, Nagoya, Japan, Sep. 18-21, 2017, Source: vivo, Title: Support of UL data transmission without grant.
R1-1715648 3GPP TSG RAN WG1 Meeting NR Ad Hoc, Nagoya, Japan, Sep. 18-21, 2017, Source: vivo, Title: Remaining details for bandwidth part operation.

(56) References Cited

OTHER PUBLICATIONS

R1-1715662 3GPP TSG RAN WG1 Meeting NR Ad Hoc, Nagoya, Japan, Sep. 18-21, 2017, Source: NEC, Title: Remaining issues on UL transmission without grant.
R1-1715692 3GPP TSG RAN WG1 Meeting NR Ad Hoc, Nagoya, Japan, Sep. 18-21, 2017, Source: Guangdong OPPO Mobile Telecom, Title: Remaining issues on bandwidth part configuration and activation.
R1-1715755 3GPP TSG RAN WG1 Meeting NR Ad Hoc, Nagoya, Japan, Sep. 18-21, 2017, Source: Nokia, Nokia Shanghai Bell, Title: On remaining aspects of NR CA/DC and BWPs.
R1-1715769 3GPP TSG RAN WG1 Meeting NR Ad Hoc, Nagoya, Japan, Sep. 18-21, 2017, Source: ETRI, Title: DL HARQ-ACK for GF PUSCH transmission.
R1-1715770 3GPP TSG RAN WG1 Meeting NR Ad Hoc, Nagoya, Japan, Sep. 18-21, 2017, Source: ETRI, Title: Remaining details of bandwidth part for initial access.
R1-1715774 3GPP TSG RAN WG1 Meeting NR Ad Hoc, Nagoya, Japan, Sep. 18-21, 2017, Source: Panasonic, Title: Combining DRX with BWP adaptation.
R1-1715830 3GPP TSG RAN WG1 Meeting NR Ad Hoc, Nagoya, Japan, Sep. 18-21, 2017, Source: CATT, Title: Remaining aspects of CA and wider bandwidth operation.
R1-1715888 3GPP TSG RAN WG1 Meeting NR Ad Hoc, Nagoya, Japan, Sep. 18-21, 2017, Source: LG Electronics, Title: Discussion on UL data transmission procedure.
R1-1715892 3GPP TSG RAN WG1 Meeting NR Ad Hoc, Nagoya, Japan, Sep. 18-21, 2017, Source: LG Electronics, Title: Discussion on carrier aggregation and bandwidth parts.
R1-1716019 3GPP TSG RAN WG1 Meeting NR Ad Hoc, Nagoya, Japan, Sep. 18-21, 2017, Source: Samsung, Title: On Bandwidth Part Operation.
R1-1716107 3GPP TSG RAN WG1 Meeting NR Ad Hoc, Nagoya, Japan, Sep. 18-21, 2017, Source: NTT DOCOMO, Inc., Title: UL data transmission without UL grant.
R1-1716109 3GPP TSG RAN WG1 Meeting NR Ad Hoc, Nagoya, Japan, Sep. 18-21, 2017, Source: NTT DOCOMO, Inc., Title: Remaing issues on bandwidth parts for NR.
R1-1716192 3GPP TSG RAN WG1 Meeting NR Ad Hoc, Nagoya, Japan, Sep. 18-21, 2017, Source: AT&T, Title: Remaining Details of Carrier Aggregation and Bandwidth Parts.
R1-1716202 3GPP TSG RAN WG1 Meeting NR Ad Hoc, Nagoya, Japan, Sep. 18-21, 2017, Source: MediaTek Inc., Title: Remaining Details on Bandwidth Part Operation in NR.
R1-1716258 3GPP TSG RAN WG1 Meeting NR Ad Hoc, Nagoya, Japan, Sep. 18-21, 2017, Source: InterDigital, Inc., Title: Remaining details of BWP.
R1-1716327 3GPP TSG RAN WG1 Meeting NR Ad Hoc, Nagoya, Japan, Sep. 18-21, 2017, Source: Intel Corporation, Title: Remaining aspects for carrier aggregation and bandwidth parts.
R1-1716440 3GPP TSG RAN WG1 Meeting NR Ad Hoc, Nagoya, Japan, Sep. 18-21, 2017, Source: Qualcomm Incorporated, Title: CA and BWP.
R1-1716483 3GPP TSG RAN WG1 Meeting NR Ad Hoc, Nagoya, Japan, Sep. 18-21, 2017, Source: InterDigital, Inc., Title: On remaining details of UL data transmission without grant.
R1-1716597 3GPP TSG RAN WG1 Meeting NR Ad Hoc, Nagoya, Japan, Sep. 18-21, 2017, Source: Ericsson, Title: On UL Data Transmission Procedure.
R1-1716601 3GPP TSG RAN WG1 Meeting NR Ad Hoc, Nagoya, Japan, Sep. 18-21, 2017, Source: Ericsson, Title: On CA related aspects and BWP related aspects.
R1-1716623 3GPP TSG RAN WG1 Meeting NR Ad Hoc, Nagoya, Japan, Sep. 18-21, 2017, Source: MediaTek Inc., Title: On UL data transmission without grant design and configuration.
R1-1716647 3GPP TSG RAN WG1 Meeting NR Ad Hoc, Nagoya, Japan, Sep. 18-21, 2017, Source: Convida Wireless, Title: Discussion on BWP Design.
R1-1717077 3GPP TSG RAN WG1 Meeting #90bis, Prague, Czech Republic, Oct. 9-13, 2017, Source: Huawei, HiSilicon, Title: Remaining issues on bandwidth part.
R1-1717400 3GPP TSG RAN WG1 Meeting #90bis, Prague, Czech Republic, Oct. 9-13, 2017, Source: Intel Corporation, Title: Remaining details for bandwidth parts.
R1-1717504 3GPP TSG RAN WG1 Meeting #90bis, Prague, Czech Republic, Oct. 9-13, 2017, Source: vivo, Title: Remaining details for bandwidth part operation.
R1-1717675 3GPP TSG RAN WG1 Meeting #90bis, Prague, Czech Republic, Oct. 9-13, 2017, Source: Samsung, Title: On Bandwidth Part Operation.
R1-1717839 3GPP TSG RAN WG1 Meeting #90bis, Prague, Czech Republic, Oct. 9-13, 2017, Source: CATT, Title: Remaining aspects of BWP operation.
R1-1717972 3GPP TSG RAN WG1 Meeting #90bis, Prague, Czech Republic, Oct. 9-13, 2017, Source: LG Electronics, Title: Remaining issues on bandwidth parts.
R1-1718050 3GPP TSG RAN WG1 Meeting #90bis, Prague, Czech Republic, Oct. 9-13, 2017, Source: OPPO, Title: Remaining issues on bandwidth part configuration and activation.
R1-1718223 3GPP TSG RAN WG1 Meeting #90bis, Prague, Czech Republic, Oct. 9-13, 2017, Source: NTT DOCOMO, Inc., Title: Remaing issues on bandwidth parts for NR.
R1-1718327 3GPP TSG RAN WG1 Meeting #90bis, Prague, Czech Republic, Oct. 9-13, 2017, Source: MediaTek Inc., Title: Remaining Details on Bandwidth Part Operation in NR.
R1-1718365 3GPP TSG RAN WG1 Meeting #90bis, Prague, Czech Republic, Oct. 9-13, 2017, Source InterDigital, Inc., Title: Remaining details of BWP.
R1-1718404 3GPP TSG RAN WG1 Meeting #90bis, Prague, Czech Republic, Oct. 9-13, 2017, Source: AT&T, Title: Remaining details for bandwidth parts.
R1-1718523 3GPP TSG RAN WG1 Meeting #90bis, Prague, Czech Republic, Oct. 9-13, 2017, Source: Ericsson, Title: On bandwidth parties.
R1-1718580 3GPP TSG RAN WG1 Meeting #90bis, Prague, Czech Republic, Oct. 9-13, 2017, Source: Qualcomm Incorporated, Title: Open Issues on BWP.
R1-1718607 3GPP TSG RAN WG1 Meeting #90bis, Prague, Czech Republic, Oct. 9-13, 2017, Source: Nokia, Nokia Shanghai Bell, Title: On remaining aspects of BWPs.
1-171xxxx 3GPP TSG-RAN WG1 NR Ad Hoc, Qingdao, China, Jun. 27-30, 2017, Source: LG Electronics, Title: [draft] Summary of [89-22] Email discussion about UL data transmission without UL grant.
R1-17xxxxx 3GPP TSG RAN WG1 Meeting #90, Prague, Czech Republic, Aug. 21-25, 2017, Source: NTT DOCOMO, Inc., Title: Offline discussions on some topics for AI 6.1.3.1.
R2-1703453 3GPP TSG-RAN WG2 #97bis, Spokane, USA, Apr. 3-7, 2017, Source: Samsung, Title: HARQ for Numerology Multiplexing.
R2-1704479 3GPP TSG-RAN WG1 #98, Hangzhou, China, May 15-19, 2017, Source: Samsung, Title: The number of TBs per UL HARQ process.
R2-1704505 3GPP TSG-RAN WG1 #98, Hangzhou, China, May 15-19, 2017, Source: Samsung, Title: HARQ for numerology multiplexing.
R2-1704684 3GPP TSG-RAN WG1 #98, Hangzhou, China, May 15-19, 2017, Source: Ericsson, Title: Enhanced HARQ feedback mode in SPS.
R2-1706417 3GPP TSG-RAN WG2 NR Ad Hoc, Qingdao, China, Jun. 27-29, 2017, Source: CATT, Title: Grant-free transmission and SPS.
R2-1706448 3GPP TSG-RAN WG2 NR Ad Hoc, Qingdao, China, Jun. 27-29, 2017, Source: Spreadtrum Communications, Title: Discussion on UL grant-free transmission.
R2-1706589 3GPP TSG-RAN WG2 NR Ad Hoc, Qingdao, China, Jun. 27-29, 2017, Source: Nokia, Alcatel-Lucent Shanghai Bell, Title: Unified SPS and Grant-free operation.
Dec. 3, 2018—Extended European Search Report—EP 18188574.0.
CATT—Jun. 26, 2017—"Grant-free UL Transmission procedure".

(56) References Cited

OTHER PUBLICATIONS

Nokia Siemens Networks Oct. 5, 2010 "MAC CE for Activation Deactivation".
Huawei Sep. 17, 2017 "UL data transmission with and without SR\UL grant".
CATT May 14, 2017 "Further details of UL grant-free transmission for URLLC".
3GPP TR 38.802 V14.1.0 (Jun. 2017), Technical Report, 3rd Generation Partnership Project; Technical Specification Group Radio Access Network; Study on New Radio Access Technology Physical Layer Aspects (Release 14).
3GPP TR 38.804 V14.1.0 (Mar. 2017), Technical Report, 3rd Generation Partnership Project, Technical Specification Group Radio Access Network, Study on New Radio Access Technology, Radio Interface Protocol Aspects (Release 14).
3GPP TS 36.321 V.14.3.0 (Jun. 2017); Technical Specification; 3rd Generation Partnership Project; Technical Specification Group Radio Access Network; Evolved Universal Terrestrial Radio Access (E-UTRA); Medium Access Control (MAC) protocol specification (Release 14).
3GPP TSG RAN WG1 Meeting #90, Prague, Czech Republic, Aug. 21-25, 2017, Title: RAN1 Chairman's Notes.
3GPP TSG RAN WG1 Meeting NR#3, Nagoya, Japan, Sep. 18-21, 2017, Title: RAN1 Chairman's Notes.
3GPP TSG RAN WG2 #99, Berlin, Germany, Aug. 21-25, 2017, Source: Vice-Chairwoman (InterDigital), Title: Report from LTE and NR User Plane Break-Out Session.
3GPP TSG-RAN WG2 NR Ad Hoc, Qingdao, China, Jun. 27-30, 2017, Source: RAN1 Chairman, Object: Chairman Notes.
R1-1706901 3GPP TSG-RAN WG1 #89, Hangzhou, China, May 15-19, 2017, Source: Huawei, HiSilicon, Title: TB mapping for slot aggregation.
R1-1706909 3GPP TSG-RAN WG1 #89, Hangzhou, China, May 15-19, 2017, Source: Huawei, HiSilicon, Title: On uplink data scheduling.
R1-1706914 3GPP TSG-RAN WG1 #89, Hangzhou, China, May 15-19, 2017, Source: Huawei, HiSilicon, Title: Numerology for multiplexing of eMBB and URLLC.
R1-1707176 3GPP TSG-RAN WG1 #89, Hangzhou, China, May 15-19, 2017, Source: ZTE, Title: Multiplexing data with different transmission durations.
R1-1707195 3GPP TSG-RAN WG1 #89, Hangzhou, China, May 15-19, 2017, Source: FiberHome, Title: Discussion on resource allocation for NR.
R1-1707237 3GPP TSG-RAN WG1 #89, Hangzhou, China, May 15-19, 2017, Source: vivo, Title: Discussion on flexible length scheduling.
R1-1707508 3GPP TSG-RAN WG1 #89, Hangzhou, China, May 15-19, 2017, Source: CATT, Title: NR DL scheduling mechanism.
R1-1707656 3GPP TSG-RAN WG1 #89, Hangzhou, China, May 15-19, 2017, Source: LG Electronics, Title: Consideration on HARQ-ACK feedback method for NR.
R1-1707662 3GPP TSG-RAN WG1 #89, Hangzhou, China, May 15-19, 2017, Source: LG Electronics, Title: Consideration on CB group based HARQ-ACK feedback.
R1-1708017 3GPP TSG-RAN WG1 #89, Hangzhou, China, May 15-19, 2017, Source: Samsung, Title: DL Resource Allocation Aspects.
R1-1709991 3GPP TSG-RAN WG1 NR Ad Hoc, Qingdao, China, Jun. 27-30, 2017, Source: Huawei, HiSilicon, Title: Resource configuration on UL transmission without grant.
R1-1710015 3GPP TSG-RAN WG1 NR Ad Hoc, Qingdao, China, Jun. 27-30, 2017, Source: ZTE, Title: Considerations on the procedures of UL data transmission without grant.
R1-1710094 3GPP TSG-RAN WG1 NR Ad Hoc, Qingdao, China, Jun. 27-30, 2017, Source: CATT, Title: Grant-free UL transmission procedure.
R1-1710327 3GPP TSG-RAN WG1 NR Ad Hoc, Qingdao, China, Jun. 27-30, 2017, Source: LG Electronics, Title: Discussion on UL transmission without grant.
R1-1710380 3GPP TSG-RAN WG1 NR Ad Hoc, Qingdao, China, Jun. 27-30, 2017, Source: vivio, Title: Discussion on UL grant-free transmission.
R1-1710568 3GPP TSG-RAN WG1 NR Ad Hoc, Qingdao, China, Jun. 27-30, 2017, Source: Intel Corporation, Title: UL grant-free transmissions: Resource configuration.
R1-1710621 3GPP TSG-RAN WG1 NR Ad Hoc, Qingdao, China, Jun. 27-30, 2017, Source: ETRI, Title: Resource allocation and transmission scheme for URLLC grant-free transmission.
R1-1710723 3GPP TSG-RAN WG1 NR Ad Hoc, Qingdao, China, Jun. 27-30, 2017, Source: Samsung, Title: Procedures for Grant-Free UL Transmissions.
R1-1710724 3GPP TSG-RAN WG1 NR Ad Hoc, Qingdao, China, Jun. 27-30, 2017, Source: Samsung, Title: Grant-free and grant-based UL transmissions.
R1-1710887 3GPP TSG-RAN WG1 NR Ad Hoc, Qingdao, China, Jun. 27-30, 2017, Source: Intel Corporation, Title: UL grant-free transmissions: Physical layer procedures.
R1-1710963 3GPP TSG-RAN WG1 NR Ad Hoc, Qingdao, China, Jun. 27-30, 2017, Source: NEC, Title: On network resources and UE transmission configurations for grant-free access.
R1-1710971 3GPP TSG-RAN WG1 NR Ad Hoc, Qingdao, China, Jun. 27-30, 2017, Source: China Telecom, Title: UL grant-free transmission for URLLC.
R1-1711006 3GPP TSG-RAN WG1 NR Ad Hoc, Qingdao, China, Jun. 27-30, 2017, Source: Institute for Information Industry (III), Title: Issues and Control Design for UL Grant-free URLLC.
R1-1711111 3GPP TSG-RAN WG1 NR Ad Hoc, Qingdao, China, Jun. 27-30, 2017, Source: NTT DOCOMO, Inc., Title: Overall solutions for UL grant free transmission.
R1-1711253 3GPP TSG-RAN WG1 NR Ad Hoc, Qingdao, China, Jun. 27-30, 2017, Source: NICT, Title: Resource configuration for UL transmission without grant.
R1-1711504 3GPP TSG-RAN WG1 NR Ad Hoc, Qingdao, China, Jun. 27-30, 2017, Source: Ericsson, Title: On SPS/Grant-Free Transmission.
R1-1712689 3GPP TSG RAN WG1 Meeting #90, Prague, Czech Republic, Aug. 21-25, 2017, Source: Lenovo, Motorola Mobility, Title: HARQ design for uplink grant-free transmission.
R1-1712743 3GPP TSG RAN WG1 Meeting #90, Prague, Czech Republic, Aug. 21-25, 2017, Source: Fujitsu, Title: Discussions on HARQ for grant-free transmission.
R1-1712823 3GPP TSG RAN WG1 Meeting #90, Prague, Czech Republic, Aug. 21-25, 2017, Source: Orange, China Unicom, Nokia, Nokia Shanghai Bell, Ericsson, ZTE, Apple, Title: WF on Scenario 1.
R1-1712863 3GPP TSG RAN WG1 Meeting #90, Prague, Czech Republic, Aug. 21-25, 2017, Source: vivo, Title: Discussion on UL grant-free transmission.
R1-1713189 3GPP TSG RAN WG1 Meeting #90, Prague, Czech Republic, Aug. 21-25, 2017, Source: LG Electronics, Title: Discussion on UL transmission without grant.
R1-1713639 3GPP TSG RAN WG1 Meeting #90, Prague, Czech Republic, Aug. 21-25, 2017, Source: Samsung, Title: Procedures for Grant-Free UL Transmissions.
R1-1714011 3GPP TSG RAN WG1 Meeting #90, Prague, Czech Republic, Aug. 21-25, 2017, Source: Nokia, Nokia Shanghai Bell, Title: UL transmission procedure without grant.
R1-1715419 3GPP TSG RAN WG1 Meeting NR Ad Hoc, Nagoya, Japan, Sep. 18-21, 2017, Source: Huawei, HiSilicon, Title: UL data transmission with and without SR/UL grant.
R1-1715425 3GPP TSG RAN WG1 Meeting NR Ad Hoc, Nagoya, Japan, Sep. 18-21, 2017, Source: Huawei, HiSilicon, Title: Overview of bandwidth part, CA, and DC operation including SRS switching.
R1-1715490 3GPP TSG RAN WG1 Meeting NR Ad Hoc, Nagoya, Japan, Sep. 18-21, 2017, Source: Fujitsu, Title: Discussions on HARQ for UL data transmission without grant.
R1-1715492 3GPP TSG RAN WG1 Meeting NR Ad Hoc, Nagoya, Japan, Sep. 18-21, 2017, Source: Fujitsu, Title: Considerations on UCI feedback for carrier aggregation.

(56) References Cited

OTHER PUBLICATIONS

R1-1715517 3GPP TSG RAN WG1 Meeting NR Ad Hoc, Nagoya, Japan, Sep. 18-21, 2017, Source: Spreadtrum Communications, Title: Consideration on monitoring preemption indication in bandwidth parts.

* cited by examiner

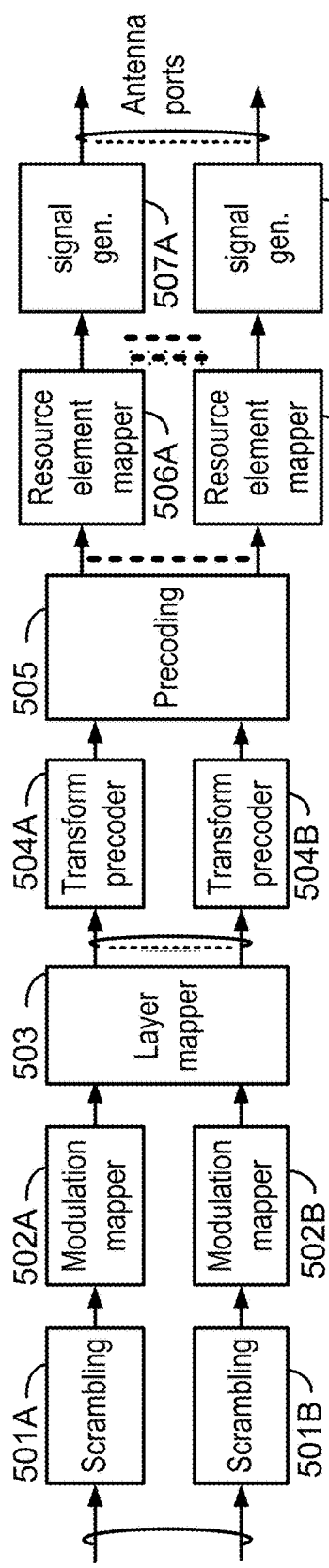
FIG. 5A Example uplink physical channel
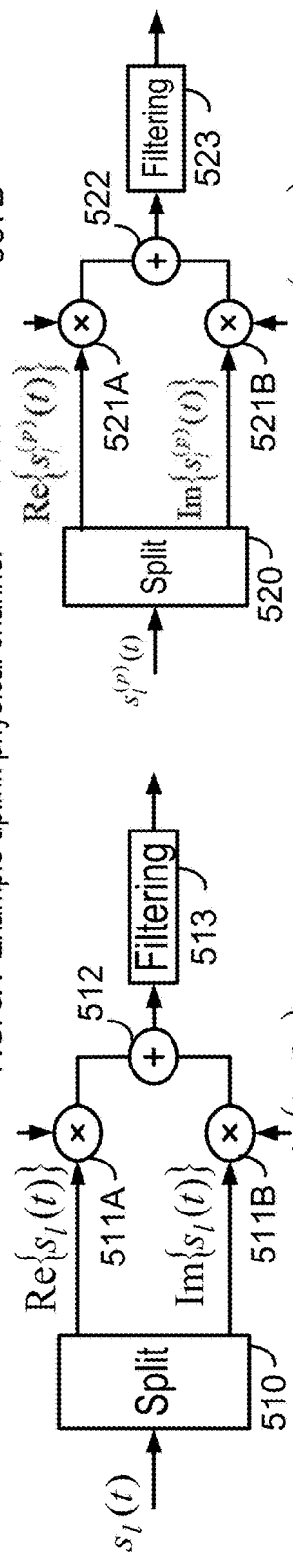
FIG. 5B Example uplink modulation
FIG. 5D Example downlink modulation
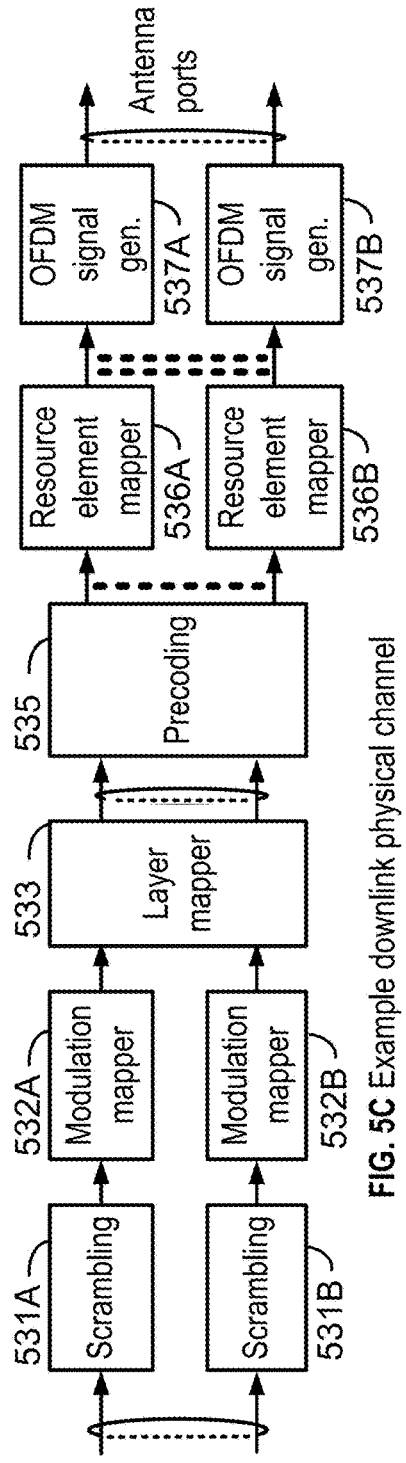
FIG. 5C Example downlink physical channel Example 1: 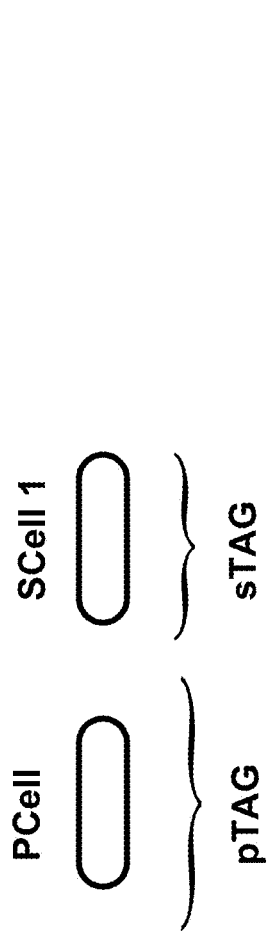
Example 2: 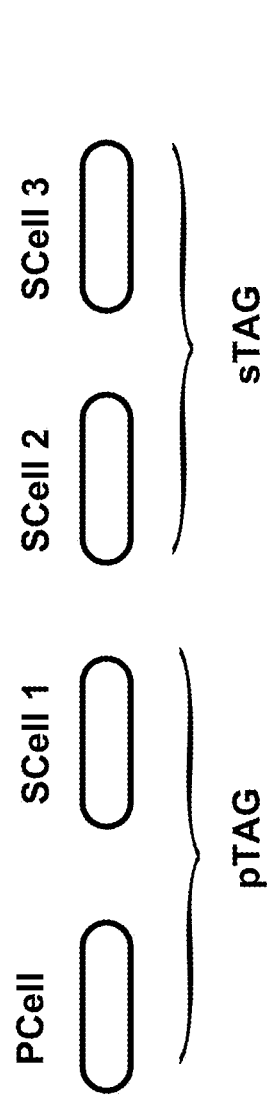
Example 3: 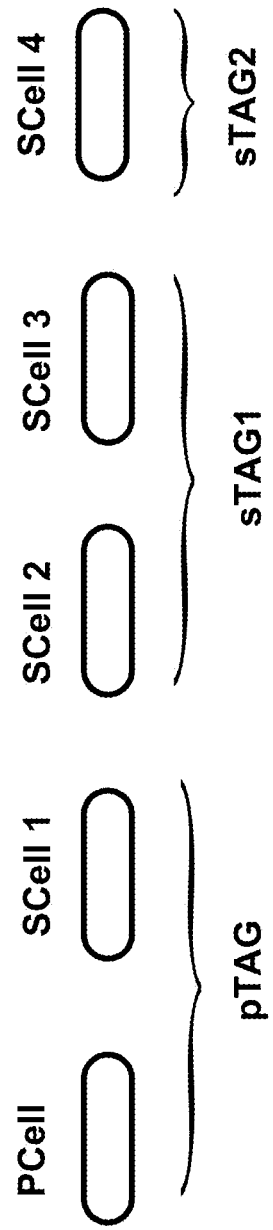
FIG. 8

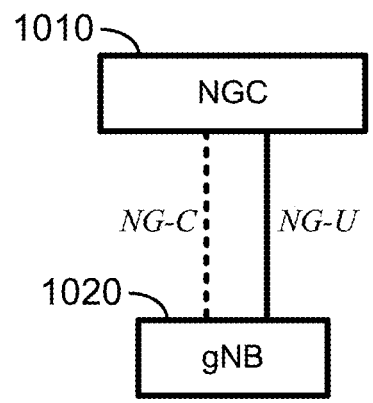
FIG. 10A gNB connected to NGC
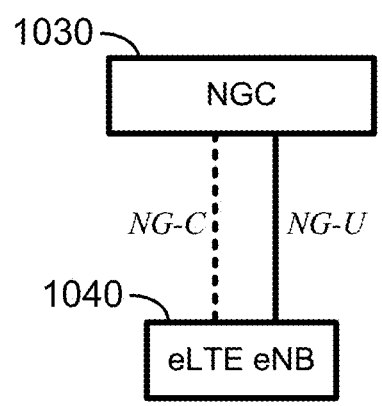
FIG. 10B eLTE eNB connected to NGC

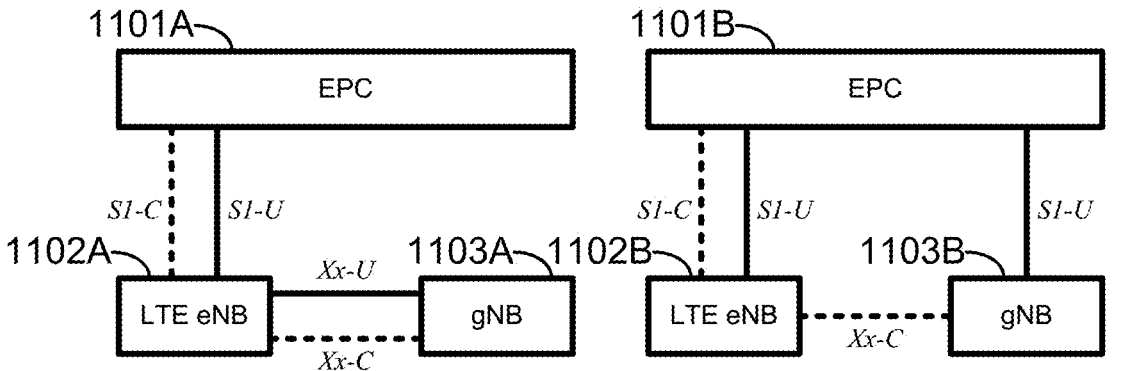

FIG. 11A LTE eNB connected to EPC with non-standalone gNB.
gNB user plane connected to EPC via LTE eNB.

FIG. 11B LTE eNB connected to EPC with non-standalone gNB.
gNB user plane connected to EPC directly.

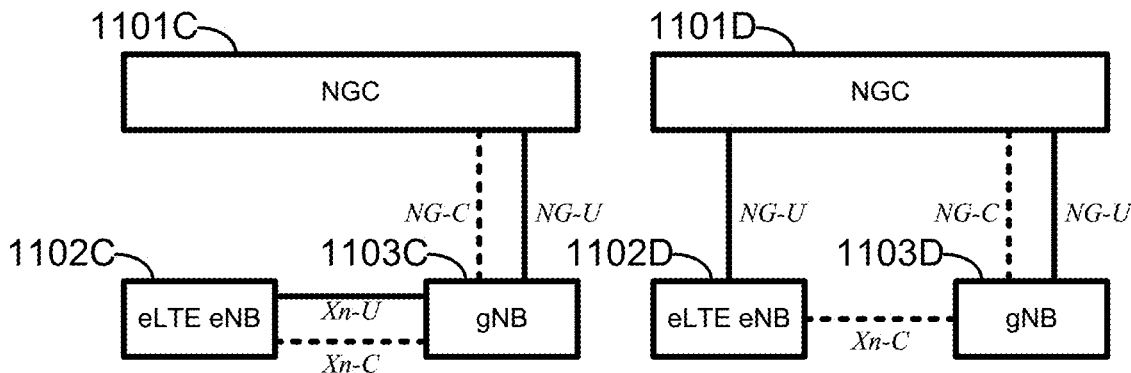

FIG. 11C gNB connected to NGC with non-standalone eLTE eNB.
eLTE eNB user plane connected to NGC via gNB.

FIG. 11D gNB connected to NGC with non-standalone eLTE eNB.
eLTE eNB user plane connected to NGC directly.

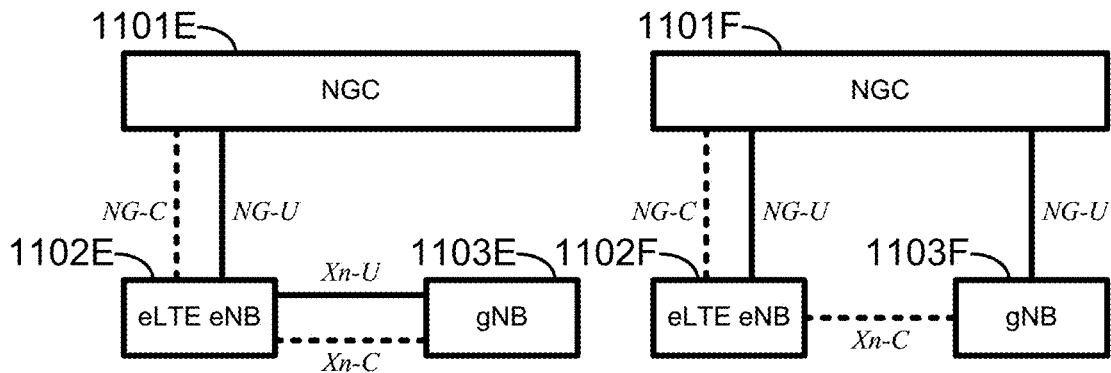

FIG. 11E eLTE eNB connected to NGC with non-standalone gNB.
gNB user plane connected to NGC via eLTE eNB.

FIG. 11F eLTE eNB connected to NGC with non-standalone gNB.
gNB user plane connected to NGC directly.

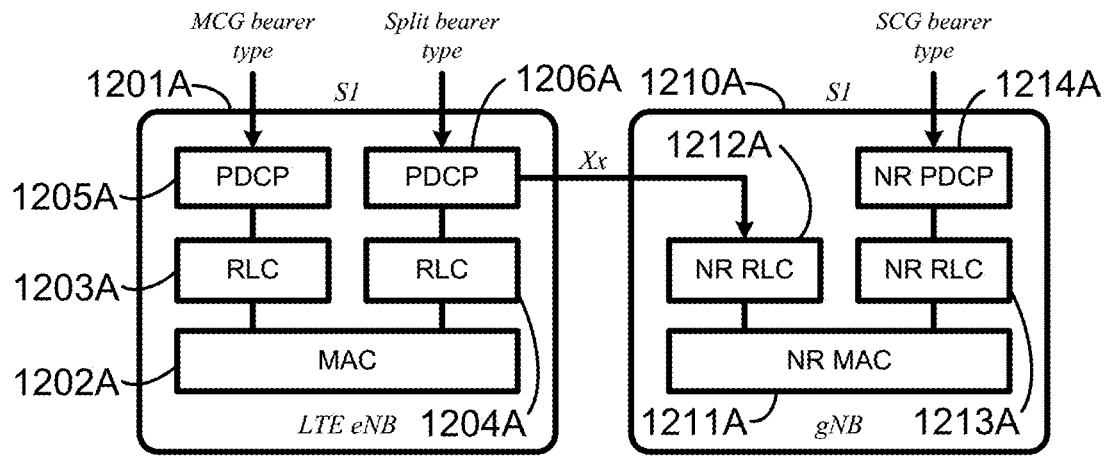
FIG. 12A Radio protocol architecture for split bearer and SCG bearer. LTE eNB connected to EPC with non-standalone gNB.
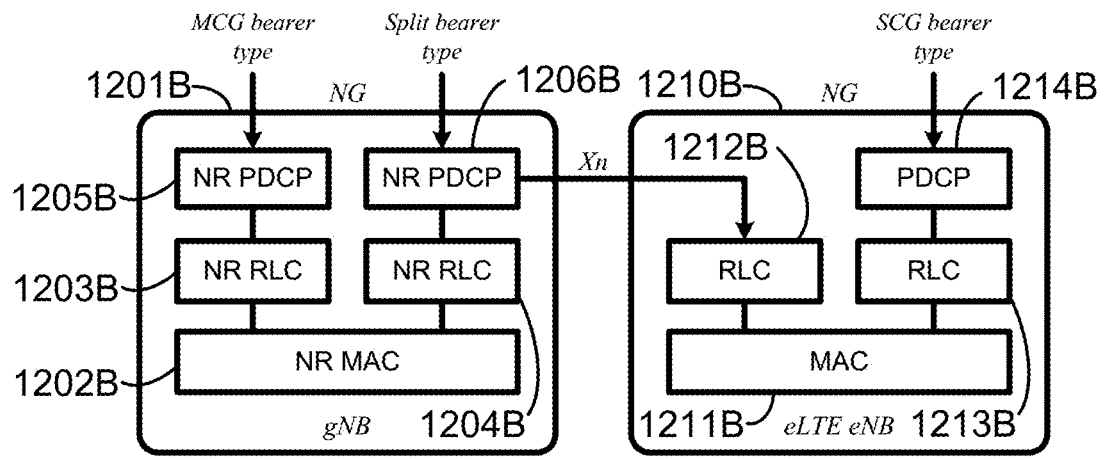
FIG. 12B Radio protocol architecture for split bearer and SCG bearer. gNB connected to NGC with non-standalone eLTE eNB.
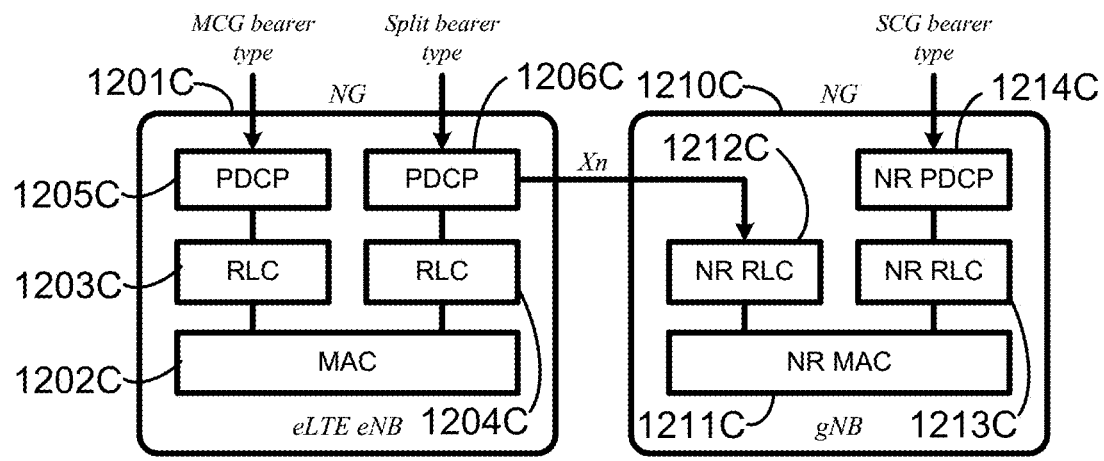
FIG. 12C Radio protocol architecture for split bearer and SCG bearer. eLTE eNB connected to NGC with non-standalone gNB.

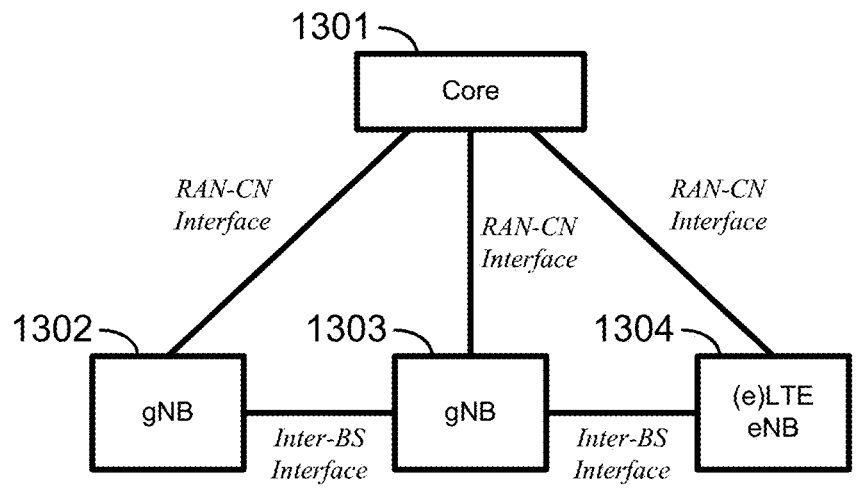
FIG. 13A  Non-centralized deployment
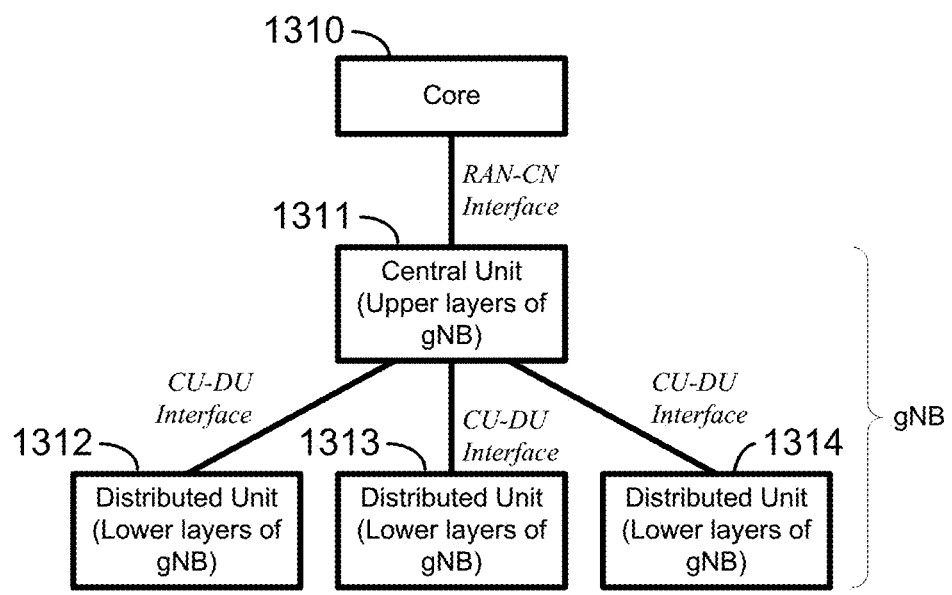
FIG. 13B  Centralized deployment

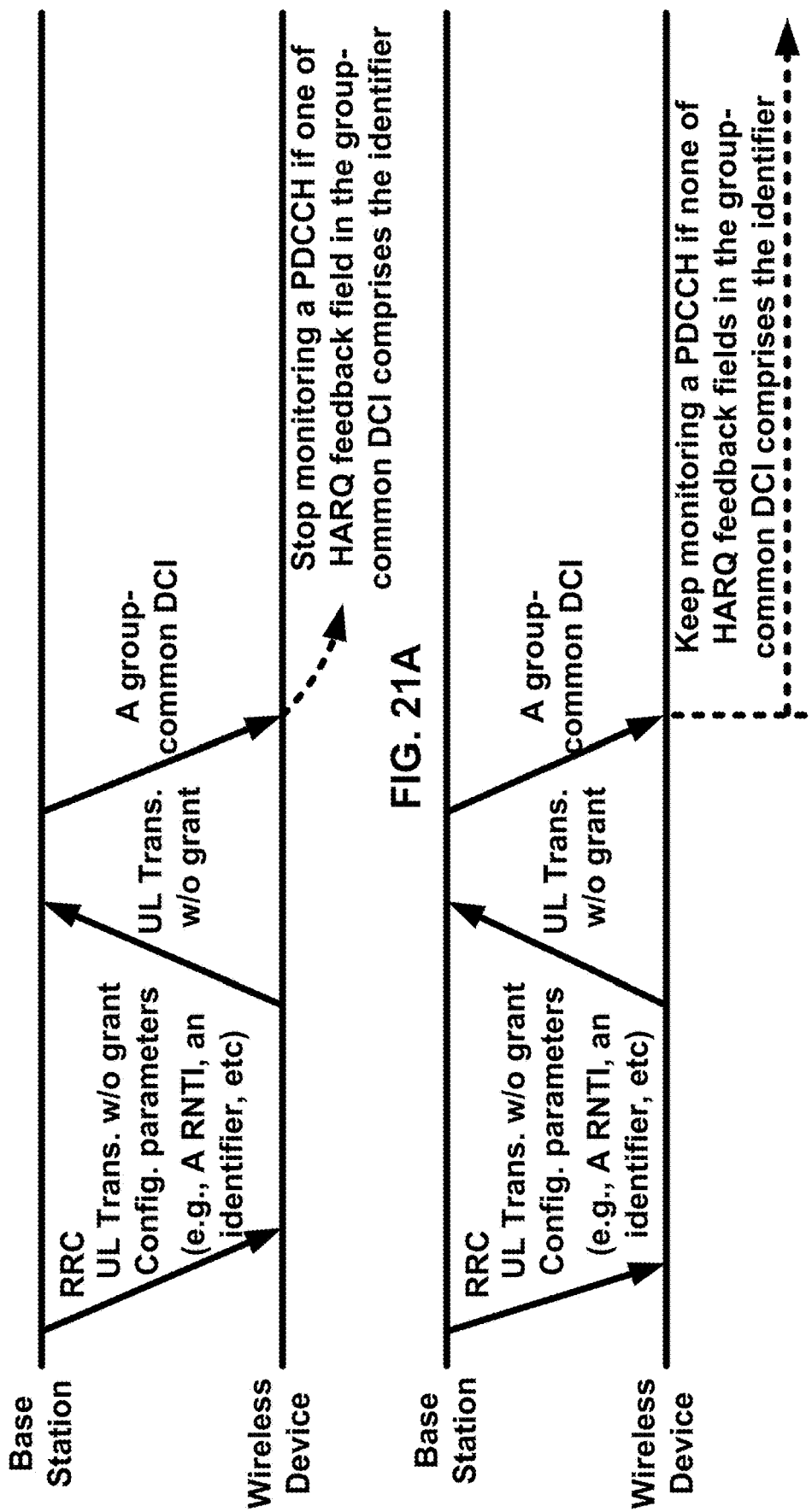

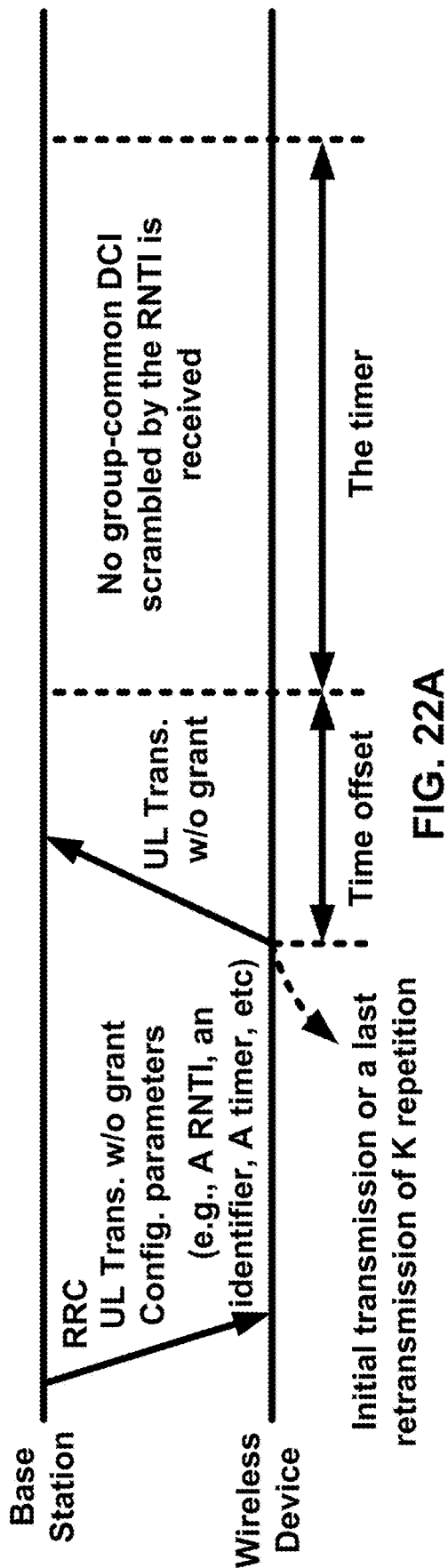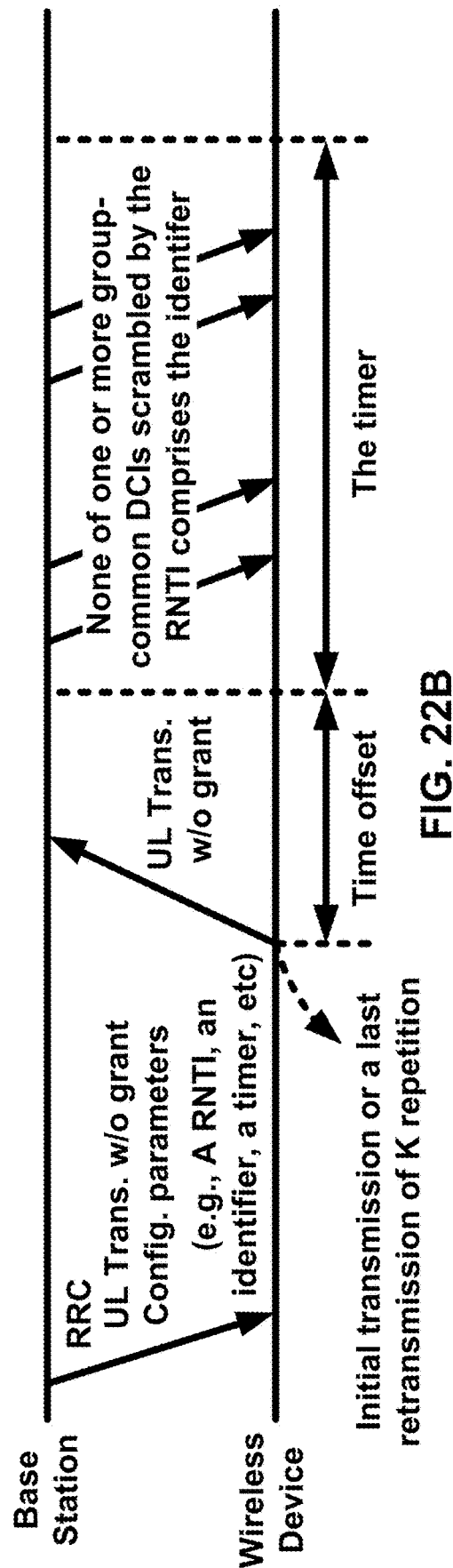

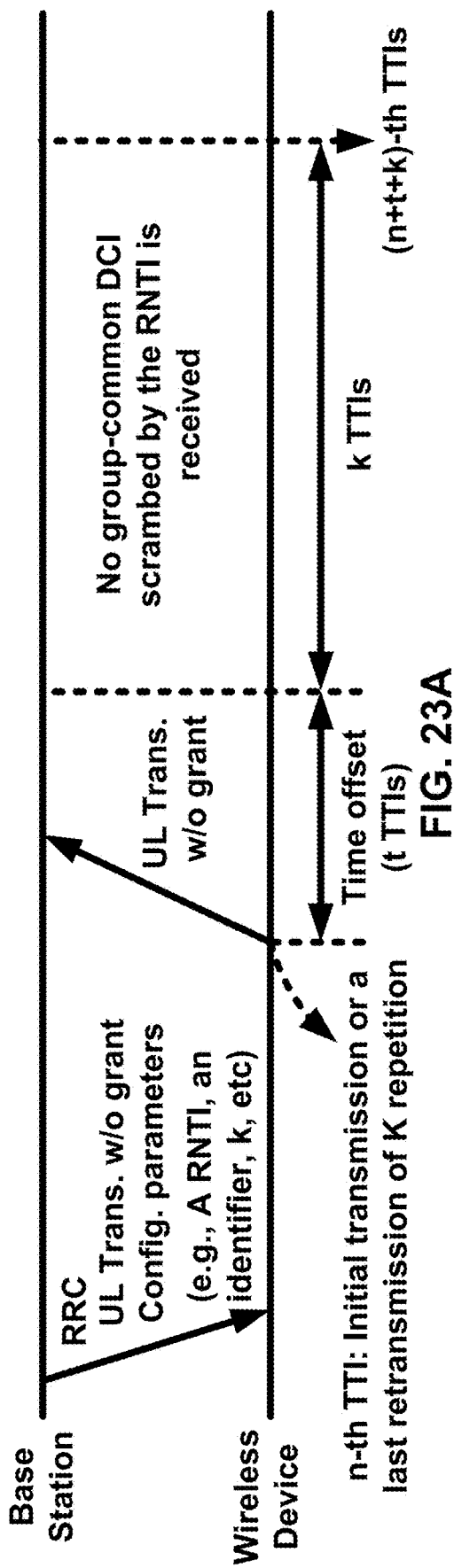
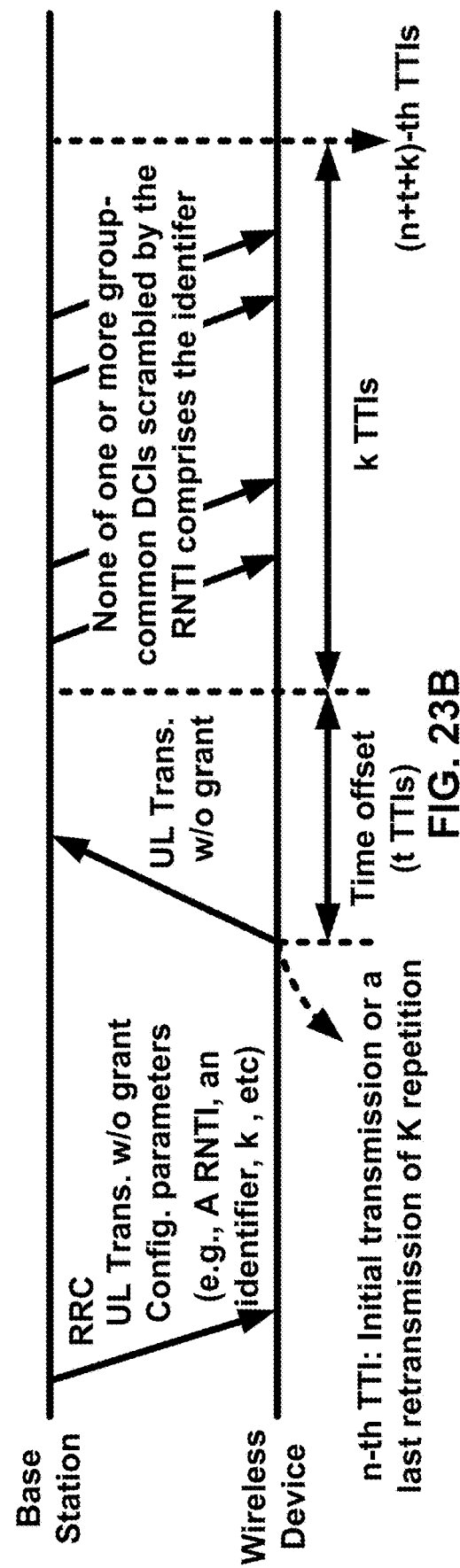
FIG. 23A
FIG. 23B

HARQ FEEDBACK FOR GRANT-FREE TRANSMISSION

CROSS-REFERENCE TO RELATED APPLICATIONS

This application claims the benefit of U.S. Provisional Application No. 62/564,692, titled "HARQ Feedback for Grant-Free Transmission" and filed on Sep. 28, 2017, the disclosure of which is hereby incorporated by reference in its entirety.

BACKGROUND

In wireless communications, error correction can be utilized for controlling errors in data transmitted across a wireless communication channel. Error correction can often double or triple the length of a message being transmitted with error correction, commonly utilizing half or more of the capacity of the wireless communication channel.

SUMMARY

The following summary presents a simplified summary of certain features. The summary is not an extensive overview and is not intended to identify key or critical elements.

Systems, apparatuses, and methods are described for wireless communications. A base station may transmit wireless device-specific downlink control information to a wireless device. The downlink control information may comprise a HARQ feedback corresponding to grant free uplink transmission for the wireless device. The wireless device-specific downlink control information may result in a signaling overhead because a base station may coordinate to schedule a plurality of HARQ feedbacks for a plurality of wireless devices configured with grant free uplink transmission. Coordinating a plurality of HARQ feedbacks may result in complicated processing at the base station and/or a delay to schedule a HARQ feedback for the wireless device. However, the transmission of one or more group-common downlink control information comprising one or more wireless identifiers may not require HARQ feedback from the wireless devices. Additionally, wireless devices utilizing a grant of radio resources may not need to be included in the group-common downlink control information. This reduction in HARQ feedback may result in fewer error correction transmissions over the wireless communications channel, thereby reducing the channel capacity utilized for error correction transmissions and enhancing resource utilization.

These and other features and advantages are described in greater detail below.

BRIEF DESCRIPTION OF THE DRAWINGS

Some features are shown by way of example, and not by limitation, in the accompanying drawings. In the drawings, like numerals reference similar elements.

FIG. 5A, FIG. 5B, FIG. 5C and FIG. 5D show examples for uplink and downlink signal transmission.

FIG. 8 shows example timing advance group (TAG) configurations.

FIG. 10A and FIG. 10B show examples for interfaces between a 5G core network and base stations.

FIG. 11A, FIG. 11B, FIG. 11C, FIG. 11D, FIG. 11E, and FIG. 11F show examples for architectures of tight interworking between a 5G RAN and a long term evolution (LTE) radio access network (RAN).

FIG. 12A, FIG. 12B, and FIG. 12C show examples for radio protocol structures of tight interworking bearers.

FIG. 13A and FIG. 13B show examples for base station deployment.

FIG. 21A and FIG. 21B are example HARQ feedback procedures.

FIG. 22A and FIG. 22B are example HARQ feedback procedures.

FIG. 23A and FIG. 23B are example HARQ feedback procedures.

DETAILED DESCRIPTION

Figure 1:
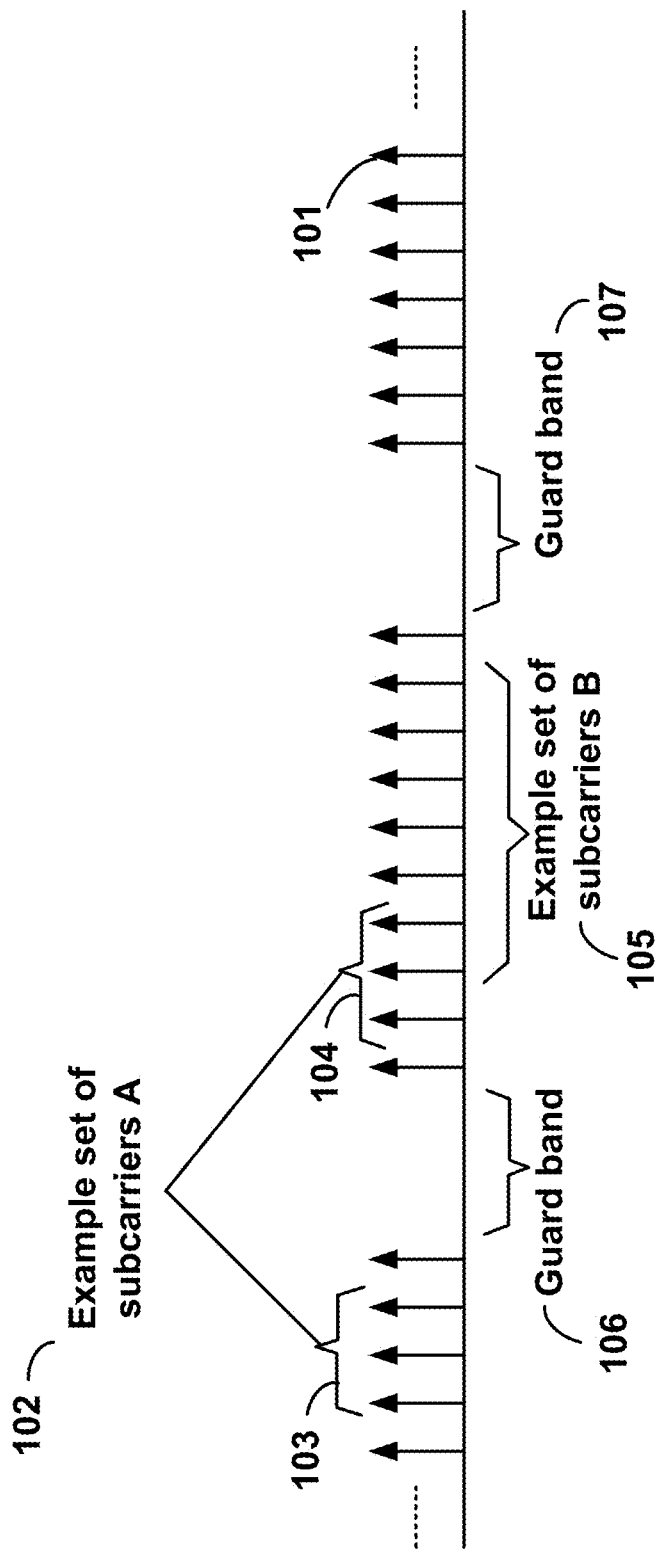
FIG. 1 shows example sets of orthogonal frequency division multiplexing (OFDM) sub carriers.

The accompanying drawings, which form a part hereof, show examples of the disclosure. It is to be understood that the examples shown in the drawings and/or discussed herein are non-exclusive and that there are other examples of how the disclosure may be practiced.

Examples may enable operation of carrier aggregation and may be employed in the technical field of multicarrier communication systems. Examples may relate to establishing uplink and/or downlink communication channels in multicarrier communication systems.

The following acronyms are used throughout the present disclosure, provided below for convenience although other acronyms may be introduced in the detailed description:

3GPP 3rd Generation Partnership Project
5G 5th generation wireless systems
5GC 5G Core Network
ACK Acknowledgement
AMF Access and Mobility Management Function
ASIC application-specific integrated circuit BPSK binary phase shift keying
CA carrier aggregation
CC component carrier
CDMA code division multiple access
CP cyclic prefix
CPLD complex programmable logic devices
CSI channel state information
CSS common search space
CU central unit
DC dual connectivity
DCI downlink control information
DFTS-OFDM discrete Fourier transform spreading OFDM
DL downlink
DU distributed unit
eLTE enhanced LTE
eMBB enhanced mobile broadband
eNB evolved Node B
EPC evolved packet core
E-UTRAN evolved-universal terrestrial radio access network
FDD frequency division multiplexing
FPGA field programmable gate arrays
Fs-C Fs-control plane
Fs-U Fs-user plane
gNB next generation node B
HARQ hybrid automatic repeat request
HDL hardware description languages
ID identifier
IE information element
LTE long term evolution
MAC media access control
MCG master cell group
MeNB master evolved node B
MIB master information block
MME mobility management entity
mMTC massive machine type communications
NACK Negative Acknowledgement
NAS non-access stratum
NG CP next generation control plane core
NGC next generation core
NG-C NG-control plane
NG-U NG-user plane
NR MAC new radio MAC
NR PDCP new radio PDCP
NR PHY new radio physical
NR RLC new radio RLC
NR RRC new radio RRC
NR new radio
NSSAI network slice selection assistance information
OFDM orthogonal frequency division multiplexing
PCC primary component carrier
PCell primary cell
PDCCH physical downlink control channel
PDCP packet data convergence protocol
PDU packet data unit
PHICH physical HARQ indicator channel
PHY physical
PLMN public land mobile network
PSCell primary secondary cell
pTAG primary timing advance group
PUCCH physical uplink control channel
PUSCH physical uplink shared channel
QAM quadrature amplitude modulation
QPSK quadrature phase shift keying
RA random access
RACH random access channel
RAN radio access network
RAP random access preamble
RAR random access response
RB resource blocks
RBG resource block groups
RLC radio link control
RRC radio resource control
RRM radio resource management
RV redundancy version
SCC secondary component carrier
SCell secondary cell
SCG secondary cell group
SC-OFDM single carrier-OFDM
SDU service data unit
SeNB secondary evolved node B
SFN system frame number
S-GW serving gateway
SIB system information block
SC-OFDM single carrier orthogonal frequency division multiplexing
SRB signaling radio bearer
sTAG(s) secondary timing advance group(s)
TA timing advance
TAG timing advance group
TAI tracking area identifier
TAT time alignment timer
TDD time division duplexing
TDMA time division multiple access
TTI transmission time interval
TB transport block
UE user equipment
UL uplink
UPGW user plane gateway
URLLC ultra-reliable low-latency communications
VHDL VHSIC hardware description language
Xn-C Xn-control plane
Xn-U Xn-user plane
Xx-C Xx-control plane
Xx-U Xx-user plane Examples may be implemented using various physical layer modulation and transmission mechanisms. Example transmission mechanisms may include, but are not limited to CDMA, OFDM, TDMA, Wavelet technologies, and/or the like. Hybrid transmission mechanisms such as TDMA/CDMA and OFDM/CDMA may also be employed. Various modulation schemes may be used for signal transmission in the physical layer. Examples of modulation schemes include, but are not limited to phase, amplitude, code, a combination of these, and/or the like. An example radio transmission method may implement QAM using BPSK, QPSK, 16-QAM, 64-QAM, 256-QAM, and/or the like. Physical radio transmission may be enhanced by dynamically or semi-dynamically changing the modulation and coding scheme depending on transmission requirements and radio conditions.

FIG. 1 shows example sets of OFDM subcarriers. As shown in this example, arrow(s) in the diagram may depict a subcarrier in a multicarrier OFDM system. The OFDM system may use technology such as OFDM technology, DFTS-OFDM, SC-OFDM technology, or the like. For example, arrow 101 shows a subcarrier transmitting information symbols. FIG. 1 is shown as an example, and a typical multicarrier OFDM system may include more subcarriers in a carrier. For example, the number of subcarriers in a carrier may be in the range of 10 to 10,000 subcarriers. FIG. 1 shows two guard bands 106 and 107 in a transmission band. As shown in FIG. 1, guard band 106 is between subcarriers 103 and subcarriers 104. The example set of subcarriers A 102 includes subcarriers 103 and subcarriers 104. FIG. 1 also shows an example set of subcarriers B 105. As shown, there is no guard band between any two subcarriers in the example set of subcarriers B 105. Carriers in a multicarrier OFDM communication system may be contiguous carriers, non-contiguous carriers, or a combination of both contiguous and non-contiguous carriers.

Figure 2:
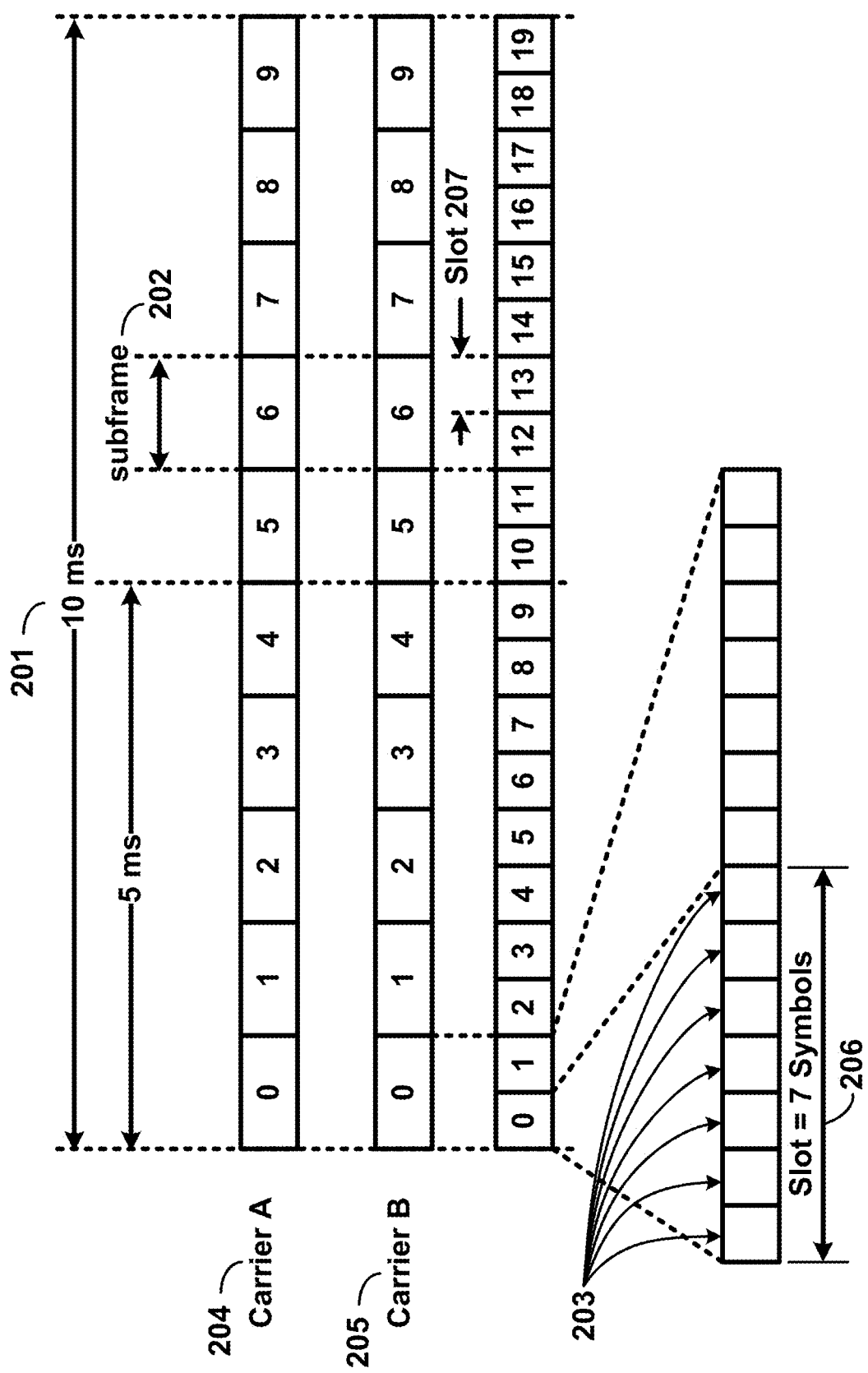
FIG. 2 shows example transmission time and reception time for two carriers in a carrier group.

FIG. 2 shows an example timing arrangement with transmission time and reception time for two carriers. A multicarrier OFDM communication system may include one or more carriers, for example, ranging from 1 to 10 carriers. Carrier A 204 and carrier B 205 may have the same or different timing structures. Although FIG. 2 shows two synchronized carriers, carrier A 204 and carrier B 205 may or may not be synchronized with each other. Different radio frame structures may be supported for FDD and TDD duplex mechanisms. FIG. 2 shows an example FDD frame timing. Downlink and uplink transmissions may be organized into radio frames 201. In this example, radio frame duration is 10 milliseconds (msec). Other frame durations, for example, in the range of 1 to 100 msec may also be supported. In this example, each 10 msec radio frame 201 may be divided into ten equally sized subframes 202. Other subframe durations such as including 0.5 msec, 1 msec, 2 msec, and 5 msec may also be supported. Subframe(s) may consist of two or more slots (e.g., slots 206 and 207). For the example of FDD, 10 subframes may be available for downlink transmission and 10 subframes may be available for uplink transmissions in each 10 msec interval. Uplink and downlink transmissions may be separated in the frequency domain. A slot may be 7 or 14 OFDM symbols for the same subcarrier spacing of up to 60 kHz with normal CP. A slot may be 14 OFDM symbols for the same subcarrier spacing higher than 60 kHz with normal CP. A slot may include all downlink, all uplink, or a downlink part and an uplink part, and/or alike. Slot aggregation may be supported, e.g., data transmission may be scheduled to span one or multiple slots. For example, a mini-slot may start at an OFDM symbol in a subframe. A mini-slot may have a duration of one or more OFDM symbols. Slot(s) may include a plurality of OFDM symbols 203. The number of OFDM symbols 203 in a slot 206 may depend on the cyclic prefix length and subcarrier spacing.

Figure 3:
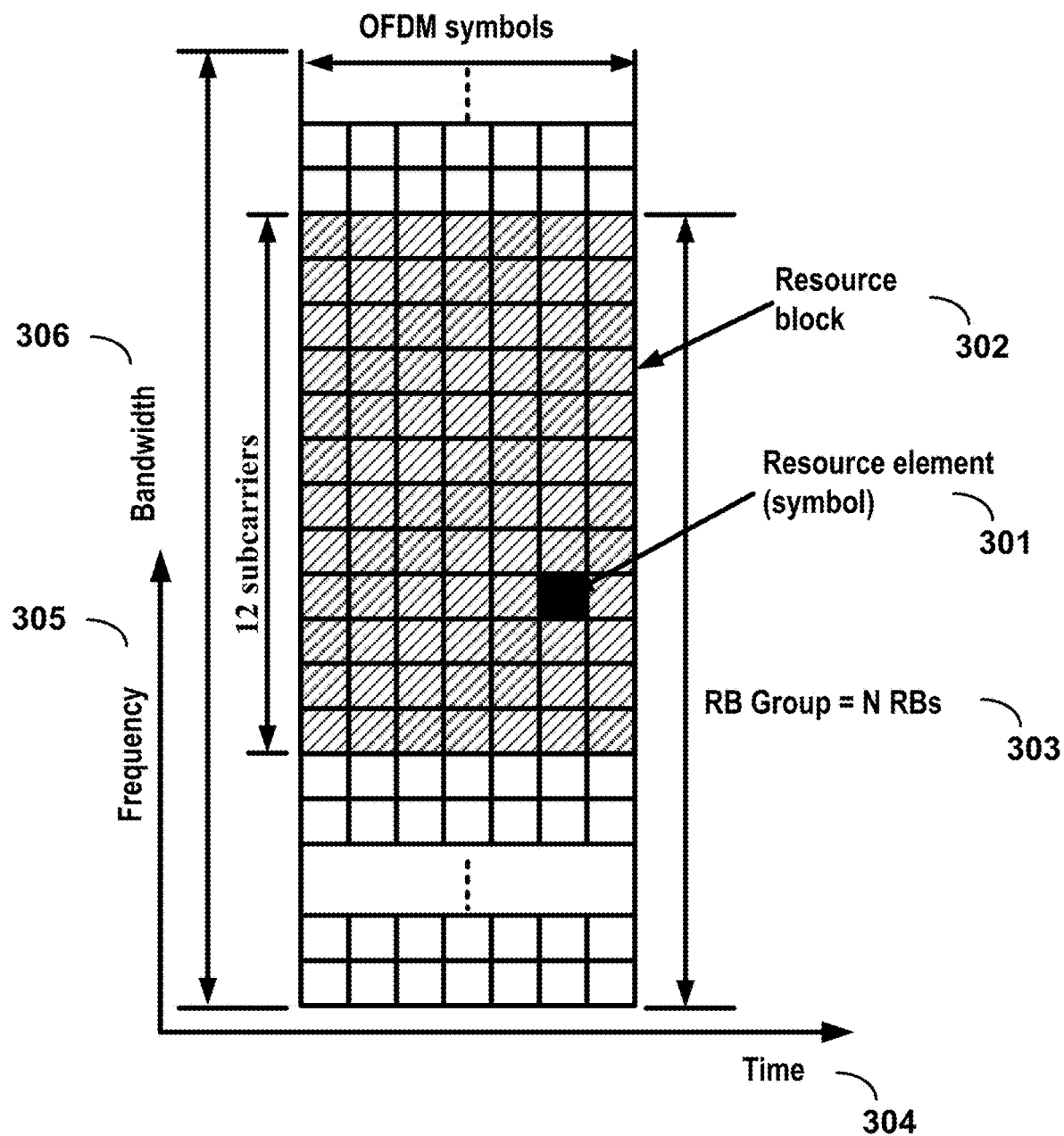
FIG. 3 shows example OFDM radio resources.

FIG. 3 shows an example of OFDM radio resources. The resource grid structure in time 304 and frequency 305 is shown in FIG. 3. The quantity of downlink subcarriers or RBs may depend, at least in part, on the downlink transmission bandwidth 306 configured in the cell. The smallest radio resource unit may be called a resource element (e.g., 301). Resource elements may be grouped into resource blocks (e.g., 302). Resource blocks may be grouped into larger radio resources called Resource Block Groups (RBG) (e.g., 303). The transmitted signal in slot 206 may be described by one or several resource grids of a plurality of subcarriers and a plurality of OFDM symbols. Resource blocks may be used to describe the mapping of certain physical channels to resource elements. Other pre-defined groupings of physical resource elements may be implemented in the system depending on the radio technology. For example, 24 subcarriers may be grouped as a radio block for a duration of 5 msec. A resource block may correspond to one slot in the time domain and 180 kHz in the frequency domain (for 15 kHz subcarrier bandwidth and 12 subcarriers).

Multiple numerologies may be supported. A numerology may be derived by scaling a basic subcarrier spacing by an integer N. Scalable numerology may allow at least from 15 kHz to 480 kHz subcarrier spacing. The numerology with 15 kHz and scaled numerology with different subcarrier spacing with the same CP overhead may align at a symbol boundary every 1 msec in a NR carrier.

Figure 4:
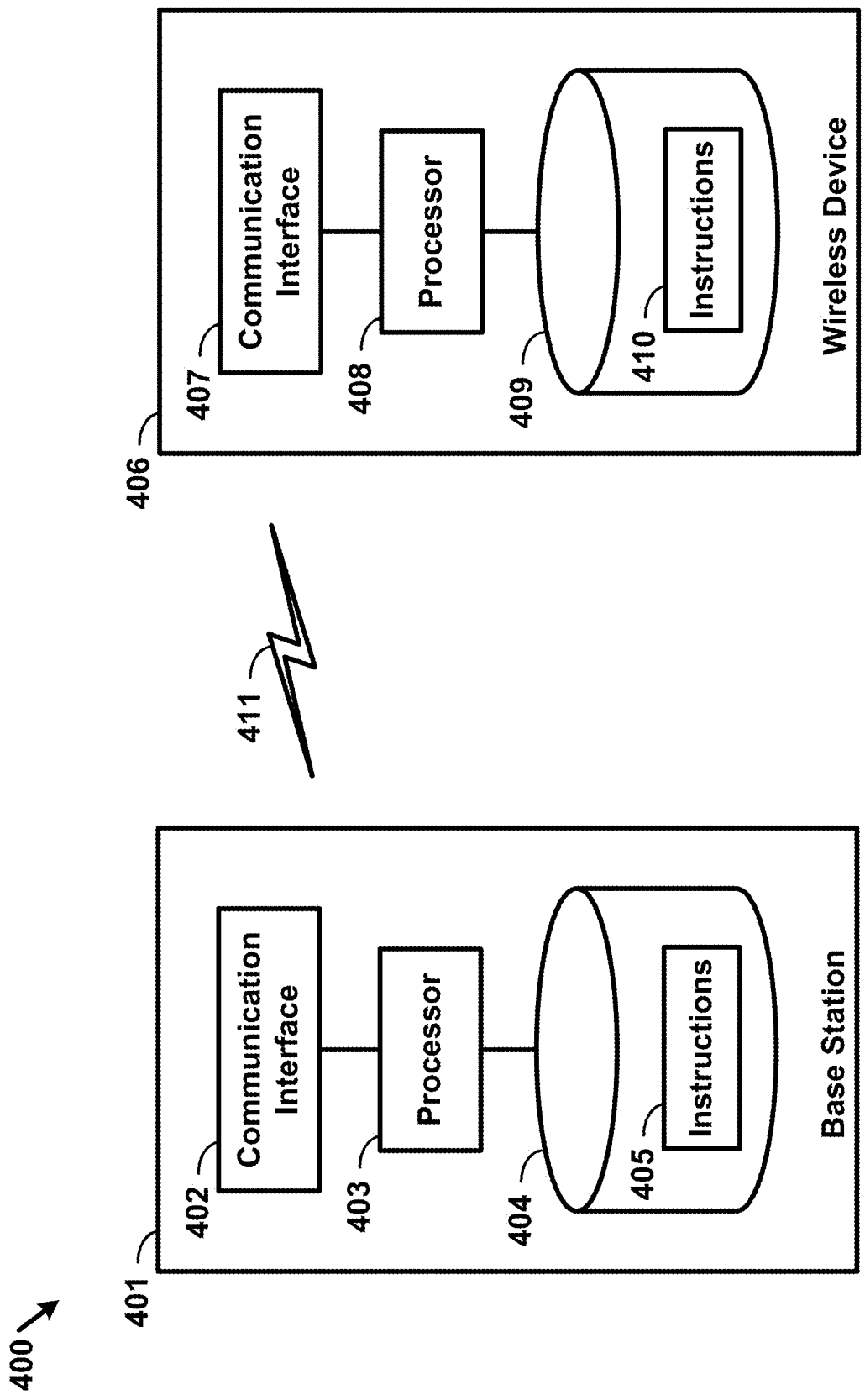
FIG. 4 shows hardware elements of a base station and a wireless device.

FIG. 4 shows hardware elements of a base station 401 and a wireless device 406. A communication network 400 may include at least one base station 401 and at least one wireless device 406. The base station 401 may include at least one communication interface 402, one or more processors 403, and at least one set of program code instructions 405 stored in non-transitory memory 404 and executable by the one or more processors 403. The wireless device 406 may include at least one communication interface 407, one or more processors 408, and at least one set of program code instructions 410 stored in non-transitory memory 409 and executable by the one or more processors 408. A communication interface 402 in the base station 401 may be configured to engage in communication with a communication interface 407 in the wireless device 406, such as via communication path that includes at least one wireless link 411. The wireless link 411 may be a bi-directional link. The communication interface 407 in the wireless device 406 may also be configured to engage in communication with the communication interface 402 in the base station 401. The base station 401 and the wireless device 406 may be configured to send and receive data over the wireless link 411 using multiple frequency carriers. Base stations, wireless devices, and other communication devices may include structure and operations of transceiver(s). A transceiver is a device that includes both a transmitter and receiver. Transceivers may be employed in devices such as wireless devices, base stations, relay nodes, and/or the like. Examples for radio technology implemented in the communication interfaces 402, 407 and the wireless link 411 are shown in FIG. 1, FIG. 2, FIG. 3, FIG. 5, and associated text. The communication network 400 may comprise any number and/or type of devices, such as, for example, computing devices, wireless devices, mobile devices, handsets, tablets, laptops, internet of things (IoT) devices, hotspots, cellular repeaters, computing devices, and/or, more generally, user equipment (e.g., UE). Although one or more of the above types of devices may be referenced herein (e.g., UE, wireless device, computing device, etc.), it should be understood that any device herein may comprise any one or more of the above types of devices or similar devices. The communication network 400, and any other network referenced herein, may comprise an LTE network, a 5G network, or any other network for wireless communications. Apparatuses, systems, and/or methods described herein may generally be described as implemented on one or more devices (e.g., wireless device, base station, eNB, gNB, computing device, etc.), in one or more networks, but it will be understood that one or more features and steps may be implemented on any device and/or in any network. As used throughout, the term "base station" may comprise one or more of: a base station, a node, a Node B, a gNB, an eNB, an ng-eNB, a relay node (e.g., an integrated access and backhaul (IAB) node), a donor node (e.g., a donor eNB, a donor gNB, etc.), an access point (e.g., a WiFi access point), a computing device, a device capable of wirelessly communicating, or any other device capable of sending and/or receiving signals. As used throughout, the term "wireless device" may comprise one or more of a UE, a handset, a mobile device, a computing device, a node, a device capable of wirelessly communicating, or any other device capable of sending and/or receiving signals. Any reference to one or more of these terms/devices also considers use of any other term/device mentioned above.

The communications network 400 may comprise Radio Access Network (RAN) architecture. The RAN architecture may comprise one or more RAN nodes that may be a next generation Node B (gNB) (e.g., 401) or any other base station providing New Radio (NR) user plane and control plane protocol terminations towards a first wireless device (e.g. 406). A RAN node may be a next generation evolved Node B (ng-eNB), providing Evolved UMTS Terrestrial Radio Access (E-UTRA) user plane and control plane protocol terminations towards a second wireless device. The first wireless device may communicate with a base station over a Uu interface. The second wireless device may communicate with a ng-eNB over a Uu interface. Base station 401 may comprise one or more of a gNB, ng-eNB, and/or the like.

A base station may host functions such as: radio resource management and scheduling, IP header compression, encryption and integrity protection of data, selection of Access and Mobility Management Function (AMF) at wireless device attachment, routing of user plane and control plane data, connection setup and release, scheduling and transmission of paging messages (originated from the AMF), scheduling and transmission of system broadcast information (originated from the AMF or Operation and Maintenance (O&M)), measurement and measurement reporting configuration, transport level packet marking in the uplink, session management, support of network slicing, Quality of Service (QoS) flow management and mapping to data radio bearers, support of wireless devices in RRC_INACTIVE state, distribution function for Non-Access Stratum (NAS) messages, RAN sharing, and dual connectivity or tight interworking between NR and E-UTRA.

One or more base stations may be interconnected with each other by means of Xn interface. A base station may be connected by means of NG interfaces to 5G Core Network (5GC). 5GC may comprise one or more AMF/User Plane Function (UPF) functions. A base station may be connected to a UPF by means of an NG-User plane (NG-U) interface. The NG-U interface may provide delivery (e.g., non-guaranteed delivery) of user plane Protocol Data Units (PDUs) between a RAN node and the UPF. A base station may be connected to an AMF by means of an NG-Control plane (e.g., NG-C) interface. The NG-C interface may provide functions such as NG interface management, wireless device context management, wireless device mobility management, transport of NAS messages, paging, PDU session management, configuration transfer or warning message transmission.

A UPF may host functions such as anchor point for intra-/inter-Radio Access Technology (RAT) mobility (if applicable), external PDU session point of interconnect to data network, packet routing and forwarding, packet inspection and user plane part of policy rule enforcement, traffic usage reporting, uplink classifier to support routing traffic flows to a data network, branching point to support multihomed PDU session, QoS handling for user plane, e.g. packet filtering, gating, Uplink (UL)/Downlink (DL) rate enforcement, uplink traffic verification (e.g. Service Data Flow (SDF) to QoS flow mapping), downlink packet buffering and/or downlink data notification triggering.

An AMF may host functions such as NAS signaling termination, NAS signaling security, Access Stratum (AS) security control, inter Core Network (CN) node signaling for mobility between $3^{rd}$ Generation Partnership Project (3GPP) access networks, idle mode wireless device reachability (e.g., control and execution of paging retransmission), registration area management, support of intra-system and inter-system mobility, access authentication, access authorization including check of roaming rights, mobility management control (subscription and policies), support of network slicing and/or Session Management Function (SMF) selection.

An interface may be a hardware interface, a firmware interface, a software interface, and/or a combination thereof. The hardware interface may include connectors, wires, electronic devices such as drivers, amplifiers, and/or the like. A software interface may include code stored in a memory device to implement protocol(s), protocol layers, communication drivers, device drivers, combinations thereof, and/or the like. A firmware interface may include a combination of embedded hardware and code stored in and/or in communication with a memory device to implement connections, electronic device operations, protocol(s), protocol layers, communication drivers, device drivers, hardware operations, combinations thereof, and/or the like.

The term configured may relate to the capacity of a device whether the device is in an operational or a non-operational state. Configured may also refer to specific settings in a device that effect the operational characteristics of the device whether the device is in an operational or a non-operational state. In other words, the hardware, software, firmware, registers, memory values, and/or the like may be "configured" within a device, whether the device is in an operational or a nonoperational state, to provide the device with specific characteristics. Terms such as "a control message to cause in a device" may mean that a control message has parameters that may be used to configure specific characteristics in the device, whether the device is in an operational or a non-operational state.

A network may include a multitude of base stations, providing a user plane NR PDCP/NR RLC/NR MAC/NR PHY and control plane (e.g., NR RRC) protocol terminations towards the wireless device. The base station(s) may be interconnected with other base station(s) (e.g., employing an Xn interface). The base stations may also be connected employing, for example, an NG interface to an NGC. FIG. 10A and FIG. 10B show examples for interfaces between a 5G core network (e.g., NGC) and base stations (e.g., gNB and eLTE eNB). For example, the base stations may be interconnected to the NGC control plane (e.g., NG CP) employing the NG-C interface and to the NGC user plane (e.g., UPGW) employing the NG-U interface. The NG interface may support a many-to-many relation between 5G core networks and base stations.

A base station may include many sectors, for example: 1, 2, 3, 4, or 6 sectors. A base station may include many cells, for example, ranging from 1 to 50 cells or more. A cell may be categorized, for example, as a primary cell or secondary cell. At RRC connection establishment/re-establishment/handover, one serving cell may provide the NAS (non-access stratum) mobility information (e.g., TAI), and at RRC connection re-establishment/handover, one serving cell may provide the security input. This cell may be referred to as the Primary Cell (PCell). In the downlink, the carrier corresponding to the PCell may be the Downlink Primary Component Carrier (DL PCC); in the uplink, the carrier corresponding to the PCell may be the Uplink Primary Component Carrier (UL PCC). Depending on wireless device capabilities, Secondary Cells (SCells) may be configured to form together with the PCell a set of serving cells. In the downlink, the carrier corresponding to an SCell may be a Downlink Secondary Component Carrier (DL SCC); in the uplink, the carrier corresponding to an SCell may be an Uplink Secondary Component Carrier (UL SCC). An SCell may or may not have an uplink carrier.

A cell, comprising a downlink carrier and optionally an uplink carrier, may be assigned a physical cell ID and a cell index. A carrier (downlink or uplink) may belong to only one cell. The cell ID or cell index may also identify the downlink carrier or uplink carrier of the cell (depending on the context in which it is used). The cell ID may be equally referred to a carrier ID, and cell index may be referred to carrier index. In implementation, the physical cell ID or cell index may be assigned to a cell. A cell ID may be determined using a synchronization signal transmitted on a downlink carrier. A cell index may be determined using RRC messages. For example, reference to a first physical cell ID for a first downlink carrier may indicate that the first physical cell ID is for a cell comprising the first downlink carrier. The same concept may apply to, for example, carrier activation. Reference to a first carrier that is activated may indicate that the cell comprising the first carrier is activated.

A device may be configured to operate as needed by freely combining any of the examples. The disclosed mechanisms may be performed if certain criteria are met, for example, in a wireless device, a base station, a radio environment, a network, a combination of the above, and/or the like. Example criteria may be based, at least in part, on for example, traffic load, initial system set up, packet sizes, traffic characteristics, a combination of the above, and/or the like. One or more criteria may be satisfied. It may be possible to implement examples that selectively implement disclosed protocols.

A base station may communicate with a variety of wireless devices. Wireless devices may support multiple technologies, and/or multiple releases of the same technology. Wireless devices may have some specific capability(ies) depending on its wireless device category and/or capability (ies). A base station may comprise multiple sectors. Reference to a base station communicating with a plurality of wireless devices may indicate that a base station may communicate with a subset of the total wireless devices in a coverage area. A plurality of wireless devices of a given LTE or 5G release, with a given capability and in a given sector of the base station, may be used. The plurality of wireless devices may refer to a selected plurality of wireless devices, and/or a subset of total wireless devices in a coverage area which perform according to disclosed methods, and/or the like. There may be a plurality of wireless devices in a coverage area that may not comply with the disclosed methods, for example, because those wireless devices perform based on older releases of LTE or 5G technology.

A base station may transmit (e.g., to a wireless device) one or more messages (e.g. RRC messages) that may comprise a plurality of configuration parameters for one or more cells. One or more cells may comprise at least one primary cell and at least one secondary cell. An RRC message may be broadcasted or unicasted to the wireless device. Configuration parameters may comprise common parameters and dedicated parameters.

Services and/or functions of an RRC sublayer may comprise at least one of: broadcast of system information related to AS and NAS; paging initiated by 5GC and/or NG-RAN; establishment, maintenance, and/or release of an RRC connection between a wireless device and NG-RAN, which may comprise at least one of addition, modification and release of carrier aggregation; or addition, modification, and/or release of dual connectivity in NR or between E-UTRA and NR. Services and/or functions of an RRC sublayer may further comprise at least one of security functions comprising key management; establishment, configuration, maintenance, and/or release of Signaling Radio Bearers (SRBs) and/or Data Radio Bearers (DRBs); mobility functions which may comprise at least one of a handover (e.g. intra NR mobility or inter-RAT mobility) and a context transfer; or a wireless device cell selection and reselection and control of cell selection and reselection. Services and/or functions of an RRC sublayer may further comprise at least one of QoS management functions; a wireless device measurement configuration/reporting; detection of and/or recovery from radio link failure; or NAS message transfer to/from a core network entity (e.g. AMF, Mobility Management Entity (MME)) from/to the wireless device.

An RRC sublayer may support an RRC_Idle state, an RRC_Inactive state and/or an RRC_Connected state for a wireless device. In an RRC_Idle state, a wireless device may perform at least one of: Public Land Mobile Network (PLMN) selection; receiving broadcasted system information; cell selection/re-selection; monitoring/receiving a paging for mobile terminated data initiated by 5GC; paging for mobile terminated data area managed by 5GC; or DRX for CN paging configured via NAS. In an RRC_Inactive state, a wireless device may perform at least one of: receiving broadcasted system information; cell selection/re-selection; monitoring/receiving a RAN/CN paging initiated by NG-RAN/5GC; RAN-based notification area (RNA) managed by NG-RAN; or DRX for RAN/CN paging configured by NG-RAN/NAS. In an RRC_Idle state of a wireless device, a base station (e.g. NG-RAN) may keep a 5GC-NG-RAN connection (both C/U-planes) for the wireless device; and/or store a wireless device AS context for the wireless device. In an RRC_Connected state of a wireless device, a base station (e.g. NG-RAN) may perform at least one of: establishment of 5GC-NG-RAN connection (both C/U-planes) for the wireless device; storing a wireless device AS context for the wireless device; transmit/receive of unicast data to/from the wireless device; or network-controlled mobility based on measurement results received from the wireless device. In an RRC_Connected state of a wireless device, an NG-RAN may know a cell that the wireless device belongs to.

System information (SI) may be divided into minimum SI and other SI. The minimum SI may be periodically broadcast. The minimum SI may comprise basic information required for initial access and information for acquiring any other SI broadcast periodically or provisioned on-demand, i.e. scheduling information. The other SI may either be broadcast, or be provisioned in a dedicated manner, either triggered by a network or upon request from a wireless device. A minimum SI may be transmitted via two different downlink channels using different messages (e.g. MasterInformationBlock and SystemInformationBlockType1). The other SI may be transmitted via SystemInformationBlockType2. For a wireless device in an RRC_Connected state, dedicated RRC signaling may be employed for the request and delivery of the other SI. For the wireless device in the RRC_Idle state and/or the RRC_Inactive state, the request may trigger a random-access procedure.

A wireless device may send its radio access capability information which may be static. A base station may request what capabilities for a wireless device to report based on band information. If allowed by a network, a temporary capability restriction request may be sent by the wireless device to signal the limited availability of some capabilities (e.g. due to hardware sharing, interference or overheating) to the base station. The base station may confirm or reject the request. The temporary capability restriction may be transparent to 5GC (e.g., static capabilities may be stored in 5GC).

If CA is configured, a wireless device may have an RRC connection with a network. At RRC connection establishment/re-establishment/handover procedure, one serving cell may provide NAS mobility information, and at RRC connection re-establishment/handover, one serving cell may provide a security input. This cell may be referred to as the PCell. Depending on the capabilities of the wireless device, SCells may be configured to form together with the PCell a set of serving cells. The configured set of serving cells for the wireless device may comprise one PCell and one or more SCells.

The reconfiguration, addition and removal of SCells may be performed by RRC. At intra-NR handover, RRC may also add, remove, or reconfigure SCells for usage with the target PCell. If adding a new SCell, dedicated RRC signaling may be employed to send all required system information of the SCell. In connected mode, wireless devices may not need to acquire broadcasted system information directly from the SCells.

An RRC connection reconfiguration procedure may be used to modify an RRC connection, (e.g. to establish, modify and/or release RBs, to perform handover, to setup, modify, and/or release measurements, to add, modify, and/or release SCells and cell groups). As part of the RRC connection reconfiguration procedure, NAS dedicated information may be transferred from the network to the wireless device. The RRCConnectionReconfiguration message may be a command to modify an RRC connection. It may convey information for measurement configuration, mobility control, radio resource configuration (e.g. RBs, MAC main configuration and physical channel configuration) comprising any associated dedicated NAS information and security configuration. If the received RRC Connection Reconfiguration message includes the sCellToReleaseList, the wireless device may perform an SCell release. If the received RRC Connection Reconfiguration message includes the sCellToAddModList, the wireless device may perform SCell additions or modification.

An RRC connection establishment (or reestablishment, resume) procedure may be used to establish (or reestablish, resume) an RRC connection. An RRC connection establishment procedure may comprise SRB1 establishment. The RRC connection establishment procedure may be used to transfer the initial NAS dedicated information message from a wireless device to E-UTRAN. The RRCConnectionReestablishment message may be used to re-establish SRB1.

A measurement report procedure may be to transfer measurement results from a wireless device to NG-RAN. The wireless device may initiate a measurement report procedure, e.g., after successful security activation. A measurement report message may be employed to transmit measurement results.

FIG. 5A, FIG. 5B, FIG. 5C, and FIG. 5D show examples of architecture for uplink and downlink signal transmission. FIG. 5A shows an example of an uplink physical channel. The baseband signal representing the physical uplink shared channel may be processed according to the following processes, which may be performed by structures described below. These structures and corresponding functions are shown as examples, however, it is anticipated that other structures and/or functions may be implemented in various examples. The structures and corresponding functions may comprise, e.g., one or more scrambling devices 501A and 501B configured to perform scrambling of coded bits in each of the codewords to be transmitted on a physical channel; one or more modulation mappers 502A and 502B configured to perform modulation of scrambled bits to generate complex-valued symbols; a layer mapper 503 configured to perform mapping of the complex-valued modulation symbols onto one or several transmission layers; one or more transform precoders 504A and 504B to generate complex-valued symbols; a precoding device 505 configured to perform precoding of the complex-valued symbols; one or more resource element mappers 506A and 506B configured to perform mapping of precoded complex-valued symbols to resource elements; one or more signal generators 507A and 507B configured to perform the generation of a complex-valued time-domain DFTS-OFDM/SC-FDMA signal for each antenna port; and/or the like.

FIG. 5B shows an example of performing modulation and up-conversion to the carrier frequency of the complex-valued DFTS-OFDM/SC-FDMA baseband signal, e.g., for each antenna port and/or for the complex-valued physical random access channel (PRACH) baseband signal. For example, the baseband signal, represented as $s_l(t)$, may be split, by a signal splitter 510, into real and imaginary components, $Re\{s_l(t)\}$ and $Im\{s_l(t)\}$, respectively. The real component may be modulated by a modulator 511A, and the imaginary component may be modulated by a modulator 511B. The output signal of the modulator 511A and the output signal of the modulator 511B may be mixed by a mixer 512. The output signal of the mixer 512 may be input to a filtering device 513, and filtering may be employed by the filtering device 513 prior to transmission.

FIG. 5C shows an example structure for downlink transmissions. The baseband signal representing a downlink physical channel may be processed by the following processes, which may be performed by structures described below. These structures and corresponding functions are shown as examples, however, it is anticipated that other structures and/or functions may be implemented in various examples. The structures and corresponding functions may comprise, e.g., one or more scrambling devices 531A and 531B configured to perform scrambling of coded bits in each of the codewords to be transmitted on a physical channel; one or more modulation mappers 532A and 532B configured to perform modulation of scrambled bits to generate complex-valued modulation symbols; a layer mapper 533 configured to perform mapping of the complex-valued modulation symbols onto one or several transmission layers; a precoding device 534 configured to perform precoding of the complex-valued modulation symbols on each layer for transmission on the antenna ports; one or more resource element mappers 535A and 535B configured to perform mapping of complex-valued modulation symbols for each antenna port to resource elements; one or more OFDM signal generators 536A and 536B configured to perform the generation of complex-valued time-domain OFDM signal for each antenna port; and/or the like.

FIG. 5D shows an example structure for modulation and up-conversion to the carrier frequency of the complex-valued OFDM baseband signal for each antenna port. For example, the baseband signal, represented as $s_l^{(p)}(t)$, may be split, by a signal splitter 520, into real and imaginary components, $Re\{s_l^{(p)}(t)\}$ and $Im\{s_l^{(p)}(t)\}$, respectively. The real component may be modulated by a modulator 521A, and the imaginary component may be modulated by a modulator 521B. The output signal of the modulator 521A and the output signal of the modulator 521B may be mixed by a mixer 522. The output signal of the mixer 522 may be input to a filtering device 523, and filtering may be employed by the filtering device 523 prior to transmission.

Figure 6:
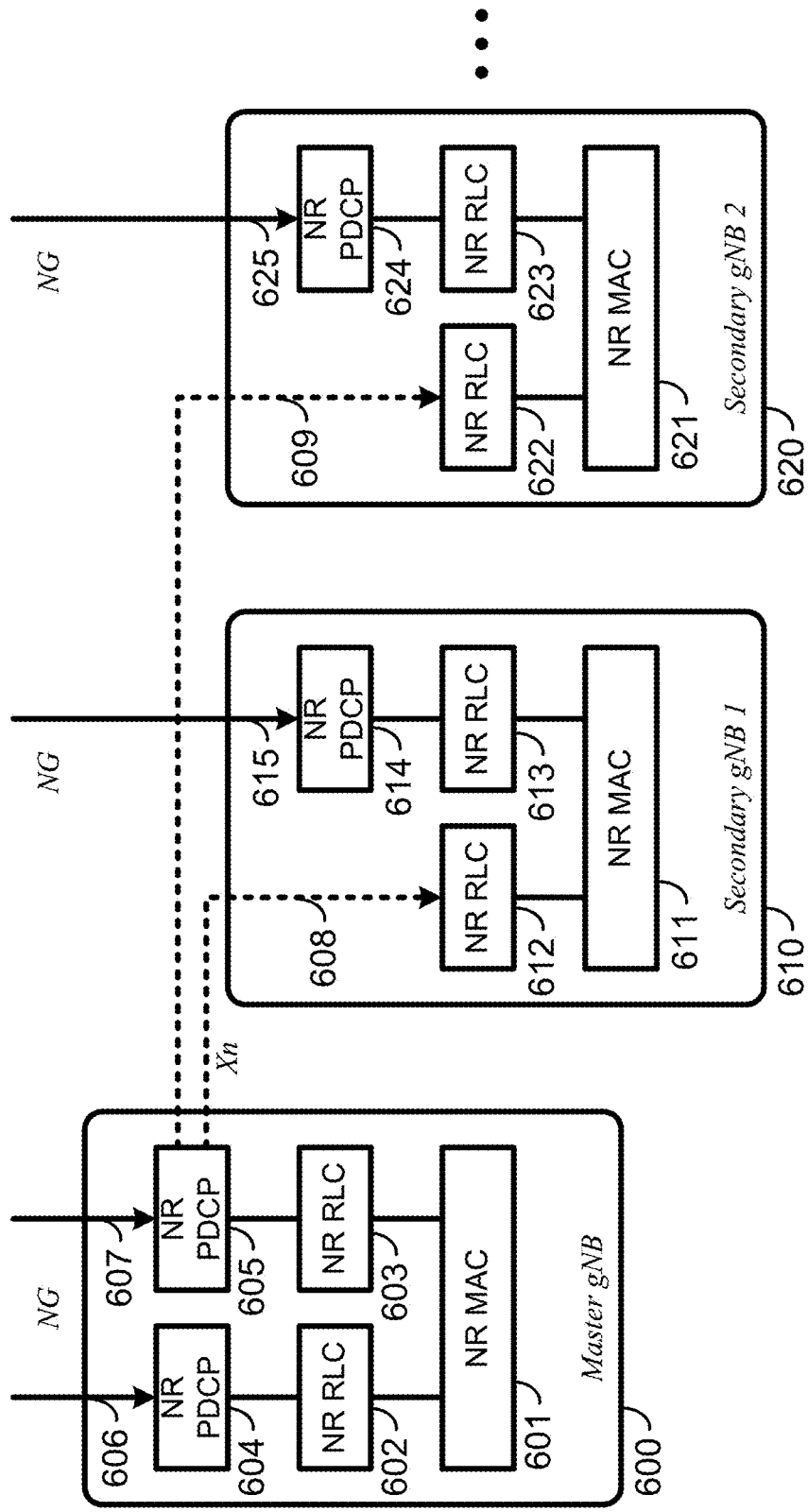
FIG. 6 shows an example protocol structure with multi-connectivity.
Figure 7:
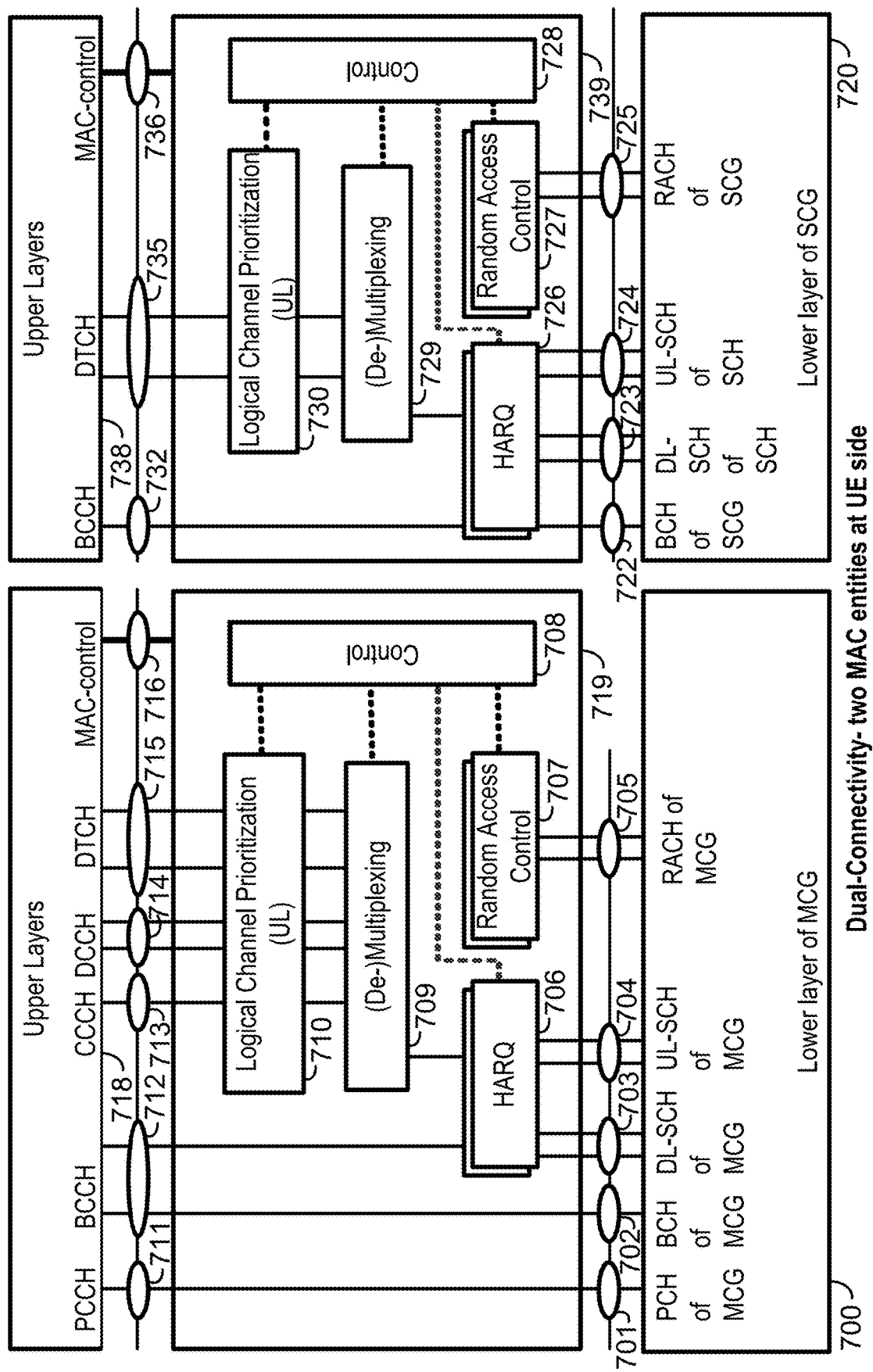
FIG. 7 shows an example protocol structure with carrier aggregation (CA) and dual connectivity (DC).

FIG. 6 and FIG. 7 show examples for protocol structures with CA and multi-connectivity. NR may support multi-connectivity operation, whereby a multiple receiver/transmitter (RX/TX) wireless device in RRC_CONNECTED may be configured to utilize radio resources provided by multiple schedulers located in multiple base stations connected via non-ideal or ideal backhaul over the Xn interface. Base stations involved in multi-connectivity for a certain wireless device may assume two different roles: a base station may either act as a master base station (e.g., 600) or as a secondary base station (e.g., 610 or 620). In multi-connectivity, a wireless device may be connected to one master base station (e.g., 600) and one or more secondary base stations (e.g., 610 and/or 620). Any one or more of the Master base station 600 and/or the secondary base stations 610 and 620 may be a Next Generation (NG) NodeB. The master base station 600 may comprise protocol layers NR MAC 601, NR RLC 602 and 603, and NR PDCP 604 and 605. The secondary base station may comprise protocol layers NR MAC 611, NR RLC 612 and 613, and NR PDCP 614. The secondary base station may comprise protocol layers NR MAC 621, NR RLC 622 and 623, and NR PDCP 624. The master base station 600 may communicate via an interface 606 and/or via an interface 607, the secondary base station 610 may communicate via an interface 615, and the secondary base station 620 may communicate via an interface 625. The master base station 600 may also communicate with the secondary base station 610 and the secondary base station 621 via interfaces 608 and 609, respectively, which may include Xn interfaces. For example, the master base station 600 may communicate via the interface 608, at layer NR PDCP 605, and with the secondary base station 610 at layer NR RLC 612. The master base station 600 may communicate via the interface 609, at layer NR PDCP 605, and with the secondary base station 620 at layer NR RLC 622.

FIG. 7 shows an example structure for the wireless device side MAC entities, e.g., if a Master Cell Group (MCG) and a Secondary Cell Group (SCG) are configured. Media Broadcast Multicast Service (MBMS) reception may be included but is not shown in this figure for simplicity.

In multi-connectivity, the radio protocol architecture that a particular bearer uses may depend on how the bearer is set up. As an example, three alternatives may exist, an MCG bearer, an SCG bearer, and a split bearer, such as shown in FIG. 6. NR RRC may be located in a master base station and SRBs may be configured as a MCG bearer type and may use the radio resources of the master base station. Multi-connectivity may have at least one bearer configured to use radio resources provided by the secondary base station. Multi-connectivity may or may not be configured or implemented.

For multi-connectivity, the wireless device may be configured with multiple NR MAC entities: e.g., one NR MAC entity for a master base station, and other NR MAC entities for secondary base stations. In multi-connectivity, the configured set of serving cells for a wireless device may comprise two subsets: e.g., the Master Cell Group (MCG) including the serving cells of the master base station, and the Secondary Cell Groups (SCGs) including the serving cells of the secondary base stations.

At least one cell in a SCG may have a configured UL component carrier (CC) and one of the UL CCs, e.g., named PSCell (or PCell of SCG, or sometimes called PCell), may be configured with PUCCH resources. If the SCG is configured, there may be at least one SCG bearer or one split bearer. If a physical layer problem or a random access problem on a PSCell occurs or is detected, if the maximum number of NR RLC retransmissions has been reached associated with the SCG, or if an access problem on a PSCell during a SCG addition or a SCG change occurs or is detected, then an RRC connection re-establishment procedure may not be triggered, UL transmissions towards cells of the SCG may be stopped, a master base station may be informed by the wireless device of a SCG failure type, and for a split bearer the DL data transfer over the master base station may be maintained. The NR RLC Acknowledge Mode (AM) bearer may be configured for the split bearer. Like the PCell, a PSCell may not be de-activated. The PSCell may be changed with an SCG change (e.g., with a security key change and a RACH procedure). A direct bearer type may change between a split bearer and an SCG bearer, or a simultaneous configuration of an SCG and a split bearer may or may not be supported.

A master base station and secondary base stations may interact for multi-connectivity. The master base station may maintain the RRM measurement configuration of the wireless device, and the master base station may, (e.g., based on received measurement reports, and/or based on traffic conditions and/or bearer types), decide to ask a secondary base station to provide additional resources (e.g., serving cells) for a wireless device. If a request from the master base station is received, a secondary base station may create a container that may result in the configuration of additional serving cells for the wireless device (or the secondary base station decide that it has no resource available to do so). For wireless device capability coordination, the master base station may provide some or all of the Active Set (AS) configuration and the wireless device capabilities to the secondary base station. The master base station and the secondary base station may exchange information about a wireless device configuration, such as by employing NR RRC containers (e.g., inter-node messages) carried in Xn messages. The secondary base station may initiate a reconfiguration of its existing serving cells (e.g., PUCCH towards the secondary base station). The secondary base station may decide which cell is the PSCell within the SCG. The master base station may or may not change the content of the NR RRC configuration provided by the secondary base station. In an SCG addition and an SCG SCell addition, the master base station may provide the latest measurement results for the SCG cell(s). Both a master base station and a secondary base stations may know the system frame number (SFN) and subframe offset of each other by operations, administration, and maintenance (OAM) (e.g., for the purpose of discontinuous reception (DRX) alignment and identification of a measurement gap). If adding a new SCG SCell, dedicated NR RRC signaling may be used for sending required system information of the cell for CA, except, e.g., for the SFN acquired from an MIB of the PSCell of an SCG.

FIG. 7 shows an example of dual-connectivity (DC) for two MAC entities at a wireless device side. A first MAC entity may comprise a lower layer of an MCG 700, an upper layer of an MCG 718, and one or more intermediate layers of an MCG 719. The lower layer of the MCG 700 may comprise, e.g., a paging channel (PCH) 701, a broadcast channel (BCH) 702, a downlink shared channel (DL-SCH) 703, an uplink shared channel (UL-SCH) 704, and a random access channel (RACH) 705. The one or more intermediate layers of the MCG 719 may comprise, e.g., one or more hybrid automatic repeat request (HARQ) processes 706, one or more random access control processes 707, multiplexing and/or de-multiplexing processes 709, logical channel prioritization on the uplink processes 710, and a control processes 708 providing control for the above processes in the one or more intermediate layers of the MCG 719. The upper layer of the MCG 718 may comprise, e.g., a paging control channel (PCCH) 711, a broadcast control channel (BCCH) 712, a common control channel (CCCH) 713, a dedicated control channel (DCCH) 714, a dedicated traffic channel (DTCH) 715, and a MAC control 716.

A second MAC entity may comprise a lower layer of an SCG 720, an upper layer of an SCG 738, and one or more intermediate layers of an SCG 739. The lower layer of the SCG 720 may comprise, e.g., a BCH 722, a DL-SCH 723, an UL-SCH 724, and a RACH 725. The one or more intermediate layers of the SCG 739 may comprise, e.g., one or more HARQ processes 726, one or more random access control processes 727, multiplexing and/or de-multiplexing processes 729, logical channel prioritization on the uplink processes 730, and a control processes 728 providing control for the above processes in the one or more intermediate layers of the SCG 739. The upper layer of the SCG 738 may comprise, e.g., a BCCH 732, a DCCH 714, a DTCH 735, and a MAC control 736.

Serving cells may be grouped in a TA group (TAG). Serving cells in one TAG may use the same timing reference. For a given TAG, a wireless device may use at least one downlink carrier as a timing reference. For a given TAG, a wireless device may synchronize uplink subframe and frame transmission timing of uplink carriers belonging to the same TAG. Serving cells having an uplink to which the same TA uses may correspond to serving cells hosted by the same receiver. A wireless device supporting multiple TAs may support two or more TA groups. One TA group may include the PCell and may be called a primary TAG (pTAG). In a multiple TAG configuration, at least one TA group may not include the PCell and may be called a secondary TAG (sTAG). Carriers within the same TA group may use the same TA value and/or the same timing reference. If DC is configured, cells belonging to a cell group (e.g., MCG or SCG) may be grouped into multiple TAGs including a pTAG and one or more sTAGs.

FIG. 8 shows example TAG configurations. In Example 1, a pTAG comprises a PCell, and an sTAG comprises an SCell1. In Example 2, a pTAG comprises a PCell and an SCell1, and an sTAG comprises an SCell2 and an SCell3. In Example 3, a pTAG comprises a PCell and an SCell1, and an sTAG1 comprises an SCell2 and an SCell3, and an sTAG2 comprises a SCell4. Up to four TAGs may be supported in a cell group (MCG or SCG), and other example TAG configurations may also be provided. In various examples, structures and operations are described for use with a pTAG and an sTAG. Some of the examples may be used for configurations with multiple sTAGs.

An eNB may initiate an RA procedure, via PDCCH order, for an activated SCell. The PDCCH order may be sent on a scheduling cell of this SCell. If cross carrier scheduling is configured for a cell, the scheduling cell may be different than the cell that is employed for preamble transmission, and the PDCCH order may include an SCell index. At least a non-contention based RA procedure may be supported for SCell(s) assigned to sTAG(s).

Figure 9:
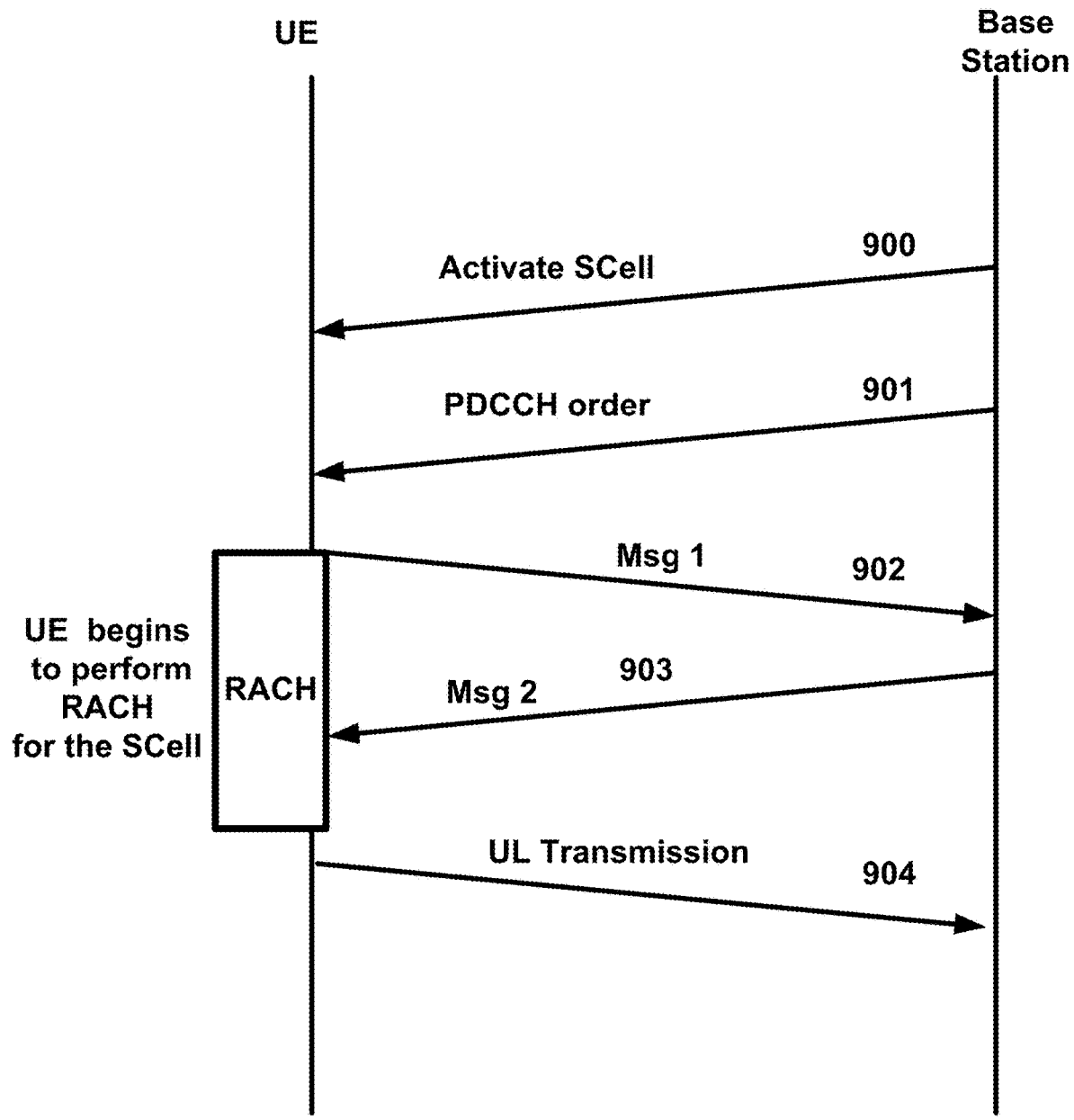
FIG. 9 shows example message flow in a random access process in a secondary TAG.

FIG. 9 shows an example of random access processes, and a corresponding message flow, in a secondary TAG. A base station, such as an eNB, may transmit an activation command 900 to a wireless device, such as a UE. The activation command 900 may be transmitted to activate an SCell. The base station may also transmit a PDDCH order 901 to the wireless device, which may be transmitted, e.g., after the activation command 900. The wireless device may begin to perform a RACH process for the SCell, which may be initiated, e.g., after receiving the PDDCH order 901. A wireless device may transmit to the base station (e.g., as part of a RACH process) a preamble 902 (e.g., Msg1), such as a random access preamble (RAP). The preamble 902 may be transmitted based on the PDCCH order 901. The wireless device may transmit the preamble 902 via an SCell belonging to an sTAG. Preamble transmission for SCells may be controlled by a network using PDCCH format 1A. The base station may send a random access response (RAR) 903 (e.g., Msg2 message) to the wireless device. The RAR 903 may be based on the preamble 902 transmission via the SCell. The RAR 903 may be addressed to a random access radio network temporary identifier (RA-RNTI) in a PCell common search space (CSS). If the wireless device receives the RAR 903, the RACH process may conclude. The RACH process may conclude, e.g., after or based on the wireless device receiving the RAR 903 from the base station. After the RACH process, the wireless device may transmit an uplink transmission 904. The uplink transmission 904 may comprise uplink packets transmitted via the same SCell used for the preamble 902 transmission.

Timing alignment (e.g., initial timing alignment) for communications between the wireless device and the base station may be performed through a random access procedure, such as described above regarding FIG. 9. The random access procedure may involve a wireless device, such as a UE, transmitting a random access preamble and a base station, such as an eNB, responding with an initial TA command NTA (amount of timing advance) within a random access response window. The start of the random access preamble may be aligned with the start of a corresponding uplink subframe at the wireless device assuming NTA=0. The eNB may estimate the uplink timing from the random access preamble transmitted by the wireless device. The TA command may be derived by the eNB based on the estimation of the difference between the desired UL timing and the actual UL timing. The wireless device may determine the initial uplink transmission timing relative to the corresponding downlink of the sTAG on which the preamble is transmitted.

The mapping of a serving cell to a TAG may be configured by a serving eNB with RRC signaling. The mechanism for TAG configuration and reconfiguration may be based on RRC signaling. If an eNB performs an SCell addition configuration, the related TAG configuration may be configured for the SCell. An eNB may modify the TAG configuration of an SCell by removing (e.g., releasing) the SCell and adding (e.g., configuring) a new SCell (with the same physical cell ID and frequency) with an updated TAG ID. The new SCell with the updated TAG ID may initially be inactive subsequent to being assigned the updated TAG ID. The eNB may activate the updated new SCell and start scheduling packets on the activated SCell. In some examples, it may not be possible to change the TAG associated with an SCell, but rather, the SCell may need to be removed and a new SCell may need to be added with another TAG. For example, if there is a need to move an SCell from an sTAG to a pTAG, at least one RRC message, such as at least one RRC reconfiguration message, may be sent to the wireless device. The at least one RRC message may be sent to the wireless device to reconfigure TAG configurations, e.g., by releasing the SCell and configuring the SCell as a part of the pTAG. If, e.g., an SCell is added or configured without a TAG index, the SCell may be explicitly assigned to the pTAG. The PCell may not change its TA group and may be a member of the pTAG.

In LTE Release-10 and Release-11 CA, a PUCCH transmission is only transmitted on a PCell (e.g., a PSCell) to an eNB. In LTE-Release 12 and earlier, a wireless device may transmit PUCCH information on one cell (e.g., a PCell or a PSCell) to a given eNB. As the number of CA capable wireless devices increase, and as the number of aggregated carriers increase, the number of PUCCHs and the PUCCH payload size may increase. Accommodating the PUCCH transmissions on the PCell may lead to a high PUCCH load on the PCell. A PUCCH on an SCell may be used to offload the PUCCH resource from the PCell. More than one PUCCH may be configured. For example, a PUCCH on a PCell may be configured and another PUCCH on an SCell may be configured. One, two, or more cells may be configured with PUCCH resources for transmitting CSI, acknowledgment (ACK), and/or non-acknowledgment (NACK) to a base station. Cells may be grouped into multiple PUCCH groups, and one or more cell within a group may be configured with a PUCCH. In some examples, one SCell may belong to one PUCCH group. SCells with a configured PUCCH transmitted to a base station may be called a PUCCH SCell, and a cell group with a common PUCCH resource transmitted to the same base station may be called a PUCCH group.

A MAC entity may have a configurable timer, e.g., timeAlignmentTimer, per TAG. The timeAlignmentTimer may be used to control how long the MAC entity considers the serving cells belonging to the associated TAG to be uplink time aligned. If a Timing Advance Command MAC control element is received, the MAC entity may use the Timing Advance Command for the indicated TAG; and/or the MAC entity may start or restart the timeAlignmentTimer associated with a TAG that may be indicated by the Timing Advance Command MAC control element. If a Timing Advance Command is received in a Random Access Response message for a serving cell belonging to a TAG, the MAC entity may use the Timing Advance Command for this TAG and/or start or restart the timeAlignmentTimer associated with this TAG. Additionally or alternatively, if the Random Access Preamble is not selected by the MAC entity, the MAC entity may use the Timing Advance Command for this TAG and/or start or restart the timeAlignmentTimer associated with this TAG. If the timeAlignmentTimer associated with this TAG is not running, the Timing Advance Command for this TAG may be used, and the timeAlignmentTimer associated with this TAG may be started. If the contention resolution is not successful, a timeAlignmentTimer associated with this TAG may be stopped. If the contention resolution is successful, the MAC entity may ignore the received Timing Advance Command. The MAC entity may determine whether the contention resolution is successful or whether the contention resolution is not successful.

FIG. 10A and FIG. 10B show examples for interfaces between a 5G core network (e.g., NGC) and base stations (e.g., gNB and eLTE eNB). A base station, such as a gNB 1020, may be interconnected to an NGC 1010 control plane employing an NG-C interface. The base station, e.g., the gNB 1020, may also be interconnected to an NGC 1010 user plane (e.g., UPGW) employing an NG-U interface. As another example, a base station, such as an eLTE eNB 1040, may be interconnected to an NGC 1030 control plane employing an NG-C interface. The base station, e.g., the eLTE eNB 1040, may also be interconnected to an NGC 1030 user plane (e.g., UPGW) employing an NG-U interface. An NG interface may support a many-to-many relation between 5G core networks and base stations.

FIG. 11A, FIG. 11B, FIG. 11C, FIG. 11D, FIG. 11E, and FIG. 11F are examples for architectures of tight interworking between a 5G RAN and an LTE RAN. The tight interworking may enable a multiple receiver/transmitter (RX/TX) wireless device in an RRC_CONNECTED state to be configured to utilize radio resources provided by two schedulers located in two base stations (e.g., an eLTE eNB and a base station). The two base stations may be connected via non-ideal or ideal backhaul over the Xx interface between an LTE eNB and a gNB, or over the Xn interface between an eLTE eNB and a gNB. Base stations involved in tight interworking for a certain wireless device may assume different roles. For example, a base station may act as a master base station or a base station may act as a secondary base station. In tight interworking, a wireless device may be connected to both a master base station and a secondary base station. Mechanisms implemented in tight interworking may be extended to cover more than two base stations.

A master base station may be an LTE eNB 1102A or an LTE eNB 1102B, which may be connected to EPC nodes 1101A or 1101B, respectively. This connection to EPC nodes may be, e.g., to an MME via the S1-C interface and/or to an S-GW via the S1-U interface. A secondary base station may be a gNB 1103A or a gNB 1103B, either or both of which may be a non-standalone node having a control plane connection via an Xx-C interface to an LTE eNB (e.g., the LTE eNB 1102A or the LTE eNB 1102B). In the tight interworking architecture of FIG. 11A, a user plane for a base station (e.g., the gNB 1103A) may be connected to an S-GW (e.g., the EPC 1101A) through an LTE eNB (e.g., the LTE eNB 1102A), via an Xx-U interface between the LTE eNB and the gNB, and via an S1-U interface between the LTE eNB and the S-GW. In the architecture of FIG. 11B, a user plane for a base station (e.g., the gNB 1103B) may be connected directly to an S-GW (e.g., the EPC 1101B) via an S1-U interface between the base station and the S-GW.

A master base station may be a gNB 1103C or a gNB 1103D, which may be connected to NGC nodes 1101C or 1101D, respectively. This connection to NGC nodes may be, e.g., to a control plane core node via the NG-C interface and/or to a user plane core node via the NG-U interface. A secondary base station may be an eLTE eNB 1102C or an eLTE eNB 1102D, either or both of which may be a non-standalone node having a control plane connection via an Xn-C interface to a base station (e.g., the gNB 1103C or the gNB 1103D). In the tight interworking architecture of FIG. 11C, a user plane for an eLTE eNB (e.g., the eLTE eNB 1102C) may be connected to a user plane core node (e.g., the NGC 1101C) through a base station (e.g., the gNB 1103C), via an Xn-U interface between the eLTE eNB and the gNB, and via an NG-U interface between the gNB and the user plane core node. In the architecture of FIG. 11D, a user plane for an eLTE eNB (e.g., the eLTE eNB 1102D) may be connected directly to a user plane core node (e.g., the NGC 1101D) via an NG-U interface between the eLTE eNB and the user plane core node.

A master base station may be an eLTE eNB 1102E or an eLTE eNB 1102F, which may be connected to NGC nodes 1101E or 1101F, respectively. This connection to NGC nodes may be, e.g., to a control plane core node via the NG-C interface and/or to a user plane core node via the NG-U interface. A secondary base station may be a gNB 1103E or a gNB 1103F, either or both of which may be a non-standalone node having a control plane connection via an Xn-C interface to an eLTE eNB (e.g., the eLTE eNB 1102E or the eLTE eNB 1102F). In the tight interworking architecture of FIG. 11E, a user plane for a base station (e.g., the gNB 1103E) may be connected to a user plane core node (e.g., the NGC 1101E) through an eLTE eNB (e.g., the eLTE eNB 1102E), via an Xn-U interface between the eLTE eNB and the gNB, and via an NG-U interface between the eLTE eNB and the user plane core node. In the architecture of FIG. 11F, a user plane for a base station (e.g., the gNB 1103F) may be connected directly to a user plane core node (e.g., the NGC 1101F) via an NG-U interface between the base station and the user plane core node.

FIG. 12A, FIG. 12B, and FIG. 12C are examples for radio protocol structures of tight interworking bearers.

An LTE eNB 1201A may be an S1 master base station, and a gNB 1210A may be an S1 secondary base station. An example of a radio protocol architecture for a split bearer and an SCG bearer is shown. The LTE eNB 1201A may be connected to an EPC with a non-standalone gNB 1210A, via an Xx interface between the PDCP 1206A and an NR RLC 1212A. The LTE eNB 1201A may include protocol layers MAC 1202A, RLC 1203A and RLC 1204A, and PDCP 1205A and PDCP 1206A. An MCG bearer type may interface with the PDCP 1205A, and a split bearer type may interface with the PDCP 1206A. The gNB 1210A may include protocol layers NR MAC 1211A, NR RLC 1212A and NR RLC 1213A, and NR PDCP 1214A. An SCG bearer type may interface with the NR PDCP 1214A.

A gNB 1201B may be an NG master base station, and an eLTE eNB 1210B may be an NG secondary base station. An example of a radio protocol architecture for a split bearer and an SCG bearer is shown. The gNB 1201B may be connected to an NGC with a non-standalone eLTE eNB 1210B, via an Xn interface between the NR PDCP 1206B and an RLC 1212B. The gNB 1201B may include protocol layers NR MAC 1202B, NR RLC 1203B and NR RLC 1204B, and NR PDCP 1205B and NR PDCP 1206B. An MCG bearer type may interface with the NR PDCP 1205B, and a split bearer type may interface with the NR PDCP 1206B. The eLTE eNB 1210B may include protocol layers MAC 1211B, RLC 1212B and RLC 1213B, and PDCP 1214B. An SCG bearer type may interface with the PDCP 1214B.

An eLTE eNB 1201C may be an NG master base station, and a gNB 1210C may be an NG secondary base station. An example of a radio protocol architecture for a split bearer and an SCG bearer is shown. The eLTE eNB 1201C may be connected to an NGC with a non-standalone gNB 1210C, via an Xn interface between the PDCP 1206C and an NR RLC 1212C. The eLTE eNB 1201C may include protocol layers MAC 1202C, RLC 1203C and RLC 1204C, and PDCP 1205C and PDCP 1206C. An MCG bearer type may interface with the PDCP 1205C, and a split bearer type may interface with the PDCP 1206C. The gNB 1210C may include protocol layers NR MAC 1211C, NR RLC 1212C and NR RLC 1213C, and NR PDCP 1214C. An SCG bearer type may interface with the NR PDCP 1214C.

In a 5G network, the radio protocol architecture that a particular bearer uses may depend on how the bearer is setup. At least three alternatives may exist, e.g., an MCG bearer, an SCG bearer, and a split bearer, such as shown in FIG. 12A, FIG. 12B, and FIG. 12C. The NR RRC may be located in a master base station, and the SRBs may be configured as an MCG bearer type and may use the radio resources of the master base station. Tight interworking may have at least one bearer configured to use radio resources provided by the secondary base station. Tight interworking may or may not be configured or implemented.

The wireless device may be configured with two MAC entities: e.g., one MAC entity for a master base station, and one MAC entity for a secondary base station. In tight interworking, the configured set of serving cells for a wireless device may comprise of two subsets: e.g., the Master Cell Group (MCG) including the serving cells of the master base station, and the Secondary Cell Group (SCG) including the serving cells of the secondary base station.

At least one cell in a SCG may have a configured UL CC and one of them, e.g., a PSCell (or the PCell of the SCG, which may also be called a PCell), is configured with PUCCH resources. If the SCG is configured, there may be at least one SCG bearer or one split bearer. If one or more of a physical layer problem or a random access problem is detected on a PSCell, if the maximum number of (NR) RLC retransmissions associated with the SCG has been reached, and/or if an access problem on a PSCell during an SCG addition or during an SCG change is detected, then: an RRC connection re-establishment procedure may not be triggered, UL transmissions towards cells of the SCG may be stopped, a master base station may be informed by the wireless device of a SCG failure type, and/or for a split bearer the DL data transfer over the master base station may be maintained. The RLC AM bearer may be configured for the split bearer. Like the PCell, a PSCell may not be de-activated. A PSCell may be changed with an SCG change, e.g., with security key change and a RACH procedure. A direct bearer type change, between a split bearer and an SCG bearer, may not be supported. Simultaneous configuration of an SCG and a split bearer may not be supported.

A master base station and a secondary base station may interact. The master base station may maintain the RRM measurement configuration of the wireless device. The master base station may determine to ask a secondary base station to provide additional resources (e.g., serving cells) for a wireless device. This determination may be based on, e.g., received measurement reports, traffic conditions, and/or bearer types. If a request from the master base station is received, a secondary base station may create a container that may result in the configuration of additional serving cells for the wireless device, or the secondary base station may determine that it has no resource available to do so. The master base station may provide at least part of the AS configuration and the wireless device capabilities to the secondary base station, e.g., for wireless device capability coordination. The master base station and the secondary base station may exchange information about a wireless device configuration such as by using RRC containers (e.g., inter-node messages) carried in Xn or Xx messages. The secondary base station may initiate a reconfiguration of its existing serving cells (e.g., PUCCH towards the secondary base station). The secondary base station may determine which cell is the PSCell within the SCG. The master base station may not change the content of the RRC configuration provided by the secondary base station. If an SCG is added and/or an SCG SCell is added, the master base station may provide the latest measurement results for the SCG cell(s). Either or both of a master base station and a secondary base station may know the SFN and subframe offset of each other by OAM, (e.g., for the purpose of DRX alignment and identification of a measurement gap). If a new SCG SCell is added, dedicated RRC signaling may be used for sending required system information of the cell, such as for CA, except, e.g., for the SFN acquired from an MIB of the PSCell of an SCG.

FIG. 13A and FIG. 13B show examples for base station deployment. A core 1301 and a core 1310 may interface with other nodes via RAN-CN interfaces. In a non-centralized deployment example, the full protocol stack (e.g., NR RRC, NR PDCP, NR RLC, NR MAC, and NR PHY) may be supported at one node, such as a gNB 1302, a gNB 1303, and/or an eLTE eNB or LTE eNB 1304. These nodes (e.g., the gNB 1302, the gNB 1303, and the eLTE eNB or LTE eNB 1304) may interface with one of more of each other via respective inter-BS interface. In a centralized deployment example, upper layers of a base station may be located in a Central Unit (CU) 1311, and lower layers of the base station may be located in Distributed Units (DU) 1312, 1313, and 1314. The CU-DU interface (e.g., Fs interface) connecting CU 1311 and DUs 1312, 1312, and 1314 may be ideal or non-ideal. The Fs-C may provide a control plane connection over the Fs interface, and the Fs-U may provide a user plane connection over the Fs interface. In the centralized deployment, different functional split options between the CU 1311 and the DUs 1312, 1313, and 1314 may be possible by locating different protocol layers (e.g., RAN functions) in the CU 1311 and in the DU 1312, 1313, and 1314. The functional split may support flexibility to move the RAN functions between the CU 1311 and the DUs 1312, 1313, and 1314 depending on service requirements and/or network environments. The functional split option may change during operation (e.g., after the Fs interface setup procedure), or the functional split option may change only in the Fs setup procedure (e.g., the functional split option may be static during operation after Fs setup procedure).

Figure 14:
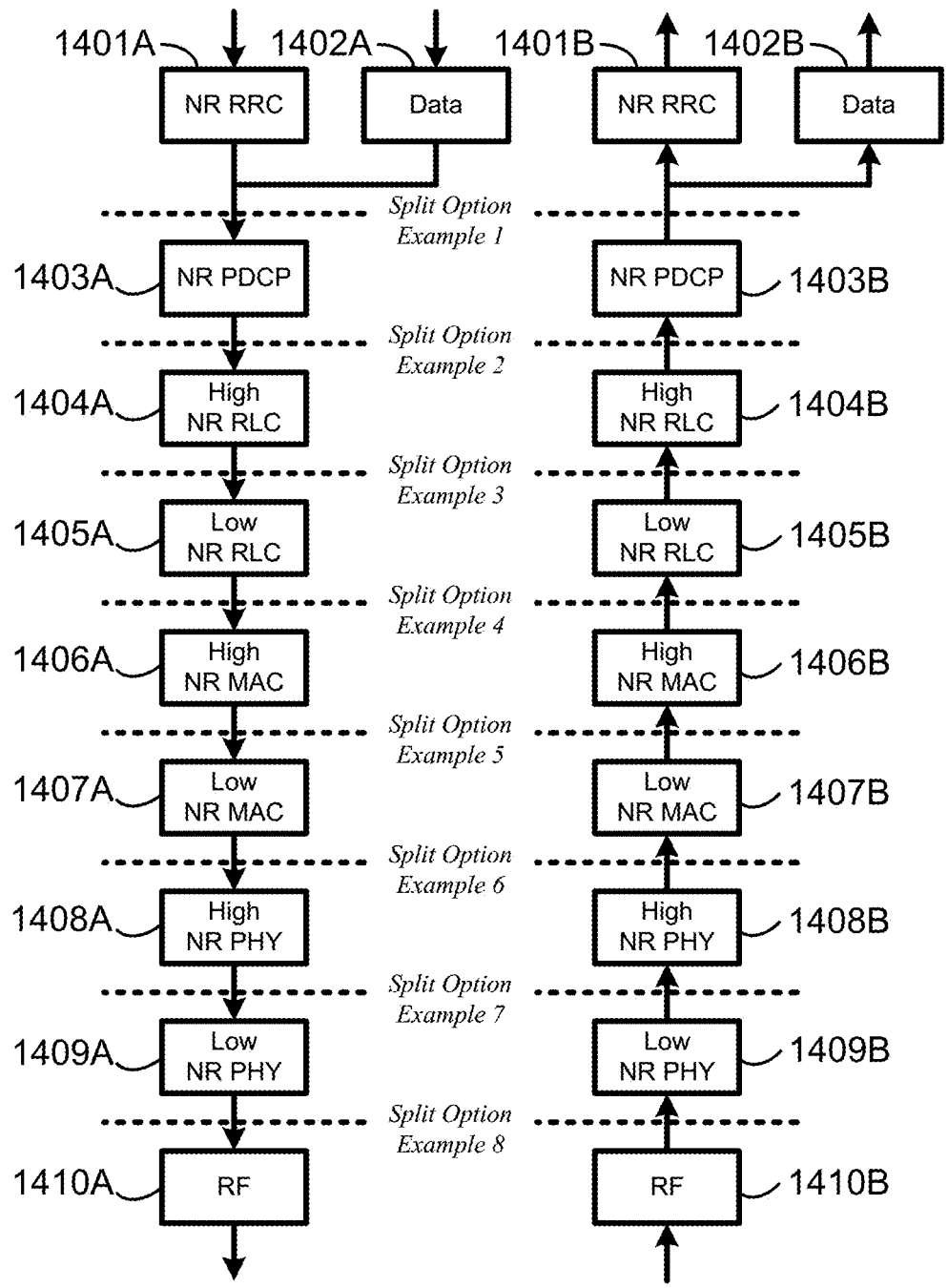
FIG. 14 shows functional split option examples of a centralized base station deployment.

FIG. 14 shows examples for different functional split options of a centralized base station deployment. Element numerals that are followed by "A" or "B" designations in FIG. 14 may represent the same elements in different traffic flows, e.g., either receiving data (e.g., data 1402A) or sending data (e.g., 1402B). In the split option example 1, an NR RRC 1401 may be in a CU, and an NR PDCP 1403, an NR RLC (e.g., comprising a High NR RLC 1404 and/or a Low NR RLC 1405), an NR MAC (e.g., comprising a High NR MAC 1406 and/or a Low NR MAC 1407), an NR PHY (e.g., comprising a High NR PHY 1408 and/or a LOW NR PHY 1409), and an RF 1410 may be in a DU. In the split option example 2, the NR RRC 1401 and the NR PDCP 1403 may be in a CU, and the NR RLC, the NR MAC, the NR PHY, and the RF 1410 may be in a DU. In the split option example 3, the NR RRC 1401, the NR PDCP 1403, and a partial function of the NR RLC (e.g., the High NR RLC 1404) may be in a CU, and the other partial function of the NR RLC (e.g., the Low NR RLC 1405), the NR MAC, the NR PHY, and the RF 1410 may be in a DU. In the split option example 4, the NR RRC 1401, the NR PDCP 1403, and the NR RLC may be in a CU, and the NR MAC, the NR PHY, and the RF 1410 may be in a DU. In the split option example 5, the NR RRC 1401, the NR PDCP 1403, the NR RLC, and a partial function of the NR MAC (e.g., the High NR MAC 1406) may be in a CU, and the other partial function of the NR MAC (e.g., the Low NR MAC 1407), the NR PHY, and the RF 1410 may be in a DU. In the split option example 6, the NR RRC 1401, the NR PDCP 1403, the NR RLC, and the NR MAC may be in CU, and the NR PHY and the RF 1410 may be in a DU. In the split option example 7, the NR RRC 1401, the NR PDCP 1403, the NR RLC, the NR MAC, and a partial function of the NR PHY (e.g., the High NR PHY 1408) may be in a CU, and the other partial function of the NR PHY (e.g., the Low NR PHY 1409) and the RF 1410 may be in a DU. In the split option example 8, the NR RRC 1401, the NR PDCP 1403, the NR RLC, the NR MAC, and the NR PHY may be in a CU, and the RF 1410 may be in a DU.

The functional split may be configured per CU, per DU, per wireless device, per bearer, per slice, and/or with other granularities. In a per CU split, a CU may have a fixed split, and DUs may be configured to match the split option of the CU. In a per DU split, each DU may be configured with a different split, and a CU may provide different split options for different DUs. In a per wireless device split, a base station (e.g., a CU and a DU) may provide different split options for different wireless devices. In a per bearer split, different split options may be utilized for different bearer types. In a per slice splice, different split options may be used for different slices.

A new radio access network (new RAN) may support different network slices, which may allow differentiated treatment customized to support different service requirements with end to end scope. The new RAN may provide a differentiated handling of traffic for different network slices that may be pre-configured, and the new RAN may allow a single RAN node to support multiple slices. The new RAN may support selection of a RAN part for a given network slice, e.g., by one or more slice ID(s) or NSSAI(s) provided by a wireless device or provided by an NGC (e.g., an NG CP). The slice ID(s) or NSSAI(s) may identify one or more of pre-configured network slices in a PLMN. For an initial attach, a wireless device may provide a slice ID and/or an NSSAI, and a RAN node (e.g., a base station) may use the slice ID or the NSSAI for routing an initial NAS signaling to an NGC control plane function (e.g., an NG CP). If a wireless device does not provide any slice ID or NSSAI, a RAN node may send a NAS signaling to a default NGC control plane function. For subsequent accesses, the wireless device may provide a temporary ID for a slice identification, which may be assigned by the NGC control plane function, to enable a RAN node to route the NAS message to a relevant NGC control plane function. The new RAN may support resource isolation between slices. If the RAN resource isolation is implemented, shortage of shared resources in one slice does not cause a break in a service level agreement for another slice.

The amount of data traffic carried over networks is expected to increase for many years to come. The number of users and/or devices is increasing and each user/device accesses an increasing number and variety of services, e.g., video delivery, large files, and images. This requires not only high capacity in the network, but also provisioning very high data rates to meet customers' expectations on interactivity and responsiveness. More spectrum may be required for network operators to meet the increasing demand. Considering user expectations of high data rates along with seamless mobility, it is beneficial that more spectrum be made available for deploying macro cells as well as small cells for communication systems.

Striving to meet the market demands, there has been increasing interest from operators in deploying some complementary access utilizing unlicensed spectrum to meet the traffic growth. This is exemplified by the large number of operator-deployed Wi-Fi networks and the 3GPP standardization of LTE/WLAN interworking solutions. This interest indicates that unlicensed spectrum, if present, may be an effective complement to licensed spectrum for network operators, e.g., to help address the traffic explosion in some examples, such as hotspot areas. Licensed Assisted Access (LAA) offers an alternative for operators to make use of unlicensed spectrum, e.g., if managing one radio network, offering new possibilities for optimizing the network's efficiency.

Listen-before-talk (clear channel assessment) may be implemented for transmission in an LAA cell. In a listen-before-talk (LBT) procedure, equipment may use a clear channel assessment (CCA) check before using the channel. For example, the CCA may utilize at least energy detection to determine the presence or absence of other signals on a channel to determine if a channel is occupied or clear, respectively. For example, European and Japanese regulations mandate the usage of LBT in the unlicensed bands. Apart from regulatory requirements, carrier sensing via LBT may be one way for fair sharing of the unlicensed spectrum.

Discontinuous transmission on an unlicensed carrier with limited maximum transmission duration may be enabled. Some of these functions may be supported by one or more signals to be transmitted from the beginning of a discontinuous LAA downlink transmission. Channel reservation may be enabled by the transmission of signals, by an LAA node, after gaining channel access, e.g., via successful LBT operation, so that other nodes that receive the transmitted signal with energy above a certain threshold sense the channel to be occupied. Functions that may need to be supported by one or more signals for LAA operation with discontinuous downlink transmission may include one or more of the following: detection of the LAA downlink transmission (including cell identification) by wireless devices, time synchronization of wireless devices, and frequency synchronization of wireless devices.

DL LAA design may employ subframe boundary alignment according to LTE-A carrier aggregation timing relationships across serving cells aggregated by CA. This may not indicate that the eNB transmissions may start only at the subframe boundary. LAA may support transmitting PDSCH if not all OFDM symbols are available for transmission in a subframe according to LBT. Delivery of necessary control information for the PDSCH may also be supported.

LBT procedures may be employed for fair and friendly coexistence of LAA with other operators and technologies operating in unlicensed spectrum. LBT procedures on a node attempting to transmit on a carrier in unlicensed spectrum may require the node to perform a clear channel assessment to determine if the channel is free for use. An LBT procedure may involve at least energy detection to determine if the channel is being used. For example, regulatory requirements in some regions, e.g., in Europe, specify an energy detection threshold such that if a node receives energy greater than this threshold, the node assumes that the channel is not free. Nodes may follow such regulatory requirements. A node may optionally use a lower threshold for energy detection than that specified by regulatory requirements. LAA may employ a mechanism to adaptively change the energy detection threshold, e.g., LAA may employ a mechanism to adaptively lower the energy detection threshold from an upper bound. Adaptation mechanism may not preclude static or semi-static setting of the threshold. A Category 4 LBT mechanism or other type of LBT mechanisms may be implemented.

Various example LBT mechanisms may be implemented. For some signals, in some implementation scenarios, in some situations, and/or in some frequencies, no LBT procedure may performed by the transmitting entity. For example, Category 2 (e.g., LBT without random back-off) may be implemented. The duration of time that the channel is sensed to be idle before the transmitting entity transmits may be deterministic. For example, Category 3 (e.g., LBT with random back-off with a contention window of fixed size) may be implemented. The LBT procedure may have the following procedure as one of its components. The transmitting entity may draw a random number N within a contention window. The size of the contention window may be specified by the minimum and maximum value of N. The size of the contention window may be fixed. The random number N may be employed in the LBT procedure to determine the duration of time that the channel is sensed to be idle, e.g., before the transmitting entity transmits on the channel. For example, Category 4 (e.g., LBT with random back-off with a contention window of variable size) may be implemented. The transmitting entity may draw a random number N within a contention window. The size of contention window may be specified by the minimum and maximum value of N. The transmitting entity may vary the size of the contention window if drawing the random number N. The random number N may be used in the LBT procedure to determine the duration of time that the channel is sensed to be idle, e.g., before the transmitting entity transmits on the channel.

LAA may employ uplink LBT at the wireless device. The UL LBT scheme may be different from the DL LBT scheme, e.g., by using different LBT mechanisms or parameters. These differences in schemes may be due to the LAA UL being based on scheduled access, which may affect a wireless device's channel contention opportunities. Other considerations motivating a different UL LBT scheme may include, but are not limited to, multiplexing of multiple wireless devices in a single subframe.

LAA may use uplink LBT at the wireless device. The UL LBT scheme may be different from the DL LBT scheme, e.g., by using different LBT mechanisms or parameters. These differences in schemes may be due to the LAA UL being based on scheduled access, which may affect a wireless device's channel contention opportunities. Other considerations motivating a different UL LBT scheme may include, but are not limited to, multiplexing of multiple wireless devices in a single subframe.

A DL transmission burst may be a continuous transmission from a DL transmitting node, e.g., with no transmission immediately before or after from the same node on the same CC. An UL transmission burst from a wireless device perspective may be a continuous transmission from a wireless device, e.g., with no transmission immediately before or after from the same wireless device on the same CC. A UL transmission burst may be defined from a wireless device perspective or from an eNB perspective. If an eNB is operating DL and UL LAA over the same unlicensed carrier, DL transmission burst(s) and UL transmission burst(s) on LAA may be scheduled in a TDM manner over the same unlicensed carrier. An instant in time may be part of a DL transmission burst or part of an UL transmission burst.

An uplink grant, a group-common DCI, and/or HARQ feedback indication mechanism used for uplink transmissions without grant may indicate an ACK or NACK (implicitly or explicitly) to reduce a signaling overhead and thereby to fulfill one or more service requirements (e.g., URLLC). A base station may configure a wireless device with uplink transmissions without grant (GF UL). The resources for uplink transmission scheme without grant may be semi-statically configured and/or reconfigured. The resource configuration may at least comprise physical resources in a time and/or frequency domain and reference signal (RS) parameters. The configuration parameters may indicate at least a modulation and coding scheme (MCS), redundancy version, and/or a number of repetitions (e.g., any number K). A wireless device may be configured with multiple numbers of repetitions. For uplink transmissions without grant, an RS may be transmitted with data. A similar channel structure as in a grant-based transmission may be used for uplink transmissions without grant. A common DMRS structure may be used for downlink and uplink, for example, in cyclic prefix OFDM (CP-OFDM). For an uplink transmission with or without grant, K repetitions, including initial transmission, with and/or without a same RV, and with and/or without a same MCS for the same transport block may be used. Frequency hopping may be used between an initial transmission and a repetition and/or retransmission, and/or between repetitions. For uplink transmissions without grant, a wireless device may continue repetitions for a transport block (TB), for example, until either a negative acknowledgement (NACK) is received from a base station or the number of repetitions for the TB reaches K. For a wireless device configured with K repetitions for a TB transmission with and/or without grant, the wireless device may continue repeating for the TB until an uplink grant is successfully received for a slot/mini-slot for the same TB, an acknowledgement/indication of successful reception of the TB from a base station, and/or the number of repetitions for that TB reaches K. A wireless device may be identified based on a wireless device ID, a RS sequence/configuration for the wireless device, and/or radio resources configured for uplink transmission.

Time and/or frequency resources for uplink transmissions without grant may be configured in a wireless device-specific manner. The network may configure the same time/frequency resources and/or RS parameters to multiple wireless devices. The base station may avoid collision with network implementations. The base station may identify a wireless device ID based on physical layer parameters, such as time and/or frequency resources and/or RS (e.g., demodulation reference signals (DMRS)) resources and/or parameters. Both DFTS-OFDM and CP-OFDM may be supported for uplink transmissions without grant. Uplink transmissions without grant may support one or more HARQ processes. A HARQ process ID may be identified based on resources used for uplink transmissions without grant. Such resources may comprise, for example, time and/or frequency resources of uplink transmissions without grant, and/or RS parameters for HARQ process identification for both transmissions with and without grant.

A wireless device may be configured with a plurality of parameters for uplink data transmission without grant. A wireless device may be configured with reference symbol and time and frequency resources in a wireless device-specific manner. The time and frequency resources configured for a wireless device may or may not collide with those of another wireless device. DFTS-OFDM and CP-OFDM may be supported for uplink transmissions without grant. Uplink transmissions without grant may support a plurality of HARQ processes. L1 signaling may be used for activation and/or deactivation of uplink transmissions without grant. L1 signaling may be used for modification of parameters configured by RRC. Parameters may comprise time domain resource allocation, frequency domain resource allocation (e.g., in terms of RBs or RBGs), wireless device-specific DMRS configuration, a modulation and coding scheme (MCS), a transport block size (TBS), etc. L1 signaling may be used for switching to grant-based re-transmission for the same TB. L1 signaling may be based on wireless device-specific DCI (e.g., uplink grant) or a group common DCI. RRC configuration and/or reconfiguration of a set of resource and parameters may comprise transmission interval, physical resource such as time domain resource allocation, frequency domain resource allocation, for example in terms of RBs or RBG(s), wireless device-specific DMRS configuration, etc. A plurality of physical resources may be configured in the transmission interval. One or more repetitions of the same one or more TBs may be performed after an initial transmission. A repetition in the one or more repetitions may be performed in the same resource used for initial transmission. A repetition in the one or more repetitions may be in a different resource than the initial transmission. The radio resources used for initial transmission and repetition may or may not be contiguous in time.

Uplink transmissions without grant may be configured and/or activated with a plurality of types. As a first type, UL data transmission without grant may be activated/deactivated based on RRC configuration and/or reconfiguration without L1 signaling. As a second type, UL data transmission without grant may be based on both RRC configuration and L1 signaling for activation/deactivation. As a third type, UL data transmission without grant may be based on RRC configuration and may allow L1 signaling to modify some parameters configured by RRC. For first type UL data transmission without grant, the RRC configuration and/or reconfiguration may comprise periodicity and offset of a resource with respect to SFN=0, time domain resource allocation, frequency domain resource allocation, wireless device-specific DMRS configuration, MCS/TBS, a number of repetitions K, power control related parameters, HARQ related parameters, etc. For the second type UL transmission without grant, some of parameters, for example, periodicity and power control related parameters, may be RRC configured. For the second type UL transmission without grant, the parameters may not be RRC configured and/or updated. An offset value with respect to a timing reference, time domain resource allocation, frequency domain resource allocation, wireless device-specific DMRS configuration, and/or MCS/TBS may be indicated by L1 signaling. The number of repetitions K may be RRC configured and/or indicated by L1 signaling.

An uplink grant, transmitted by a base station based on uplink transmissions without grant, may indicate an ACK for the uplink transmissions without grant. The uplink grant may be a dynamic grant, for example, for the same HARQ process as the uplink transmissions without grant. An uplink grant for a new data transmission may implicitly indicate an ACK for uplink transmissions without grant. An uplink grant for the same TB initially transmitted without grant may indicate NACK for uplink transmissions without grant. A group-common DCI may be used to indicate one or more HARQ feedbacks of one or more wireless devices for uplink transmissions without grant. The group common DCI may indicate an ACK and/or a NACK.

The wireless device may use a timer to determine an implicit and/or explicit HARQ feedback (e.g., ACK and/or NACK) corresponding to uplink transmissions without grant. The timer value may be configured for the wireless device via RRC. The wireless device may receive one or more RRC messages indicating the timer value. The wireless device may start and/or restart the timer based on uplink transmissions without grant, for example, one or more TBs corresponding to uplink transmissions without grant. A base station may inform a wireless device of a positive and/or negative acknowledgements of the one or more TBs transmissions with a timer. The wireless device may assume an ACK based on the timer expiring and not receiving a NACK after K repetitions. The wireless device may assume a NACK based on the timer expiring and the wireless device not receiving an ACK. The wireless device may assume a NACK corresponding to uplink transmissions without grant based on receiving a grant (e.g., dynamic grant) for retransmission of the same one or more TBs in a first uplink transmissions without grant. The grant may include the same HARQ process and with an indication of NDI (e.g., no new data). The wireless device may assume a NACK corresponding to uplink transmissions without grant based on receiving a grant (e.g., a dynamic grant) for retransmission of the same one or more TB in a first uplink transmissions without grant in a period of time. The period of time may be configured for the wireless device. The wireless device may receive an RRC message indicating the period of time. The period of time may be pre-configured. The period of time may be indicated and/or updated by L1 signaling.

A base station may configure a wireless device with one or more RNTIs for uplink transmissions without grant. The base station may configure an RNTI for uplink transmissions without grant per configuration, per service, per type (e.g., the first, second, and/or third types) and/or per a wireless device.

A base station may configure a wireless device with a first RNTI. The first RNTI may be a group-common RNTI. The base station may transmit downlink control information (DCI) (e.g., a group common DCI) corresponding to the first RNTI. The DCI may indicate HARQ feedback (e.g., ACK and/or NACK) corresponding to one or more uplink transmissions (e.g., one or more TBs corresponding to one or more uplink transmission) without uplink grant (e.g., for semi-persistent scheduling (SPS) and/or grant-free resource configuration) for one or more wireless devices. The DCI may be scrambled based on the first RNTI. A wireless device may monitor a common search space to detect the DCI corresponding to the first RNTI. The base station may transmit and/or indicate a NACK (e.g., using the DCI) corresponding to one or more TBs of the wireless device and the wireless device may assume an ACK (e.g., an implicit ACK) if no NACK is received within a period of time. For example, the period of time may be configured by a base station with a timer value (e.g., via RRC messages). The base station may transmit and/or indicate an ACK (e.g., using a DCI) and the wireless device may assume a NACK (e.g., an implicit NACK) if no ACK is received within a period of time. The period for time may be configured for the wireless device. The base station may transmit an RRC message indicating the period of time. The period of time may be pre-configured. The wireless device may transmit up to a first number of repetitions of a same one or more TBs corresponding to uplink transmissions without grant. The period of time may be or may not be based on the duration that the first number of repetitions of the same one or more TBs corresponding to the uplink transmission is received. The wireless device may monitor for the DCI at least for a portion of the period of time. The wireless device may stop monitoring the DCI based on receiving the ACK and/or NACK corresponding to the uplink transmissions without grant. The DCI may comprise ACK and/or NACK for a plurality of wireless devices. The plurality of wireless devices may be configured with the same first RNTI used for transmission of the DCI. The plurality of wireless devices configured with the same first RNTI may monitor the search space, may detect the same DCI, and may identify HARQ feedback corresponding to the wireless device transmissions. The DCI may comprise a plurality of HARQ feedbacks (e.g., corresponding to a plurality of TBs) for the same wireless device. The mapping between a HARQ feedback and a corresponding wireless device and/or a TB in a plurality of TBs transmitted by a wireless device may be based on a rule and/or indicated (e.g., implicitly or explicitly) by the DCI and/or RRC messages.

Uplink demodulation reference signals (DMRS) may be used for channel estimation and/or coherent demodulation of PUSCH and PUCCH. A base station may configure a wireless device with DMRS configuration parameters. The wireless device may receive one or more RRC messages. The one or more RRC messages may comprise a DMRS-Config IE. The DMRS-Config IE may comprise DMRS configuration parameters. The following is an example DMRS-Config IE:

```
DMRS-Config-r11 ::= CHOICE {
    release         NULL,
    setup           SEQUENCE {
                        scramblingIdentity-r11    INTEGER (0..503),
                        scramblingIdentity2-r11   INTEGER (0..503)
    }
}
DMRS-Config-v1310 ::= SEQUENCE {
    dmrs-tableAlt-r13       ENUMERATED {true}
    OPTIONAL
}
```

Parameters scramblingIdentity and/or scramblingIdentity2 may indicate a parameter nDMRS,iID. The parameter dmrs-tableAlt may indicate whether to use an alternative table for DMRS upon PDSCH transmission. However, any DMRS-Config configuration and/or the DMRS-Config configuration parameters may be used.

Uplink (UL) transmission without a UL grant, which may be referred to as a grant-free (GF) UL transmission may be used for one or more service types (e.g., URLLC). A base station may allocate to a wireless device one or more GF UL radio resources. The wireless device configured by the base station to use the GF UL radio resources may transmit one or more data packets via the GF UL radio resources without a UL grant, which may result in reducing the signaling overhead relative to a GB UL transmission. Some service types may have strict requirements, for example, in terms of latency and reliability, such as URLLC. These service types may be candidates for which a base station may configure a wireless device with the GF UL transmission. The wireless device configured with the GF UL radio resource may skip a UL transmission on the GF UL radio resource, for example, if there is no data to transmit.

The GF UL transmission may support multiple wireless devices to access the same GF UL radio resources, for example, a GF radio resource pool. A wireless device may achieve lower latency and/or lower signaling overhead, relative to a GB UL transmission, by using a GF radio resource pool. A GF radio resource pool may be defined as a subset of one or more radio resources from a common radio resource set (e.g., from all uplink shared channel radio resources). The GF radio resource pool may be used to allocate exclusively or partially overlapped one or more radio resources for GF UL transmissions in a cell, or to organize frequency and/or time reuse between different cells or parts of a cell (e.g., cell-center and cell-edge).

There may be a collision between the GF UL transmissions of two or more wireless devices if a base station configures multiple wireless devices with the same (or partially overlapped) GF radio resource pools. The base station may configure one or more parameters to assign a wireless device-specific demodulation reference signal (DMRS) along with the GF radio resource pool configuration to identify a wireless device ID. The one or more parameters may indicate at least one of a root index of a set of Zadoff-Chu (ZC) sequences, a cyclic shift (CS) index, a TDM and/or FDM pattern index, or an orthogonal cover code (OCC) sequences or index.

For wireless device ID identification from GF radio resource pools, a base station may use one or more preamble sequences that may be transmitted together with the PUSCH data. The one or more preamble sequences may be designed to be reliable enough and to meet the detection requirement of a service type, such as URLLC. For wireless devices configured with a GF radio resource pool, a preamble sequence may be uniquely allocated to a wireless device. A base station may configure different GF radio resources for different sets of wireless devices such that the preamble sequences may be reused in different GF radio resources. To have reliable detection performance, the preamble sequences may be mutually orthogonal, for example, orthogonality between ZC root sequences with different cyclic shifts. A wireless device may transmit one or more preambles together with the data block in a first step and receive a response in a second step. The data may be repeated K times, depending on a base station configuration. The one or more preambles may not be repeated. The response from a base station may be a UL grant or a dedicated ACK and/or NACK transmitted in the form of downlink control information.

A grant-free resource pool configuration may not be known to wireless devices. A GF resource pool configuration may be coordinated between different cells for interference coordination. If the GF resource pool(s) are known to wireless devices, those may be semi-statically configured by wireless device-specific RRC signaling or non-wireless device-specific RRC signaling, for example, via broadcasting a system information block. The RRC signaling for GF radio resource configuration may comprise one or more parameters indicating at least one of following: periodicity and offset of a resource with respect to SFN=0, time domain resource allocation, frequency domain resource allocation, wireless device-specific DMRS configuration, a modulation and coding scheme (MCS), a transport block size (TBS), number of repetitions K, a hopping pattern, HARQ related parameters, and power control related parameters. A wireless device may activate the GF UL transmission configured by the RRC signaling based on receiving the RRC signaling without an additional signaling.

An L1 activation signaling may be used with RRC signaling to configure and/or activate a GF configuration. RRC signaling may configure one or more parameters of GF UL transmission to the wireless device. L1 activation signaling may activate or deactivate the configured GF UL transmission. L1 activation signaling may be used to configure, adjust, modify, and/or update one or more parameters associated with GF UL transmission.

The L1 activation signaling may be transmitted via PDCCH in the form of a DCI. For example, a DCI may be used for UL semi-persistent scheduling (SPS). A base station may assign a radio network temporary identifier (RNTI) for a wireless device along with GF configuration parameters in the RRC signaling. With the assigned RNTI, wireless device may monitor the PDCCH to receive the L1 activation signaling masked by the RNTI.

The RRC configuration and/or reconfiguration of GF UL transmission without UL grant may comprise at least one of following: periodicity of a resource and power control related parameters. The L1 activation signaling may provide at least one of the following parameters for the GF resource: an offset associated with the periodicity with respect to a timing reference, time domain resource allocation, frequency domain resource allocation, wireless device-specific DMRS configuration, an MCS/TBS value, HARQ related parameters, number of repetitions K, and a hopping pattern.

An MCS may be indicated by the wireless device within the grant-free data. To avoid the blind decoding of MCS indication, a limited number of MCS levels may be pre-configured by a base station. For example, K bits may be used to indicate MCS of grant-free data. The number of resource elements used to transmit MCS indication in a resource group may be semi-statically configured. In GF operation, there may be one common MCS predefined for all wireless devices. There may be a tradeoff between a spectrum efficiency and decoding reliability. For example, the spectrum efficiency may be reduced if a low level of MCS is used as the data transmission reliability improves. A base station may predefine a mapping rule between multiple time and/or frequency resources for UL grant-free transmission and MCSs. A wireless device may select an appropriate MCS according to a DL measurement and associated time and/or frequency resources to transmit UL data. A wireless device may choose a MCS based on the channel status and increase the resource utilization.

If a wireless device is configured with a GF UL transmission, the GF UL transmission may be activated in different ways, including via RRC signaling, via L1 activation signaling, and combinations thereof. The use of L1 activation signaling may depend on service types. For example, the dynamic activation (e.g., activation via L1 activation signaling) may not be supported in the base station or may be configurable based on service and traffic considerations.

A base station may determine to configure a wireless device with or without L1 activation signaling. This determination may be based on, for example, traffic pattern and/or latency requirements. With the L1 activation signaling, a wireless device may transmit a data packet with the configured time and/or frequency radio resource if the wireless device receives an L1 activation signaling from the base station. If the L1 activation signaling is not configured, a wireless device may start a UL transmission with the configured GF radio resource at any moment or in a certain time interval (which may be configured by RRC signaling or pre-defined) if the configuration is completed. For example, a wireless device may activate the GF UL transmission based on receiving the RRC signaling configuring the GF UL transmission. The activation type (via RRC signaling or via L1 activation signaling) may be pre-configured in NR.

RRC signaling, transmitted by a base station to a wireless device to configure a UL GF transmission, may comprise an indicator used for indicating whether the activation of the UL GF transmission may require an L1 activation signaling. If the indicator indicates a requirement for L1 activation signaling, the wireless device may wait for L1 activation signaling and activate the configured UL GF transmission based on receiving the L1 activation signaling. If L1 activation signaling is used, the wireless device may transmit an acknowledgement based on receiving L1 activation signaling to the base station. If the indicator indicates no need of L1 activation signaling, the UL GF transmission may be activated based on the RRC signaling configuring the GF UL transmission. For the activation of GF UL transmission without the L1 activation signaling, the wireless device may not determine when to start the GF UL transmission. The base station and wireless device may predefine the start timing based on a time offset and the transmission time interval (TTI) (e.g. a subframe, slot, and/or mini-slot, where the wireless device receive the RRC signaling) for the GF UL transmission configuration. The RRC configuration may comprise one or more parameters indicating the start timing in terms of a subframe, slot, or mini-slot.

RRC signaling may not comprise an indicator whether the activation needs a L1 activation signaling. A wireless device may identify whether the configured GF transmission is activated by RRC signaling or L1 activation signaling based on the format of the RRC configuration for GF UL transmission. For a GF UL transmission without L1 activation signaling, the RRC signaling for configuring and activating the GF UL transmission may comprise one or more parameters for the UL GF transmission. For a GF UL transmission activated by the L1 activation signaling, a RRC signaling may comprise a different number of parameters that may be less than a number of parameters in the RRC signaling activating the GF UL transmission. The absence and/or presence of one or more parameters (or the number of parameters) in the RRC signaling may be an implicit indicator for a wireless device to identify whether to activate the GF UL transmission via RRC signaling or via L1 activation signaling.

L1 activation signaling may comprise one or more parameters indicating at least one of GF configuration, e.g., start timing of GF UL transmission, GF time and frequency radio resources, DMRS parameters, a modulation and coding scheme, a transport block size, number of repetitions K, a hopping pattern, and power control parameters. A DCI format used for the activation of the GF UL transmission may comprise one or more fields indicating a MCS for the GF UL transmission. The GF UL transmission requiring the L1 activation signaling may be configured with a RRC signaling that may not comprise one or more parameters indicating the MCS for the GF UL transmission. The MCS information may be carried by a L1 signaling that activates the GF UL transmission. If a wireless device receives a RRC signaling comprising a MCS for a GF UL transmission, the wireless device may activate the GF UL transmission based on the RRC signaling without waiting for a L1 signaling. L1 activation signaling may be configured to control network resource load and utilization. For a delay sensitive service, the additional activation signaling may cause additional delay and may lead to potential service interruption or unavailability for the period of using and requesting the activation. A base station may configure the wireless device with a GF UL transmission such that the GF UL transmission is activated based on the RRC signaling comprising a GF radio resource configuration and transmission parameters.

GF radio resources may be over-allocated which may result in a waste of radio resources for a few wireless devices. L1 signaling may be used to reconfigure the GF UL radio resource or one or more GF transmission parameters. By allowing L1 signaling-based reconfiguration, wireless devices may periodically monitor a downlink control channel to detect the L1 signaling scrambled by an RNTI that may indicate whether the configured GF radio resources or parameters have changed. This monitoring may increase the power consumption of a wireless device. As a result, the periodicity to check the downlink control signaling may be configurable based on such monitoring and/or power consumption. The periodicity may be configured to any time period, such as every minute, every hour, or every radio frame. The periodicity to check downlink control signaling may be defined, configured, and/or semi-statically configured independent of a periodicity of GF radio resources of GF UL transmission (e.g., to shorten the latency). For example, the periodicity of GF radio resource may be less than 1 ms and the periodicity to check downlink control signaling may be longer than 1 ms (e.g., tens of 1 millisecond, 1 minute, or 1 hour).

L1 deactivation signaling may be used for all services to release resources as fast as possible. For the GF UL transmission, a base station may support a K-repetition of the same transport block (TB) transmission over the GF radio resource pool until one or more conditions are met. The wireless device may continue the repetitions up to K times for the same TB until one or more of the following conditions is met: if an UL grant (or HARQ ACK or HARQ NACK) is received from the base station before the number of repetitions reaches K, the number of repetitions for the TB reaches K, or other termination condition of repetition may use.

The number of repetitions K may be a configurable parameter that may be wireless device-specific and/or cell-specific. A mini-slot or a symbol may be a unit of the K-repetition. A base station may configure the number of this repetition and the radio resource in advance via one or more RRC messages. The base station may transmit L1 activation signaling comprising a parameter indicating the number of repetitions K. The base station may assume a set of initial transmission and the repetition as one amount of the transmission. The base station may not be required to prepare the initial transmission and/or repetition. An extended TTI may include the set of initial transmission and its one or more repetitions. The repetitions may not be necessarily contiguous in time. If the repetitions are contiguous in time, it may allow coherent combining. If the repetitions are not contiguous in time, it may allow time diversity.

If the GF UL transmission of two wireless devices collides in the same GF radio resource pool, a base station may fail to detect the data from both wireless devices. If the two wireless devices retransmit the data without UL grants, the two wireless devices may collide again. Hopping may be used to solve the collision problem if radio resources are shared by multiple wireless devices. Hopping may randomize the collision relationship between wireless devices within a certain time interval to avoid persistent collision and/or to bring a diversity gain on the frequency domain. A wireless device-specific hopping pattern may be pre-configured or may be indicated by RRC signaling or L1 activation signaling. The wireless device-specific hopping pattern may be generated based on a known wireless device-specific ID, such as a wireless device-specific DMRS index and/or RNTI. There may be many factors considered for the hopping pattern design, such as the number of resource units (RUs), the max number of wireless devices sharing the same RU, the recently used RU index, the recent hopping index or the current slot index, the information indicating recently used sequence, hopping pattern, and hopping rule. The sequence described above may be a DMRS, a spreading sequence, or a preamble sequence that may be wireless device-specific.

The repetitions parameter K may be configured by one or more RRC messages, L1 activation signaling, or a combination thereof. A wireless device configured with the repetitions parameter K may transmit a transport block (TB) K times. The wireless device may transmit the TB K times with the same redundancy version (RV) or transmit the TB K times with different RVs between the repetitions. For example, the RV determination for K repetitions may comprise the initial transmission. The RV determination may be fixed to a pre-defined single value or fixed to a pre-defined RV pattern comprising a plurality of RVs, for example, if the GF UL transmission is configured and activated by one or more RRC messages. The RV determination may be configured by the one or more RRC messages with a single value or a RV pattern comprising a plurality of RVs. The RV determination may be fixed to a single value or fixed to a pre-defined RV pattern comprising a plurality of RVs, for example, if the GF UL transmission is fully or partially configured by one or more RRC messages and activated by an L1 activation signaling. The RV determination may be configured by the one or more RRC messages with a single value or a RV pattern comprising a plurality of RVs, for example, if the GF UL transmission is fully or partially configured by one or more RRC messages and activated by L1 activation signaling. The RV determination may be configured by the L1 activation signaling with a single value or fixed to a RV pattern comprising a plurality of RVs, for example, if the GF UL transmission is fully or partially configured by one or more RRC messages and activated by L1 activation signaling.

The base station may switch between GF and GB UL transmissions to balance resource utilization, delay, and/or reliability requirements of associated services. The GF UL transmission may be based on a semi-static resource configuration that may be beneficial to reduce latency. Such a pre-defined resource configuration may be hard to satisfy all potential services or packet sizes. The overhead may be large, and the packet size for a service, such as URLLC, may be variable. If a wireless device's data packet collides with other wireless device's packets in the GF UL transmission, a re-attempt to access GF radio resources may not achieve the service requirements. Switching from GF to GB UL transmissions may be beneficial.

To support the switching between GF and GB UL transmissions, the initial transmission on the pre-configured GF radio resources may include wireless device identification. Wireless device identification may comprise explicit wireless device ID information (e.g., C-RNTI) or implicit wireless device information (such as a DMRS cyclic shift specific signature). The wireless device may include buffer status reporting (BSR) with the initial data transmission, for example, to inform a base station of whether a wireless device has remaining data to transmit. If a base station successfully decodes data transmitted by a wireless device and determines that the wireless device has remaining data to transmit (e.g. from a BSR report), the base station may switch a type of scheduling for wireless device from GF to GB UL transmissions. If a base station fails to decode data transmitted by the wireless device but successfully detects the wireless device ID from the uniquely assigned sequence (e.g., preamble and/or DMRS), the base station may switch a type of scheduling for wireless device from GF to GB UL transmissions. The UL grant for subsequent data transmissions may be with CRC scrambled by the wireless device's RNTI, which may be determined either by explicit signaling in the initial transmission or implicitly by the DMRS cyclic shift.

One of the termination conditions for the K-repetitions may be a reception of a DCI comprising a UL grant that schedules a UL (re)transmission for the same TB. A base station may assign dedicated resources for retransmission to ensure the TB to be delivered within the latency budget. This behavior may be classified as scheduling switching from GF to GB operation. A wireless device may need to link the received grant with the transmitted TB to understand which TB to be retransmitted if there are multiple ongoing transmissions at the wireless device. The wireless device and base station may have the same notion of TB (and/or RV) counting.

For GF operation, the TB counting may not be possible if a base station may not detect one or more TBs due to collisions. A variety of techniques may be used to make an association between a DCI with a TB. If there are no other transmissions at the wireless device side, a direct association of the DCI with a TB that is being transmitted may be used. If there are at least two different TBs, a wireless device may determine that the DCI is for a particular TB by using an implicit linkage assuming where only one TB is transmitted in one transmission interval. If the interval between detected wireless device transmission and a grant is fixed, a wireless device may determine which TB may be retransmitted. If the timing between a detected transmission and a retransmission grant is not preconfigured, an explicit indication of the retransmitted TB may be carried by a DCI. If a wireless device detects that a grant for one TB overlaps with transmission of another ongoing TB, the wireless device may assume precedence of the grant comparing to the grant-free retransmissions. If a grant is received for a new TB (e.g., for aperiodic CSI reporting) and overlaps with the GF UL transmissions, the GF transmissions may be dropped from the resources. A prioritization rule whether to transmit a triggered report or GF data may be introduced depending on priority of the associated services. If URLLC services is assumed, the CSI reporting may be dropped.

A dedicated pre-assigned channel can be utilized for early termination. The physical HARQ indicator channel (PHICH) may be used as an acknowledge indicator. The PHICH for a wireless device may be determined based on the physical resource block (PRB) and cyclic shift of the DMRS corresponding to the wireless device's PUSCH transmissions. The early termination based on PHICH-like channel may improve the control channel capacity and system capacity. If a base station has successfully received a TB, the base station may obtain the corresponding information about the transmission of the TB, such as the wireless device ID, the resource used for carrying this transmission, the DMRS used for this transmission. The physical resources may be shared among multiple wireless devices who may have their own unique identifiers (e.g., DMRS) used in the GF radio resource pool. Therefore, even for GF UL transmission, if the base station has successfully received a TB, a unique PHICH may be determined.

A sequence-based signal may be used for early termination of K-repetition. A sequence-based signal may be transmitted via one or more pre-assigned channels to inform the wireless device to terminate the repetition of transmission. The signal may be transmitted if a base station successfully decodes a TB. The wireless device may perform a simple signal detection for the presence or absence to decide whether to continue the repetitions or not.

A base station may switch from GF to GB UL transmissions to improve a GF radio resource shortage. One or more wireless devices whose delay requirements are not strict (e.g., comparing with URLLC requirements) may use the GF radio resource to transmit a data packet. A base station may measure a level of congestion of the GF UL radio resource shared by a plurality of wireless devices based on statistics and set up a threshold policy to dynamically balance load or resource utilization of the GF UL radio resource. The statistics may include, for example, resource utilization, load, and/or a number of wireless device sharing the GF UL radio resource. Tt may be beneficial to switch some wireless devices from the GF UL radio resource to the GB UL radio resource, for example, if the resource usage statistic of the GF UL radio resource exceeds the predefined threshold, which may result in decreasing the resource collision.

Figure 16:
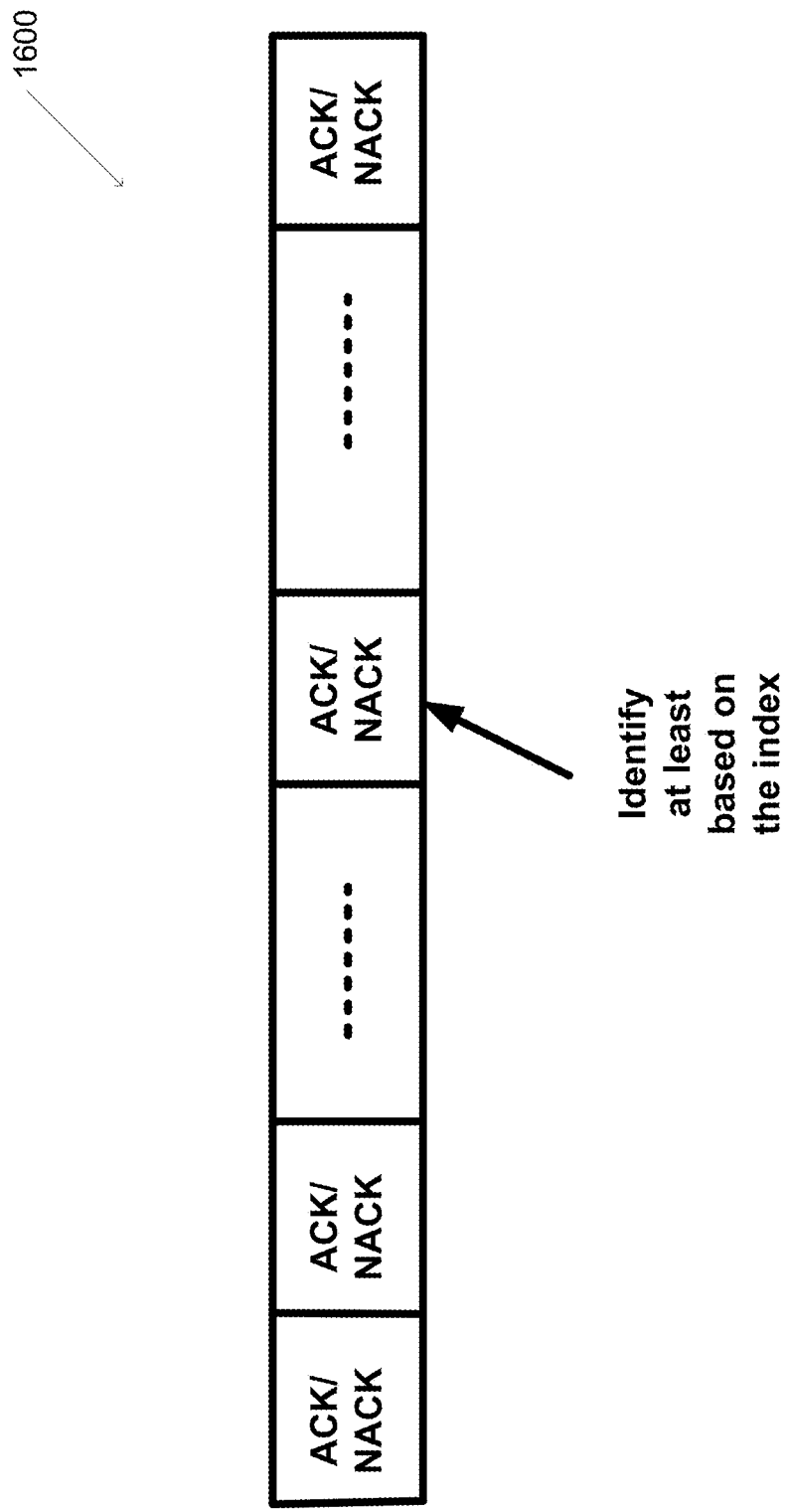
FIG. 16 is an example HARQ feedback procedure.

A wireless device may receive one or more messages. The one or more messages may comprise one or more RRC messages. The one or more messages may comprise configuration parameters for one or more cells. The one or more messages may comprise uplink transmissions without grant (e.g., SPS and/or grant-free) configuration parameters. At least part of the uplink transmissions without grant configuration parameters may be common among the SPS and grant-free. The uplink transmissions without grant configuration parameters may indicate an interval for uplink transmissions without grant resources. The interval may indicate a period of time for uplink transmissions without grant and/or a period of time for the uplink transmissions without grant and one or more repetitions of the uplink transmissions without grant. The uplink transmissions without grant configuration parameters may comprise power control related parameters. The uplink transmissions without grant configuration parameters may comprise time/frequency resources, DMRS (e.g., wireless device-specific DMRS) configuration parameters, TBS/MCS, HARQ relate parameters, etc. The uplink transmissions without grant configuration parameters may comprise a first RNTI and an index. The first RNTI may be used for transmission, by a base station, of a DCI (e.g., group common DCI) comprising a plurality of HARQ feedbacks corresponding to uplink transmissions without grant for a plurality of wireless devices. The index may be used by the wireless device to identify at least one HARQ feedback (e.g., ACK AND/OR NACK) in a plurality of HARQ feedbacks. The wireless device may transmit at least one first TB corresponding to at least one HARQ process using at least one uplink transmissions without grant resource (e.g., SPS resource or grant free resource). The wireless device may identify the at least one HARQ process using the radio resources (e.g., time and frequency resources) for transmission of the at least one TB. The wireless device may monitor a common search space for a DCI corresponding to the first RNTI. The common search space may be on a primary cell. The common search space may be on a secondary cell. The common search space may be on the cell configured with uplink transmissions without grant resources. The wireless device may identify at least one HARQ feedback, in the plurality of HARQ feedbacks, corresponding to the at least one first TB at least based on the index. An example 1600 is shown in FIG. 16. The index may identify a plurality of HARQ feedbacks for a wireless device, for example, if the wireless device has a plurality of pending HARQ feedbacks and/or if the wireless device transmits a plurality of TBs using uplink transmissions without grant resources. The wireless device may transmit at least one second TB using the at least one HARQ process based on the at least one HARQ feedback indicating ACK.

Figure 15:
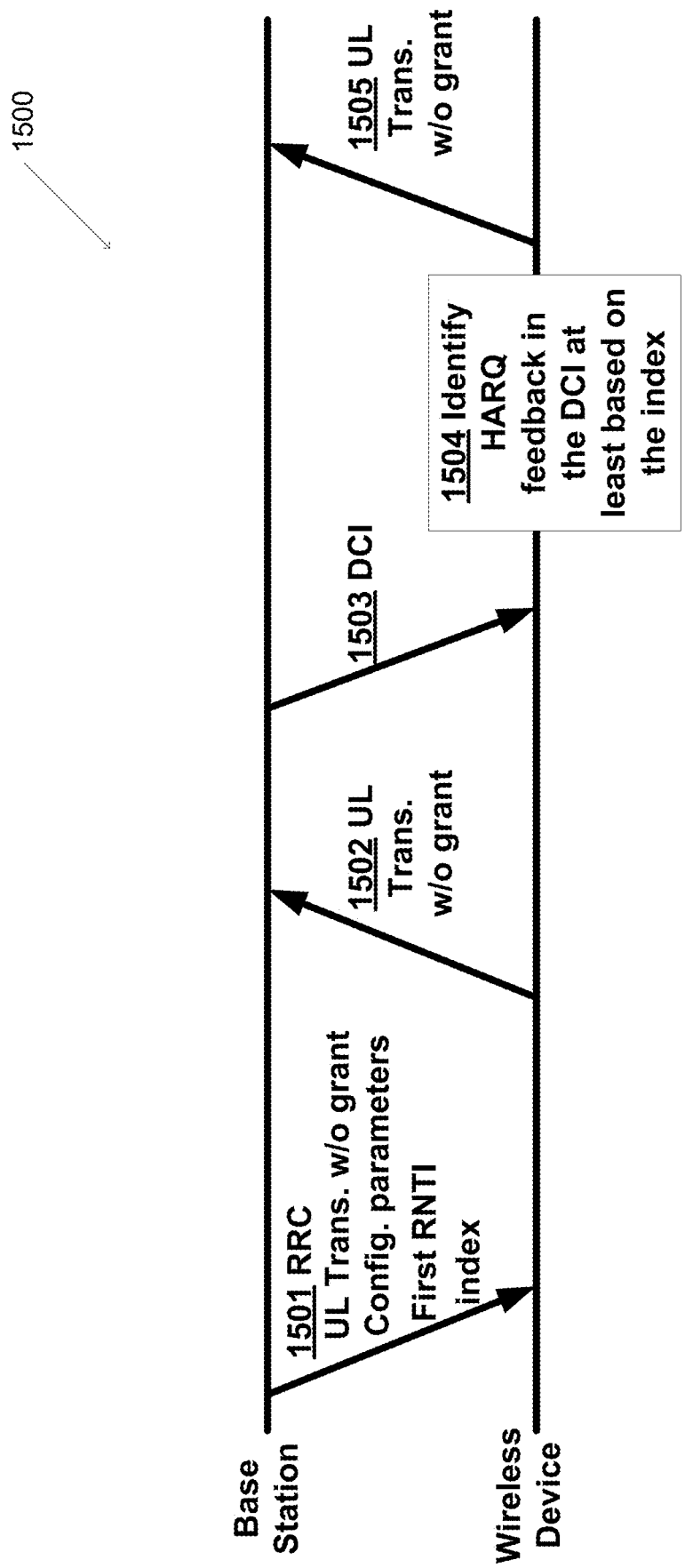
FIG. 15 is an example HARQ feedback procedure.

A wireless device may be configured with a first RNTI and an index. The wireless device may receive one or more RRC messages configuring the first RNTI and the index. The wireless device may receive a DCI (e.g., a group common DCI) corresponding to the first RNTI. The DCI may comprise a plurality of ACKs and/or NACKs for a plurality of wireless devices configured with the same first RNTI. The wireless device may identify at least one ACK AND/OR NACK in the plurality of ACKs and/or NACKs corresponding to at least one TB using at least the index. An example is shown in FIG. 15. The example 1500 includes a base station transmitting a RRC message including GF UL transmission configuration parameters and a first RNTI index at step 1501. At step 1502, the wireless device may transmit a GF UL transmission. At step 1503, the base station may transmit the DCI. At step 1504, the wireless device may identify HARQ feedback in the DCI at least based on the index. At step 1505, the wireless device may transmit a GF UL transmission. The at least one TB may be transmitted using radio resources for uplink transmissions without grant (e.g., SPS and/or grant free resources). The wireless device may receive one or more a DCIs configuring the first RNTI and the index. The wireless device may receive a DCI (e.g., a group common DCI) corresponding to the first RNTI. The DCI may comprise a plurality of ACKs and/or NACKs for a plurality of wireless devices configured with the same first RNTI. The wireless device may identify, in the plurality of ACKs and/or NACKs, at least one ACK AND/OR NACK corresponding to at least one TB using at least the index. The at least one TB may be transmitted using radio resources for uplink transmissions without grant (e.g., SPS and/or grant free resources).

Figure 17:
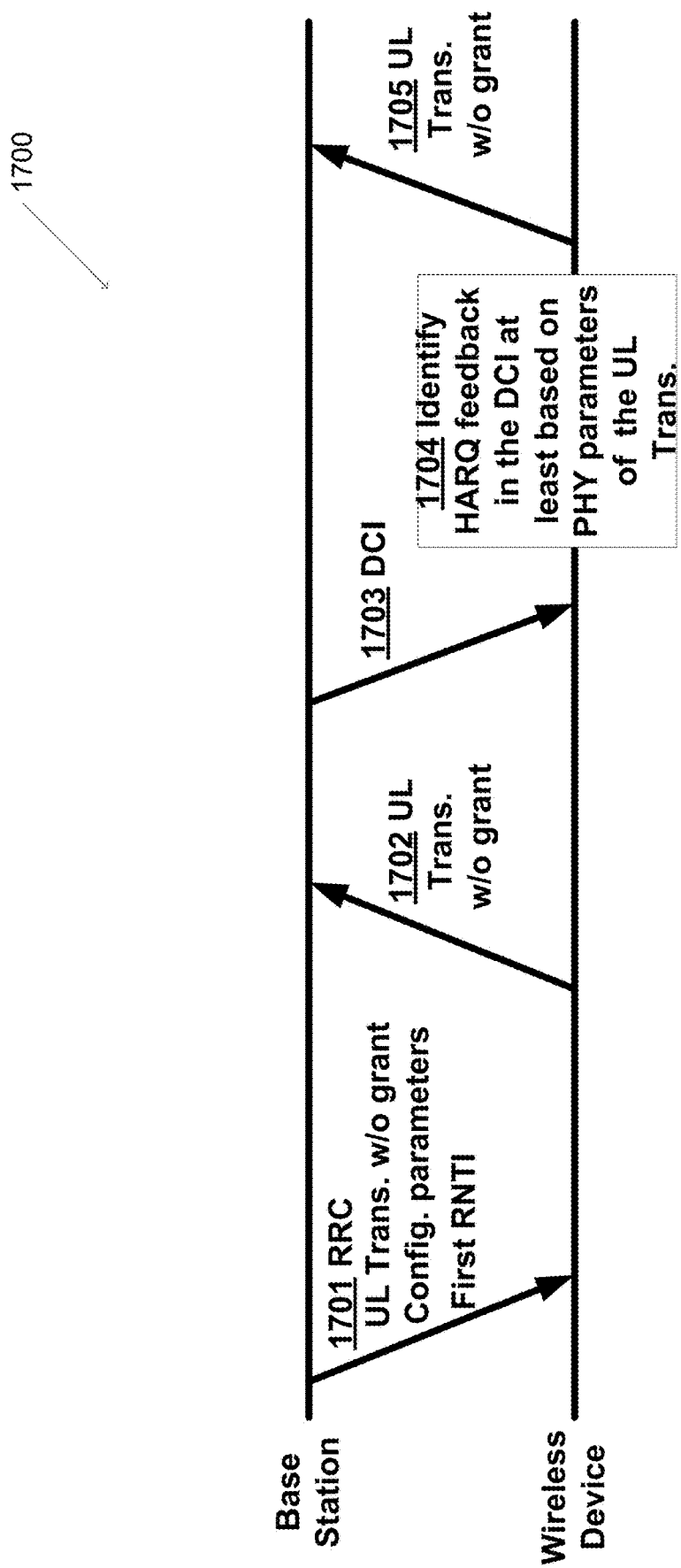
FIG. 17 is an example HARQ feedback procedure.

A wireless device may be configured with the first RNTI. The wireless device may receive one or more RRC messages configuring the first RNTI. The wireless device may receive a DCI (e.g., a group common DCI) corresponding to the first RNTI. The DCI may comprise a plurality of ACKs and/or NACKs for a plurality of wireless devices configured with the same first RNTI. The wireless device may identify at least one ACK AND/OR NACK, in the plurality of ACKs and/or NACKs, corresponding to at least one TB using at least one or more physical layer parameters corresponding to the at least one uplink transmission of the at least one TB. An example is shown in FIG. 17. The example 1700 includes a base station transmitting a RRC message including GF UL transmission configuration parameters and a first RNTI index at step 1701. At step 1702, the wireless device may transmit a GF UL transmission. At step 1703, the base station transmits the DCI. At step 1704, the wireless device may identify HARQ feedback in the DCI at least based on one or more first parameters (e.g., physical layer (PHY) parameters) configured via RRC messages. At step 1705, the wireless device may transmit a GF UL transmission. The one or more first parameters may comprise radio resources for the at least one uplink transmission (e.g., time/frequency resources of the at least one uplink transmission, etc.) and/or a DMRS (e.g., DMRS sequence) used in the at least one uplink transmission and or wireless device specific ID. A wireless device may receive one or more messages. The one or more messages may comprise one or more RRC messages. The one or more messages may comprise configuration parameters for one or more cells. The one or more messages may comprise uplink transmissions without grant (e.g., SPS and/or grant-free) configuration parameters. At least part of the uplink transmissions without grant configuration parameters may be common among the SPS and grant-free. The uplink transmissions without grant configuration parameters may indicate an interval for uplink transmissions without grant resources. The interval may indicate a period of time for uplink transmissions without grant and/or a period of time for the uplink transmissions without grant and one or more repetitions of the uplink transmissions without grant. The uplink transmissions without grant configuration parameters may comprise power control related parameters. The uplink transmissions without grant configuration parameters may comprise time/frequency resources, DMRS (e.g., wireless device-specific DMRS) configuration parameters, TBS/MCS, HARQ relate parameters, etc. the uplink transmissions without grant configuration parameters may comprise a first RNTI. The first RNTI may be used for transmission, by a base station, of a DCI (e.g., group common DCI) comprising a plurality of HARQ feedbacks corresponding to uplink transmissions without grant for a plurality of wireless devices. The wireless device may transmit at least one first TB corresponding to at least one HARQ process using at least one uplink transmissions without grant resource, for example, a SPS resource or grant free resource. The wireless device may identify the at least one HARQ process using the radio resources (e.g., time and frequency resources) for transmission of the at least one TB. The wireless device may monitor a common search space for a DCI corresponding to the first RNTI. The common search space may be on a primary cell. The common search space may be on a secondary cell. The common search space may be on the cell configured with uplink transmissions without grant resources. The wireless device may identify, in the plurality of HARQ feedbacks, at least one HARQ feedback corresponding to the at least one first TB at least based on the one or more first parameters corresponding to the at least one uplink transmission of the at least one TB. The one or more first parameters may comprise radio resources for the at least one uplink transmission (e.g., time/frequency resources of the at least one uplink transmission, etc.) and/or a DMRS (e.g., DMRS sequence) used in the at least one uplink transmission and/or a wireless device specific ID. The one or more first parameters used for uplink transmissions without grant (e.g., for one or more TBs of uplink transmissions without grant) may determine an order in the plurality of HARQ feedbacks that determines the at least one HARQ feedback corresponding to the uplink transmissions without grant.

The wireless device may monitor a common search space for a DCI at least for a portion of a period of time. The period of time may be pre-configured. The period of time may be a time duration for transmission of uplink transmissions without grant and one or more repetition of the uplink transmissions without grant. The period of time may be the RRC configured time interval value for the uplink transmissions without grant. The period of time may be configured by RRC. The period of time may be indicated in a DCI, e.g., the DCI activating the uplink transmissions without grant. The wireless device may start a timer based on transmitting uplink transmissions without grant. The timer value may be the period of time. The portion of the period of time may be the time until the DCI comprising HARQ feedback (e.g., the group common DCI) is received. The wireless device may stop the timer based on receiving the DCI comprising the HARQ feedback (e.g., the group common DCI). If the wireless device does not receive the DCI comprising the HARQ feedback within the period of time, the wireless device may assume an ACK. If the wireless device does not receive a DCI comprising the HARQ feedback within the period of time, the wireless device may assume a NACK.

A DCI (e.g., group common DCI) may comprise a plurality of HARQ feedbacks for a plurality of wireless devices. The DCI may comprise a plurality of HARQ feedbacks for a wireless device in the plurality of wireless devices. The plurality of HARQ feedbacks for the wireless device may correspond to a plurality of HARQ process IDs. The wireless device may identify a HARQ process ID corresponding to a HARQ feedback in the plurality of HARQ feedbacks. The wireless device may identify a HARQ process ID corresponding to a HARQ feedback in the plurality of HARQ feedbacks based on a rule. The DCI may indicate the HARQ feedbacks and/or the HARQ process IDs associated with the HARQ feedbacks and/or the number of HARQ feedbacks for a wireless device. The DCI may comprise one or more fields and the one or more fields may indicate the HARQ feedbacks and/or the HARQ process IDs associated with the HARQ feedbacks and/or the number of HARQ feedbacks for the wireless device. The one or more fields in the DCI may be a bitmap field. The bitmap field may indicate the number of HARQ feedbacks and/or the HARQ feedbacks for a wireless device and/or the HARQ process IDs associated with the HARQ feedbacks for the wireless device. A first field in the one or more fields may identify a wireless device and/or one or more HARQ feedbacks of a wireless device (e.g., one or more HARQ feedback corresponding to one or more HARQ process). Another field in the DCI may indicate the one or more HARQ feedbacks corresponding to the first field.

A wireless device may expect a first plurality of pending HARQ feedbacks for a plurality of TBs. The plurality of TBs may correspond to a plurality of HARQ process IDs. A first plurality of TBs in the plurality of TBs may correspond to a same HARQ process ID and/or same uplink transmissions without grant. The wireless device may receive a second plurality of HARQ feedbacks (ACK AND/OR NACKs) in a DCI comprising the HARQ feedbacks. The second plurality of HARQ feedbacks may be less than the first plurality of HARQ feedbacks. The wireless device may associate the second plurality of HARQ feedbacks with one or more HARQ feedbacks in the first plurality of pending HARQ feedbacks. The wireless device may assume ACK for the other pending HARQ feedbacks. If a wireless device receives one ACK AND/OR NACK in the DCI comprising the HARQ feedback and the wireless device expects a plurality of ACK AND/OR NACKs, the wireless device may assume the ACK AND/OR NACK indicated in the DCI for a latest transmitted TB and may assume ACK for the other TBs. The wireless device may assume the ACK AND/OR NACK indicated in the DCI for all pending HARQ feedbacks and/or TBs.

The DCI comprising the HARQ feedbacks for uplink transmissions without grant may have one of a plurality of sizes. The DCI comprising the HARQ feedbacks for uplink transmissions without grant may be one of a plurality of a DCI formats. The base station may determine the one of the plurality of a DCI formats/sizes bases on one or more criteria. The one or more criteria may comprise the number of the plurality of HARQ feedbacks included in the DCI. Other rules/criteria may be used by the base station to determine the DCI format/size. The plurality of a DCI formats/sizes may be pre-configured for the wireless device. The DCI formats/sizes may be configured for the wireless device. The wireless device may receive one or more messages indicating the plurality of formats/sizes. The wireless device may monitor the DCI for the plurality of a DCI formats/sizes.

A base station may transmit a wireless device-specific DCI to a wireless device. The wireless device-specific DCI may comprise HARQ feedback corresponding to the GF UL transmission of the wireless device. The wireless device-specific DCI may result in a signaling overhead due to a base station coordinating a schedule of a plurality of HARQ feedback transmissions for a plurality of wireless devices configured with GF UL transmission. Coordinating a plurality of HARQ feedback transmissions may result in increasing complexity of signal processing at the base station side and/or a delay to schedule a HARQ feedback for the wireless device.

A base station may use an index-based group-common DCI to indicate one or more HARQ feedbacks for one or more wireless devices configured with GF UL transmission. An index-based group-common DCI (e.g., DCI 3/3A) may be used for the GF UL transmission in a wireless network. The uplink transmissions without grant configuration parameters may comprise a first RNTI and an index. The first RNTI may be used, by a base station, for a transmission of the index-based group common DCI. The index-based group common DCI may comprise one or more HARQ feedbacks corresponding to uplink transmissions without grant for one or more wireless devices. The index may be used by a wireless device to identify at least one HARQ feedback (e.g., ACK AND/OR NACK) from a plurality of HARQ feedbacks in the DCI. The index-based group-common DCI may comprise a series of one or more HARQ feedbacks as described with respect to FIG. 16 and, based on the index, the wireless device may identify a position of HARQ feedback for the wireless device from the one or more HARQ feedbacks in the index-based group-common DCI.

The size of the index-based group-common DCI may be fixed and/or semi-statically updated to reduce processing complexity for a DCI decoding at the wireless device side. A base station may configure a first wireless device with a same RNTI configured with one or more wireless devices The first wireless device may be configured with an index different from any of indices configured with the one or more wireless devices. If the first wireless device does not transmit at least one TB via GF radio resource, the base station may not drop a first field for the first wireless device from the index-based group-common DCI to keep the size of the index-based group-common DCI and/or to avoid additional signaling to update the size of the index-based group-common DCI and/or to avoid additional signaling to update indices for at least one of the one or more wireless devices. The first field carried by the index-based group-common DCI may be used to keep a particular size. A value (e.g., ACK or NACK) in the first field may not be used by the first wireless device and/or the one or more wireless devices. For example, if a wireless device does not transmit a TB via GF radio resources, the wireless device may not use the first filed identified from an index-based group common DCI based on a size and an index configured to the wireless device.

A base station may configure one or more wireless device with a same RNTI for an index-based group common DCI used for one or more GF UL transmission. each of the one or more wireless device may be configured with a different index that may indicate a position of HARQ feedback in the index-based group common DCI. The size of the index-based group common DCI may be predefined to avoid blind decoding at the one or more wireless device. As a number of wireless devices (configured with a same RNTI with different indices) does not transmit a TB via GF radio resources increases, a number of fields (used for keeping a size of the index-based group-common DCI) not used by any wireless device may increase. Identifying a HARQ feedback from the index-based group-common DCI based on the index may result in inefficient use of downlink radio resources. For example, with the index-based group-common DCI, for one or more wireless devices within the same group of the index-based group common DCI, the probability that more than one wireless device transmits simultaneously may be small. For example, if a wireless device uses GF radio resources for transmission of sporadic traffic (e.g., URLLC), the wireless device may skip one or more GF radio resources (if no data transmits), which may imply that the resource saving from the index-based group-common DCI may be small. If there are N wireless devices supported in the system wherein each wireless device may have M HARQ processes, the index-based group-common DCI may need N*M bits. For example, if there is a high number of wireless devices supported in the system with sporadic traffic, most of the HARQ feedback fields may not be utilized, for example, due to wireless devices' inactivity, which may lead to inefficient resource utilization.

A group-common DCI may comprise one or more wireless device identifiers. A base station may configure a wireless device with a first identifier of the wireless device. The first identifier may be the one assigned for wireless device identification from the group-common DCI. The first identifier may be an index or a parameter used for the base station to detect a wireless device ID from one or more shared GF UL radio resources. One or more parameters used for a wireless device specific DMRS along with a GF radio resource pool configuration used to identify a wireless device identity may be used for the first identifier, for example, a root index of a set of Zadoff-Chu (ZC) sequences, a cyclic shift (CS) index, a TDM/FDM pattern index, an orthogonal cover code (OCC) sequences or index, or a combination thereof, may be used as the first identifier.

Figure 18A:
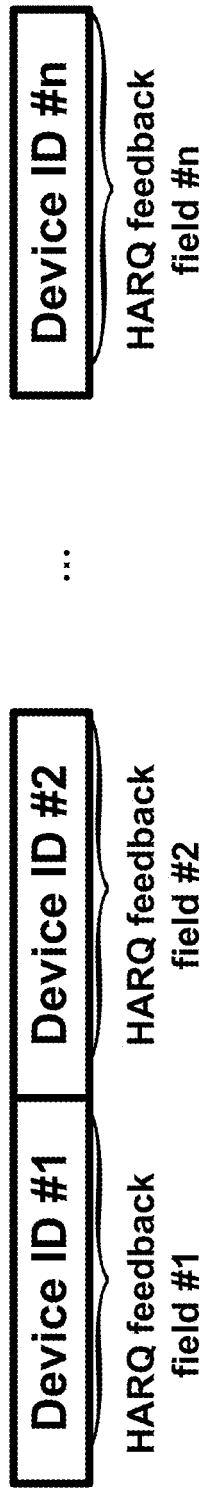
FIG. 18A, FIG. 18B, and FIG. 18C are examples of group-common DCI formats.
Figure 18B:
Figure 18C:
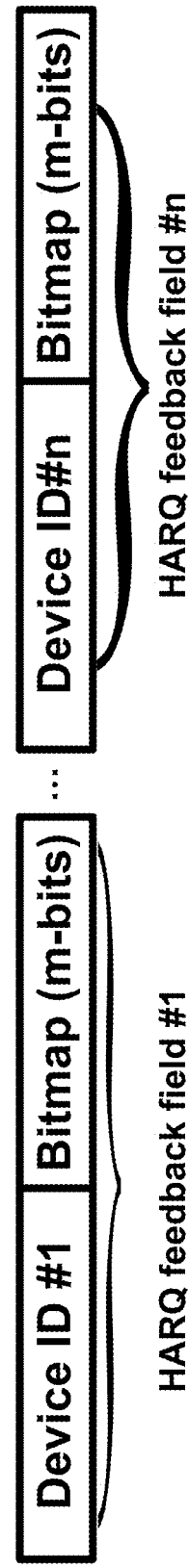

A group-common DCI may comprise one or more HARQ feedback fields, wherein each of the one or more HARQ feedback fields may comprise a wireless device identifier as illustrated in FIG. 18A. A group-common DCI may comprise one or more HARQ feedback fields, wherein each of the one or more HARQ feedback fields may comprise a wireless device identifier and its associated HARQ process number (HPN) as illustrated in FIG. 18B. If a wireless network allows more than one HARQ process for a GF UL transmission, a bitmap for the HARQ processes of a wireless device may be used as illustrated in FIG. 18C. A group-common DCI may comprise at least one HARQ feedback field wherein the at least one HARQ feedback field may comprise a wireless device identifier and HARQ process number (and/or HARQ processes bitmap.

A group-common DCI comprising one or more wireless device identifiers for HARQ feedbacks may enhance a resource utilization. A HARQ feedback field may comprise a wireless device identifier and its associated HARQ process number (HPN). With this method, $(\log_2 N + \log_2 M)K$ bits may be required to transmit HARQ feedbacks to K wireless devices, wherein each wireless device may have M HARQ processes. For example, a bitmap for the HARQ processes may be used instead of the HPN. The number of bits utilized to transmit HARQ feedbacks to K wireless devices (each wireless device may have M HARQ processes) may be $(\log_2 N + M)K$ if the bitmap for the HARQ processes is used.

A size of the group-common DCI may be fixed to reduce processing at a wireless device side. A wireless device may search the group-common DCI from a common search space in a PDCCH with a plurality of possible sizes (e.g., brute force searching) if a size of a group-common DCI is not known to the wireless device. The size predetermined and/or provided to the wireless device before detecting the group-common DCI may alleviate processing overhead for detecting and/or decoding the group-common DCI at the wireless device side. The size of the group-common DCI may be predetermined and/or provided to a wireless device before the wireless device receives the group-common DCI. The size of the group-common DCI may be pre-determined by the wireless network. The size of the group-common DCI may be provided to a wireless device via RRC signaling before the wireless device starts to monitor a PDCCH for the group-common DCI. The size of the group-common DCI may be configured and/or updated via L1 signaling (e.g., via a DCI) before the wireless device starts to monitor a PDCCH for the group-common DCI.

A size of group-common DCI may depend on at least statistics of a number of wireless devices transmitting at least one TB during one or more TTIs among wireless devices configured with a same RNTI for GF UL transmission, wherein a unit of TTI may be subframe, slot, and/or mini-slot. The presence of a first identifier of a first wireless device in the group-common DCI may indicate ACK or NACK. An absence of a first identifier of a first wireless device in the group-common DCI may indicate ACK or NACK. A wireless network may pre-define whether a presence of a first identifier of a first wireless device in the group-common DCI indicate ACK or NACK. A wireless network may pre-define whether an absence of a first identifier of a first wireless device in the group-common DCI imply ACK or NACK. The group-common DCI comprising one or more wireless device identifiers may not comprise a first identifier of a first wireless device if the first wireless device does not transmit a TB via a GF radio resource. The group-common DCI comprising one or more wireless device identifiers may not comprise a first identifier of a first wireless device if the first wireless device transmits one or more TBs via GF radio resource to a base station but the base station fails to decode the one or more TBs. The group-common DCI may comprise a first identifier of a first wireless device if the first wireless device does not transmit a TB via a GF radio resource. The group-common DCI may comprise a first identifier of a first wireless device if the first wireless device transmits one or more TBs via the GF radio resource to base station but the base station fails to decode the one or more TBs.

Figure 19A:
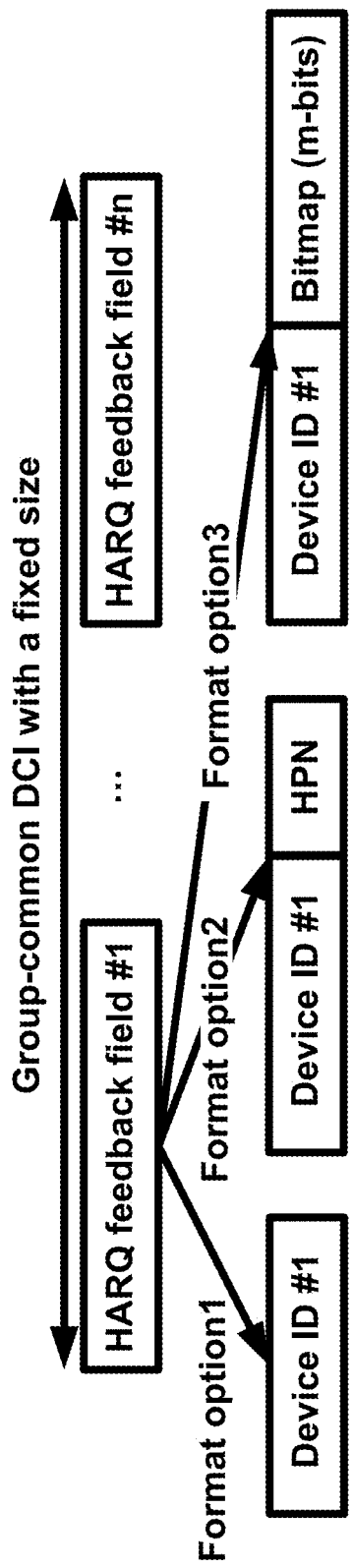
FIG. 19A and FIG. 19B are example of group-common DCI formats.
Figure 19B:
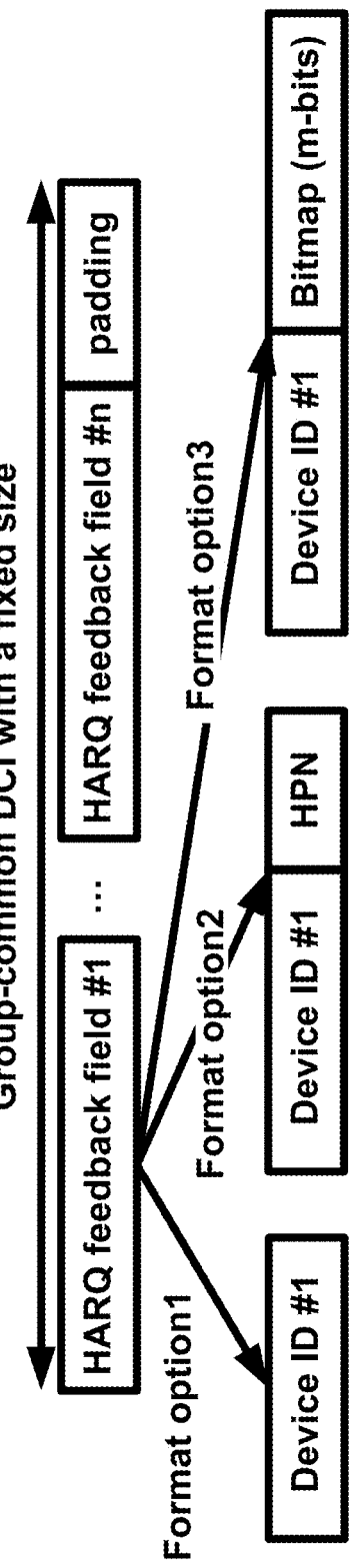

A size of a group-common DCI may not be enough to carry HARQ feedbacks of one or more wireless devices having a same RNTI (e.g., RNTI may be used to scramble the group-common DCI at a base station, and be used to detect the group-common DCI from a searching space in a PDCCH at a wireless device side) assigned for GF UL transmission, wherein the group-common DCI may comprise one or more wireless device identifiers. A base station may transmit one or more group-common DCIs scrambled by the same RNTI. A base station may transmit at least one group-common DCI carrying the one or more HARQ feedback fields as illustrated in FIG. 19A if the size of the group-common DCI is enough to carry one or more HARQ feedbacks. The HARQ feedback fields may comprise a wireless device identifier, a HARQ processing number, and/or a bitmap, wherein a value of the bitmap may be associated with a HARQ processing number. The base station may append one or more padding bits (e.g., zero padding) to the group-common DCI such that the size of the group-common DCI keeps the same to a predetermined or semi-statically configured size of the group-common DCI as illustrated in FIG. 19B if the group-common DCI has an enough space to carry one or more HARQ feedback fields and there is a remaining space in the group-common DCI. A group-common DCI may comprise one or more HARQ feedback fields and one or more padding bits, wherein each of one or more HARQ feedback fields may comprise at least one of following: a wireless device identifier, a HARQ processing number, or a bitmap associated with a HARQ processing number. A base station may transmit one or more group-common DCIs scrambled by the same RNTI if a size of the group-common DCI is not enough to carry one or more HARQ feedbacks, wherein the one or more group-common DCIs may comprise one or more wireless device identifiers, and a union of the one or more wireless device identifiers may correspond to one or more wireless devices that transmit at least one TB via GF radio resources and wait for at least one HARQ feedback.

Figure 20:
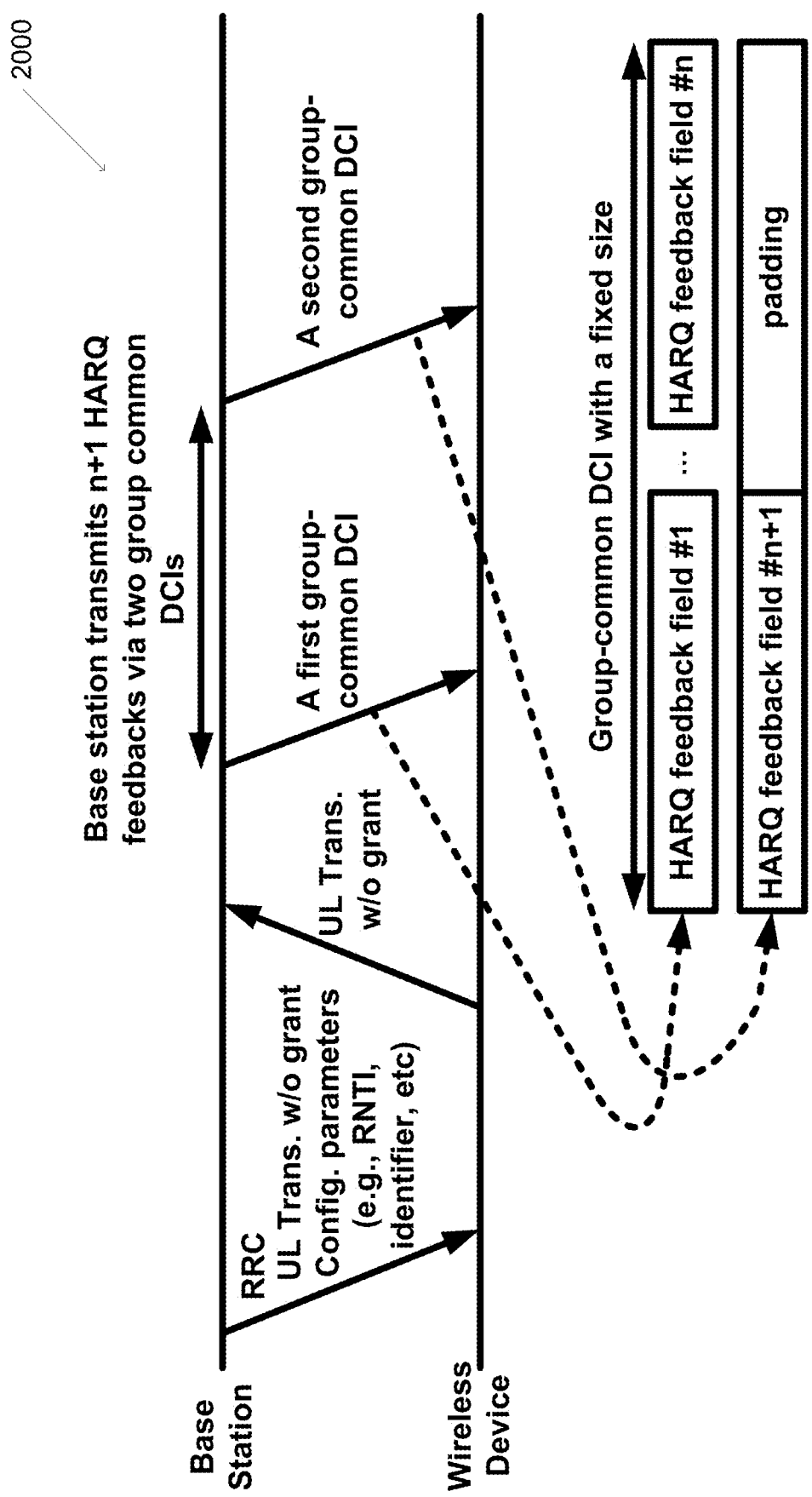
FIG. 20 is an example HARQ feedback procedure.

FIG. 20 shows an example 2000 of two group-common DCIs transmitted by base station. A base station may have one or more first HARQ feedbacks of one or more first wireless devices and one or more second HARQ feedbacks of one or more second wireless devices. If a predetermined or semi-statically configured size of a group common DCI is not enough carry the one or more first HARQ feedbacks and the one or more second HARQ feedbacks, the base station may transmit two group-common DCIs scrambled with a same RNTI, a first group common DCI comprising the one or more first HARQ feedbacks, and/or a second group common DCI comprising the one or more second HARQ feedbacks. For example, the first group common DCI may comprise one or more first identifiers of the one or more first wireless devices with the one or more first HARQ feedbacks, and the second group-common DCI may comprise one or more second identifiers of the one or more second wireless device identifiers with one or more padding bits.

A wireless device that transmits at least one TB via at least one GF radio resource and that waits for at least one HARQ feedback corresponding to a transmission of the at least one TB may receive one or more group-common DCI scrambled by the same RNTI, wherein the wireless device may be configured with the same RNTI via at least one RRC message. As illustrated in FIG. 21A, the wireless device may stop monitoring a PDCCH for a group-common DCI scrambled by the same RNTI if the wireless device detects the group-common DCI comprising at least a wireless device identifier associated with the wireless device. The presence of the wireless device identifier may indicate ACK. The presence of the wireless device identifier may indicate NACK. As illustrated in FIG. 21B, the wireless device may keep monitoring a PDCCH for a group-common DCI scrambled by the same RNTI if the group-common DCI that the wireless device detects do not comprise a wireless device identifier associated with the wireless device.

A wireless device may be configured with a timer (or time window/duration) value for monitoring a PDCCH for one or more group-common DCI. A unit of the timer value may be subframe, slot, and/or mini-slot. There may be one or more ways to start the timer. The timer may start based on transmitting an initial transmission. The timer may start based on transmitting an initial transmission with a time offset, wherein the time offset may be predetermined. The timer may start based on transmitting a last retransmission of K repetition. The timer may start based on transmitting a last retransmission of K repetition with the time offset. A wireless device may stop monitoring the PDCCH for one or more group-common DCIs if the timer is running if the wireless device detects at least one group-common DCI comprising a wireless device identifier associated with the wireless device. A wireless device may stop monitoring the PDCCH for one or more group-common DCIs based on an expiry of the timer if no group-common DCI is received prior to an expiry of the timer as shown in FIG. 22A. A wireless device may stop monitoring the PDCCH for one or more group-common DCIs based on an expiry of the timer if none of group-common DCIs detected prior to an expiry of the timer comprises a wireless device identifier associated with the wireless device as shown in FIG. 22B. A wireless device may stop monitoring the PDCCH for one or more group-common DCIs based on an expiry of the timer if the wireless device does not receive at least one HARQ feedback (in at least one group-common DCI) corresponding to a transmission of at least one TB and the timer expires, the wireless device may retransmit the at least one TB via one or more GF radio resources. The wireless device may transmit, via at least one radio resource, the RV of the at least one TB, for example, if the wireless device receives, prior to an expiry of the timer, an UL grant for a transmission of a redundancy version (RV) of the at least one TB. The UL grant may comprise at least one field indicating the at least one radio resource for the transmission, and the RV is pre-configured. The wireless device may repeat the previous transmission of the at least one TB if neither an ACK nor a NACK is received if the timer expires.

A wireless device may be configured with a TTI counter value (e.g. k may be a TTI counter value) for monitoring a PDCCH for one or more group-common DCIs, wherein a unit of the TTI counter value may be subframe, slot, and/or mini-slot. There may be one or more ways to start TTI counting. The wireless device may start to count one or more TTIs based on transmitting an initial transmission. The wireless device may start to count one or more TTIs based on transmitting an initial transmission with a time offset, wherein the time offset may be predetermined. The wireless device may start to count one or more TTIs based on transmitting a last retransmission of K repetitions. The wireless device may start to count one or more TTIs based on transmitting a last retransmission of K repetitions with the time offset. The wireless device may stop monitoring the PDCCH for one or more group-common DCI if the counted one or more TTIs is equal to (or greater than) the TTI counter. The wireless device may start to monitor the PDCCH from the $n^{th}$ TTI and may stop the PDCCH monitoring at $(n+k)^{th}$ TTI if the wireless device starts to count one or more TTIs at the $n^{th}$ TTI. A wireless device may stop monitoring the PDCCH for one or more group-common DCIs if the wireless device detects at least one group-common DCI comprising a wireless device identifier associated with the wireless device if the counted one or more TTIs is less than the TTI counter. A wireless device may stop monitoring the PDCCH for one or more group-common DCIs based on the counted one or more TTIs reaching the TTI counter if no group-common DCI is received prior to the counted one or more TTIs reaching the TTI counter as shown in FIG. 23A. A wireless device may stop monitoring the PDCCH for one or more group-common DCIs based on the counted one or more TTIs reaching the TTI counter if no group-common DCI is received prior to the counted one or more TTIs reaching the TTI counter if none of group-common DCIs detected prior to the counted one or more TTIs reaching the TTI counter comprises a wireless device identifier associated with the wireless device as shown in FIG. 23B. The wireless device may retransmit the at least one TB via one or more GF radio resources, for example, if the wireless device does not receive at least one HARQ feedback (in at least one group-common DCI) corresponding to a transmission of at least one TB and the counted one or more TTIs reaching (exceeding/being equal to) the TTI counter. If the wireless device receives, prior to the counted one or more TTIs reaching (exceeding/being equal to) the TTI counter, an UL grant for a transmission of a redundancy version (RV) of the at least one TB, the wireless device may transmit, via at least one radio resource, the RV of the at least one TB. The UL grant may comprise at least one field indicating the at least one radio resource for the transmission, and the RV is pre-configured. The wireless device may repeat the previous transmission of the at least one TB if neither ACK nor NACK is received if the counted one or more TTIs reaching (exceeding/being equal to) the TTI counter.

Figure 24A:
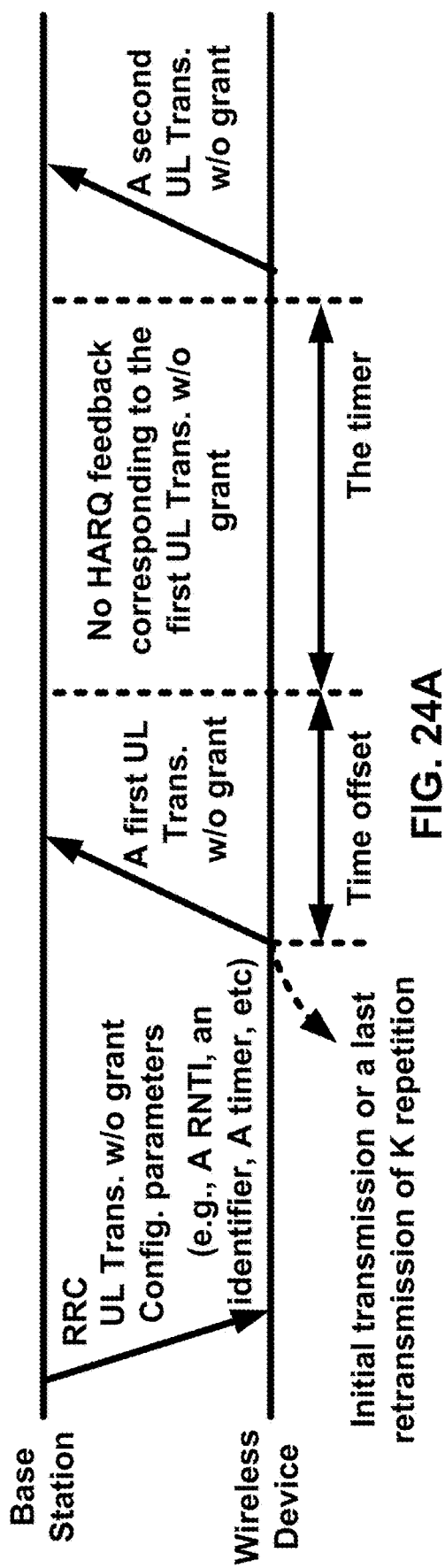
FIG. 24A and FIG. 24B are example HARQ feedback procedures.
Figure 24B:
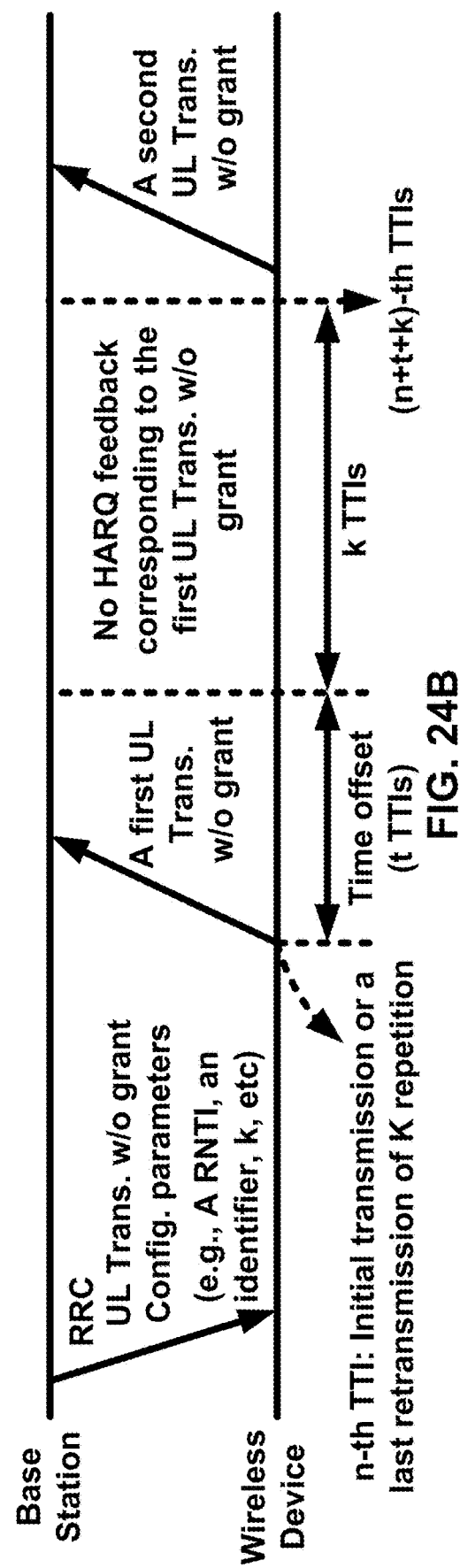

A wireless device that transmits at least one TB via at least one GF radio resource may receive, from base station, one or more group-common DCI scrambled RNTI configured with the wireless device for GF UL transmission. The wireless device may determine an implicit NACK corresponding to a transmission of the at least one TB if the one or more group-common DCIs do not comprise an identifier associated with the wireless device. The wireless device may determine an implicit ACK corresponding to a transmission of the at least one TB if the one or more group-common DCIs do not comprise an identifier associated with the wireless device. The wireless device may not retransmit the at least one TB via one or more GF radio resources if the one or more group-common DCIs do not comprise an identifier associated with the wireless device. The wireless device may not retransmit the at least one TB via one or more GF radio resources if a latency requirement associated with the at least one TB is tight (e.g., if a time budget required for retransmission does not fulfill the latency requirement). If the wireless device does not receive at least one HARQ feedback (in at least one group-common DCI) corresponding to a transmission of at least one TB and the timer expires, the wireless device may retransmit the at least one TB via one or more GF radio resources as illustrated in FIG. 24A. The wireless device may retransmit the at least one TB via one or more GF radio resources as illustrated in FIG. 24B, for example, if the wireless device does not receive at least one HARQ feedback (in at least one group-common DCI) corresponding to a transmission of at least one TB and the counted one or more TTIs reaching (exceeding/being equal to) the TTI counter.

Figure 25:
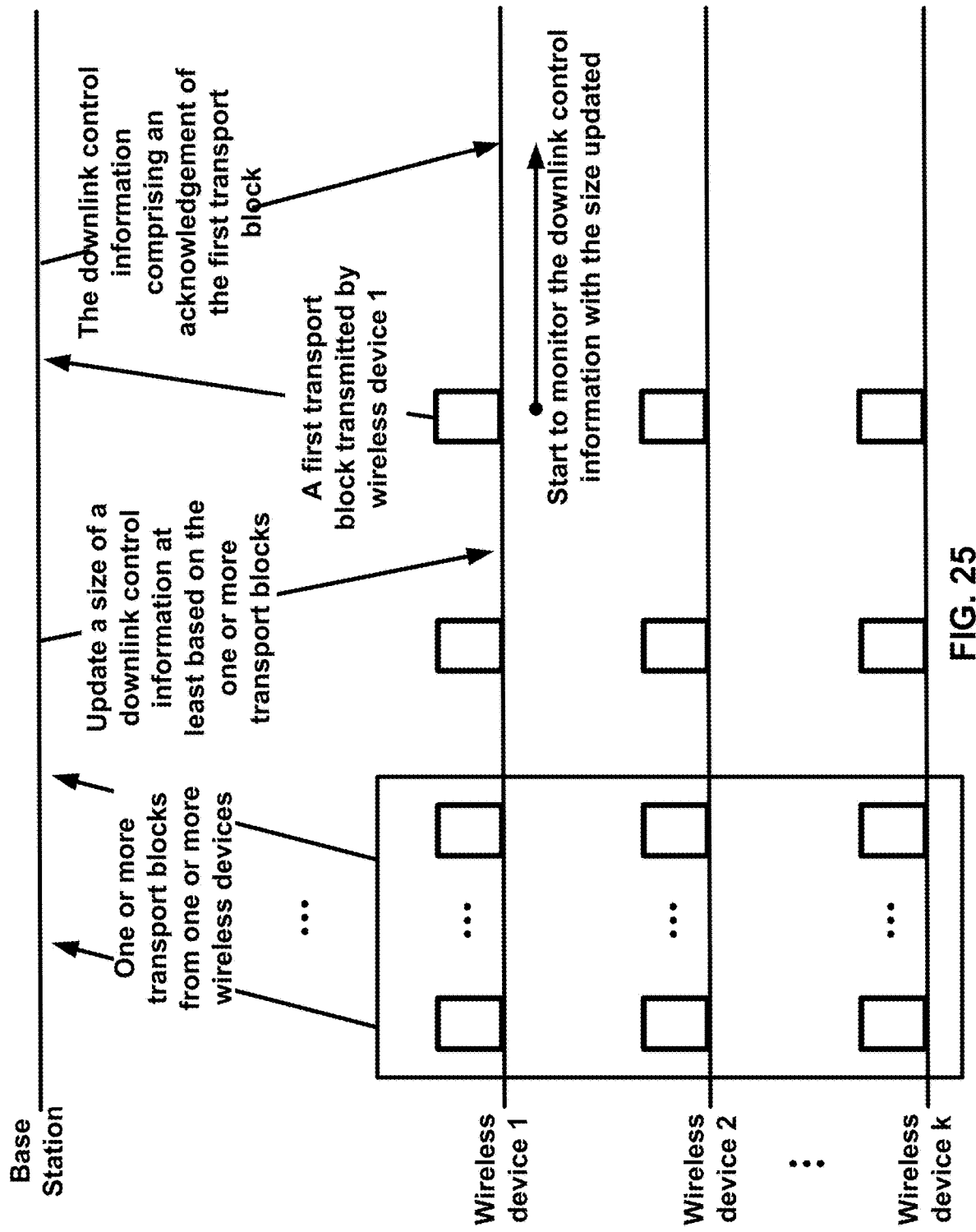
FIG. 25 is an example downlink control monitoring procedure.

FIG. 25 shows an example of a wireless device that may receive, from a base station, at least one RRC message comprising grant-free configuration parameters for indicating at least one of following: one or more grant-free radio resources configured for a grant-free uplink transmission; at least one information element (IE) indicating at least one group-common downlink control information (a DCI) size and/or format; a first identifier of the wireless device; or an RNTI. The wireless device may receive a first DCI comprising a field indicating one of the at least one IE. For example, a wireless device may be informed from a base station of an updated size of a group-common DCI. The wireless device may transmit, via the one or more grant-free radio resources, at least one transport block (TB). The wireless device may monitor a PDCCH for a group-common DCI at least based on a size associated with the one of the at least one IE. The wireless device may determine, depending on a presence or an absence of the first identifier in the group-common DCI, whether to keep or stop monitoring the PDCCH. The group-common DCI may be scrambled by the RNTI. The at least one RRC message further may comprise a timer value. The wireless device may start a timer with the timer value based on the transmission of the at least one TB. The wireless device may determine ACK or NACK based on the timer and the timer value. There are one or more ways to determine ACK or NACK. For example, the wireless device may determine ACK of the transmission of the at least one TB if no group-common DCI is received prior to an expiry of the timer or if none of the group-common DCI detected prior to an expiry of the timer comprises the first identifier. For example, the wireless device may determine NACK of the transmission of the at least one TB if no group-common DCI is received prior to an expiry of the timer or if none of the group-common DCI detected prior to an expiry of the timer comprises the first identifier. Whether to determine ACK or NACK based on an absence of the first identifier may be predefined. The wireless device may receive, prior to an expiry of the timer, an UL grant for a transmission of a redundancy version (RV) of the at least one TB, wherein the UL grant may comprise at least one field indicating at least one second radio resource for the transmission, and the RV may be pre-configured (and/or pre-defined). The wireless device may transmit, via the at least one second radio resource, the RV of the at least one TB.

A base station may determine a size of a group common DCI based on the statistics of one or more TBs received via one or more GF radio resources from one or more wireless devices. The statistics used to determine the one or more group common DCIs may be, e.g., a number of one or more TBs received via one or more GF radio resources within a given time duration, a number of one or more wireless devices transmitted at least one TB via the one or more GF radio resources within a given time duration, a number of initial transmissions via one or more GF radio resources within a given time duration, a number of retransmissions via one or more GF radio resources within a given time duration, a sum of initial transmissions and retransmissions via one or more GF radio resources, and/or a combination thereof. For example, the base station may assign one or more GF radio resources to one or more wireless devices. The base station may transmit one or more group common DCIs in response to receiving one or more TB transmissions. The base station may update a size of the one or more group common DCIs based on the statistics. The updated size may be provided to one or more wireless devices via control channel singling (e.g., RRC message and/or DCI). The control signaling may be wireless device specific. The control signaling may be non-wireless device specific.

A base station may allocate one or more GF radio resources to one or more wireless devices. Each of the one or more wireless device may or may not have a data to transmit via the one or more GF radio resources. For example, URLLC-type data (which may be sporadic) may not arrive at each of the one or more GF radio resources. If there is no data transmit via the one or more GF radio resources, a wireless device may skip to transmit via the one or more GF radio resource. The base station may measure the statistics of one or more TB transmitted from one or more wireless devices via the one or more GF radio resources. For example, if a size of group common DCI is small comparing with the statistics, the base station may increase the size and inform the one or more wireless devices of the updated size. For example, if a size of group common DCI is large comparing with the statistics, the base station may decrease the size and inform the one or more wireless devices of the updated size. The one or more wireless device may monitor a downlink control channel to detect one or more group common DCI based on the updated size.

A wireless device may receive, from a base station, at least one RRC message comprising grant-free configuration parameters for indicating at least one of following: one or more grant-free radio resources configured for a grant-free uplink transmission; an information element indicating at least one group-common downlink control information size and/or format; a first identifier of the wireless device; or an RNTI. The wireless device may transmit, via the one or more grant-free radio resources, at least one transport block. The wireless device may monitor a PDCCH for a group-common DCI at least based on a size associated with the IE. The wireless device may determine, depending on a presence or an absence of the first identifier in the group-common DCI, whether to keep or stop monitoring the PDCCH. The wireless device may activate the grant-free UL transmission based on receiving the at least one RRC message. The group-common DCI may be scrambled by the RNTI. The at least one RRC message may further comprise a timer. The wireless device may determine a retransmission of the at least one TB if no group-common DCI is received prior to an expiry of the timer or if none of group-common DCIs detected prior to an expiry of the timer comprises the first identifier. The wireless device may receive, prior to an expiry of the timer, an UL grant for a transmission of a redundancy version (RV) of the at least one TB, wherein the UL grant may comprise at least one field indicating at least one second radio resource for the transmission, and the RV may be pre-configured (and/or pre-defined). The wireless device may transmit, via the at least one second radio resource, the RV of the at least one TB.

A wireless device may receive, from a base station, at least one RRC message comprising grant-free configuration parameters for indicating at least one of following: one or more grant-free radio resources configured for a grant-free uplink transmission, a first identifier of the wireless device, and an RNTI. The wireless device may transmit, via the one or more grant-free radio resources, at least one transport block. The wireless device may monitor a PDCCH for a group-common DCI at least based on a size and/or format of a group-common downlink control information, wherein the size and/or format of a group-common downlink control information is pre-defined. The wireless device may determine, depending on a presence or an absence of the first identifier in the group-common DCI, whether to keep or stop monitoring the PDCCH. The wireless device may activate the grant-free UL transmission based on receiving the at least one RRC message. The group-common DCI is scrambled by the RNTI. The at least one RRC message further comprises a timer. The wireless device may determine a retransmission of the at least one TB if no group-common DCI is received prior to an expiry of the timer or if none of group-common DCIs detected prior to an expiry of the timer comprises the first identifier. The wireless device may receive, prior to an expiry of the timer, an UL grant for a transmission of a redundancy version (RV) of the at least one TB, wherein the UL grant may comprise at least one field indicating at least one second radio resource for the transmission, and the RV may be pre-configured (and/or pre-defined). The wireless device may transmit, via the at least one second radio resource, the RV of the at least one TB.

Figure 26:
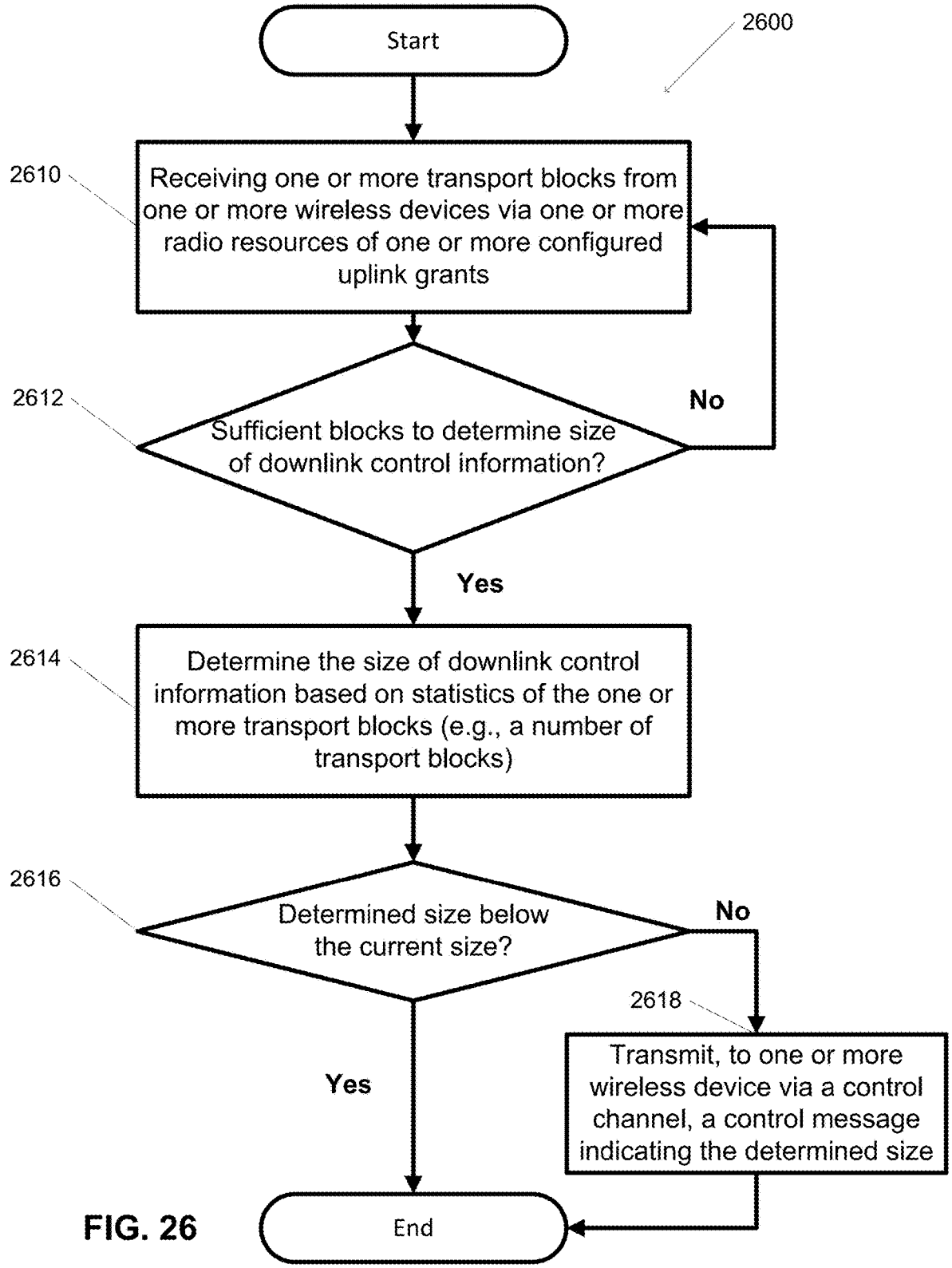
FIG. 26 is an example HARQ feedback procedure for a downlink channel.

FIG. 26 is an example HARQ feedback procedure for a downlink channel. Example 2600 includes a base station receiving (2610) one or more transport blocks from one or more wireless devices via one or more radio resources of one or more configured uplink grants. If a sufficient number of blocks to determine the size of the DCI are received (2612), the size of the downlink control information based on statistics of the one or more transport blocks (e.g., a number of transport blocks) can be determined (2614). If sufficient blocks are not received (2612), additional blocks can be received (2610). If the determined size of the DCI is different from a current size of the DCI (2616), a control message indicating the determined size can be transmitted (2618) to one or more wireless device via a control channel.

Figure 27:
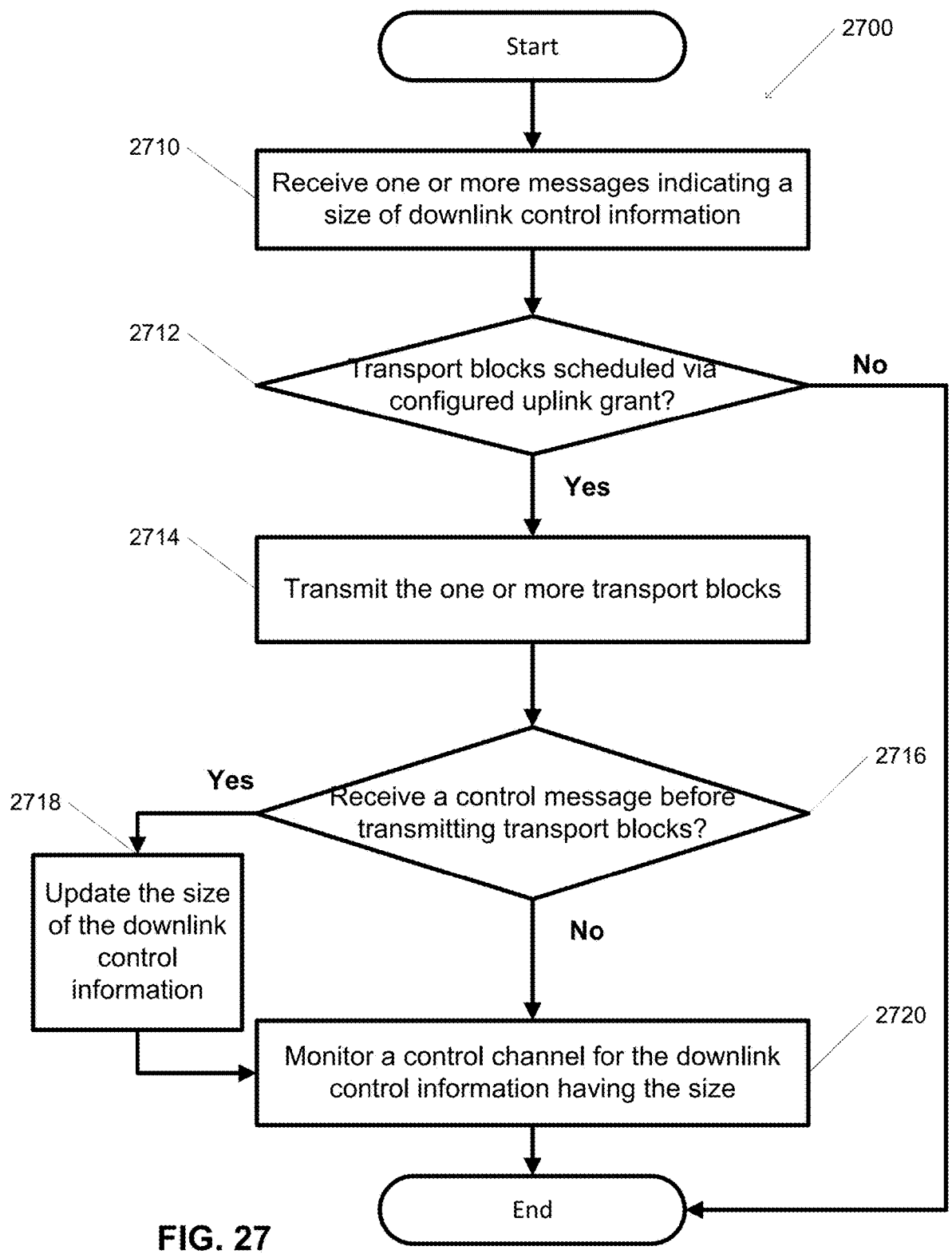
FIG. 27 is an example HARQ feedback procedure for a downlink channel.

FIG. 27 is an example HARQ feedback procedure for a downlink channel. Example 2700 includes a wireless device receiving (2710) one or more messages indicating the size of a DCI. If transport blocks are scheduled (2712) via a configured UL grant, one or more transport blocks can be transmitted (2714). If a control message is received (2716) before transmitting the transport blocks, the size of the DCI can be updated (2718). The wireless device can monitor (2720) a control channel for the DCI having the particular size.

Figure 28:
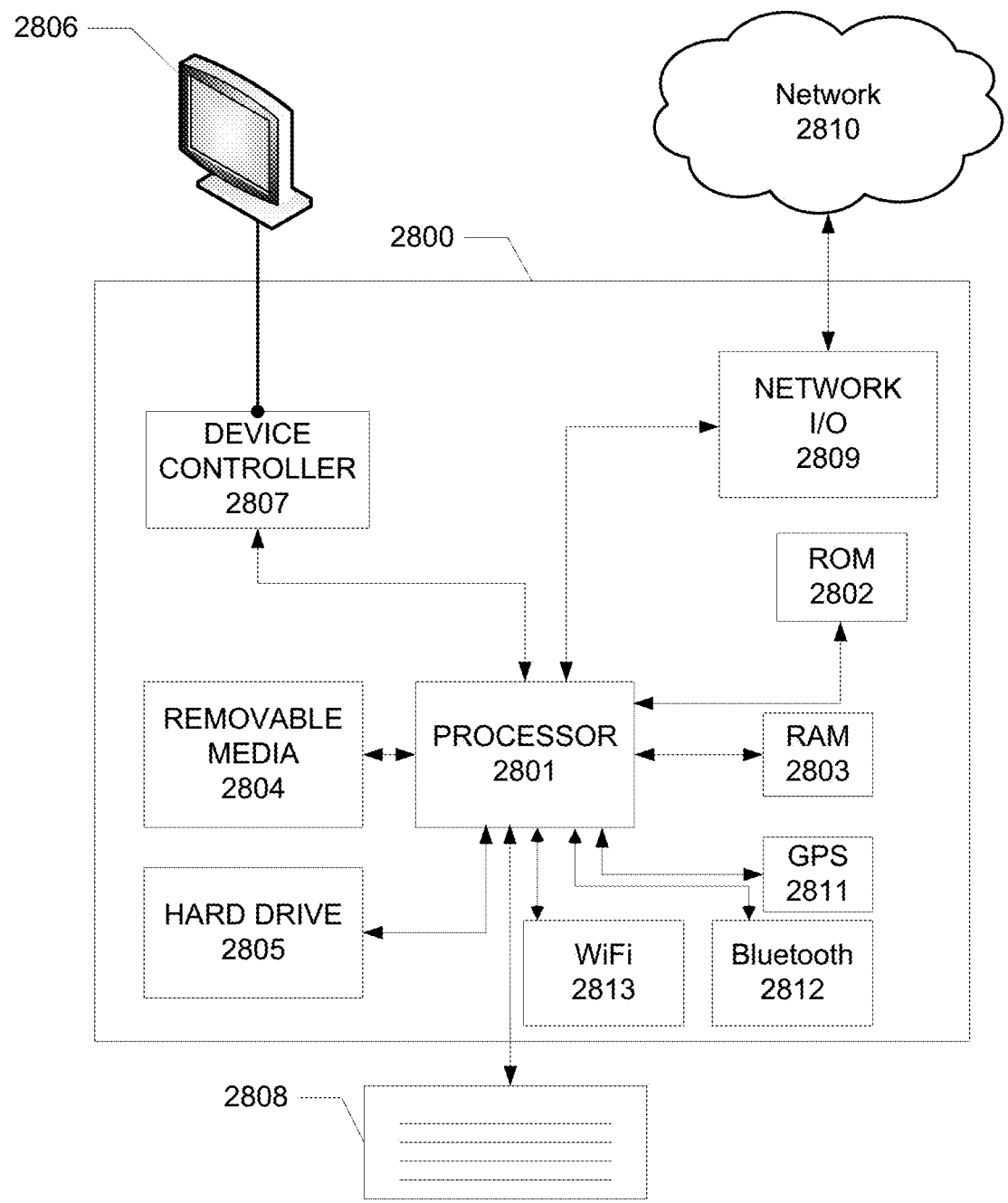
FIG. 28 shows example elements of a computing device that may be used to implement any of the various devices described herein.

FIG. 28 shows general hardware elements that may be used to implement any of the various computing devices discussed herein, including, e.g., the base station 401, the wireless device 406, or any other base station, wireless device, or computing device described herein. The computing device 2800 may include one or more processors 2801, which may execute instructions stored in the random access memory (RAM) 2803, the removable media 2804 (such as a Universal Serial Bus (USB) drive, compact disk (CD) or digital versatile disk (DVD), or floppy disk drive), or any other desired storage medium. Instructions may also be stored in an attached (or internal) hard drive 2805. The computing device 2800 may also include a security processor (not shown), which may execute instructions of one or more computer programs to monitor the processes executing on the processor 2801 and any process that requests access to any hardware and/or software components of the computing device 2800 (e.g., ROM 2802, RAM 2803, the removable media 2804, the hard drive 2805, the device controller 2807, a network interface 2809, a GPS 2811, a Bluetooth interface 2812, a WiFi interface 2813, etc.). The computing device 2800 may include one or more output devices, such as the display 2806 (e.g., a screen, a display device, a monitor, a television, etc.), and may include one or more output device controllers 2807, such as a video processor. There may also be one or more user input devices 2808, such as a remote control, keyboard, mouse, touch screen, microphone, etc. The computing device 2800 may also include one or more network interfaces, such as a network interface 2809, which may be a wired interface, a wireless interface, or a combination of the two. The network interface 2809 may provide an interface for the computing device 2800 to communicate with a network 2810 (e.g., a RAN, or any other network). The network interface 2809 may include a modem (e.g., a cable modem), and the external network 2810 may include communication links, an external network, an in-home network, a provider's wireless, coaxial, fiber, or hybrid fiber/coaxial distribution system (e.g., a DOCSIS network), or any other desired network. Additionally, the computing device 2800 may include a location-detecting device, such as a global positioning system (GPS) microprocessor 2811, which may be configured to receive and process global positioning signals and determine, with possible assistance from an external server and antenna, a geographic position of the computing device 2800.

The example in FIG. 28 is a hardware configuration, although the components shown may be implemented as software as well. Modifications may be made to add, remove, combine, divide, etc. components of the computing device 2800 as desired. Additionally, the components may be implemented using basic computing devices and components, and the same components (e.g., processor 2801, ROM storage 2802, display 2806, etc.) may be used to implement any of the other computing devices and components described herein. For example, the various components described herein may be implemented using computing devices having components such as a processor executing computer-executable instructions stored on a computer-readable medium, as shown in FIG. 28. Some or all of the entities described herein may be software based, and may co-exist in a common physical platform (e.g., a requesting entity may be a separate software process and program from a dependent entity, both of which may be executed as software on a common computing device).

One or more features of the disclosure may be implemented in a computer-usable data and/or computer-executable instructions, such as in one or more program modules, executed by one or more computers or other devices. Generally, program modules include routines, programs, objects, components, data structures, etc. that perform particular tasks or implement particular abstract data types when executed by a processor in a computer or other data processing device. The computer executable instructions may be stored on one or more computer readable media such as a hard disk, optical disk, removable storage media, solid state memory, RAM, etc. The functionality of the program modules may be combined or distributed as desired. The functionality may be implemented in whole or in part in firmware or hardware equivalents such as integrated circuits, field programmable gate arrays (FPGA), and the like. Particular data structures may be used to more effectively implement one or more features of the disclosure, and such data structures are contemplated within the scope of computer executable instructions and computer-usable data described herein.

Many of the elements in examples may be implemented as modules. A module may be an isolatable element that performs a defined function and has a defined interface to other elements. The modules may be implemented in hardware, software in combination with hardware, firmware, wetware (i.e., hardware with a biological element) or a combination thereof, all of which may be behaviorally equivalent. For example, modules may be implemented as a software routine written in a computer language configured to be executed by a hardware machine (such as C, C++, Fortran, Java, Basic, Matlab or the like) or a modeling/simulation program such as Simulink, Stateflow, GNU Octave, or LabVIEWMathScript. Additionally or alternatively, it may be possible to implement modules using physical hardware that incorporates discrete or programmable analog, digital and/or quantum hardware. Examples of programmable hardware may comprise: computers, microcontrollers, microprocessors, application-specific integrated circuits (ASICs); field programmable gate arrays (FPGAs); and complex programmable logic devices (CPLDs). Computers, microcontrollers, and microprocessors may be programmed using languages such as assembly, C, C++ or the like. FPGAs, ASICs, and CPLDs may be programmed using hardware description languages (HDL), such as VHSIC hardware description language (VHDL) or Verilog, which may configure connections between internal hardware modules with lesser functionality on a programmable device. The above mentioned technologies may be used in combination to achieve the result of a functional module.

A non-transitory tangible computer readable media may comprise instructions executable by one or more processors configured to cause operations of multi-carrier communications described herein. An article of manufacture may comprise a non-transitory tangible computer readable machine-accessible medium having instructions encoded thereon for enabling programmable hardware to cause a device (e.g., a wireless device, wireless communicator, a UE, a base station, and the like) to enable operation of multi-carrier communications described herein. The device, or one or more devices such as in a system, may include one or more processors, memory, interfaces, and/or the like. Other examples may comprise communication networks comprising devices such as base stations, wireless devices or user equipment (UE), servers, switches, antennas, and/or the like. A network may comprise any wireless technology, including but not limited to, cellular, wireless, WiFi, 4G, 5G, any generation of 3GPP or other cellular standard or recommendation, wireless local area networks, wireless personal area networks, wireless ad hoc networks, wireless metropolitan area networks, wireless wide area networks, global area networks, space networks, and any other network using wireless communications. Any device (e.g., a wireless device, a base station, or any other device) or combination of devices may be used to perform any combination of one or more of steps described herein, including, e.g., any complementary step or steps of one or more of the above steps.

Although examples are described above, features and/or steps of those examples may be combined, divided, omitted, rearranged, revised, and/or augmented in any desired manner. Various alterations, modifications, and improvements will readily occur to those skilled in the art. Such alterations, modifications, and improvements are intended to be part of this description, though not expressly stated herein, and are intended to be within the spirit and scope of the disclosure. Accordingly, the foregoing description is by way of example only, and is not limiting.

What is claimed is:

1. A method comprising:
receiving, by a base station from one or more wireless devices via first radio resources indicated by one or more first configured uplink grants, one or more first transport blocks;
determining, based on a quantity of the one or more first transport blocks, a size of downlink control information (DCI);
transmitting, to a wireless device of the one or more wireless devices, a control message comprising an indication of the determined size of the DCI;
receiving, from the wireless device via one or more second radio resources indicated by a second configured uplink grant, one or more second transport blocks; and
transmitting, to the wireless device, DCI having the determined size, wherein the DCI comprises at least one field indicating an acknowledgement associated with the one or more second transport blocks.

2. The method of claim 1, wherein the control message comprises one or more radio resource control messages indicating an identifier of the DCI.

3. The method of claim 2, further comprising determining, based on an index of the wireless device, a position of the at least one field indicating the acknowledgement, wherein the one or more radio resource control messages comprise the index.

4. The method of claim 2, wherein the one or more radio resource control messages comprise:
a periodicity of the second configured uplink grant; and
an offset of a resource of the one or more second radio resources, wherein the offset is with respect to a first system frame number.

5. The method of claim 1, wherein the at least one field indicating the acknowledgement comprises a hybrid automatic repeat request (HARQ) process number associated with the one or more second transport blocks.

6. The method of claim 1, further comprising:
generating, based on the determined size of the DCI being insufficient to indicate an acknowledgement of a portion of the one or more second transport blocks, second DCI comprising at least one field indicating an acknowledgement associated with the portion of the one or more second transport blocks; and
transmitting, by the base station to the wireless device, the second DCI.

7. The method of claim 1, further comprising:
based on the receiving the one or more second transport blocks, starting a timer, wherein transmitting the DCI occurs before an expiration of the timer.

8. A method comprising:
receiving, by a base station from a plurality of wireless devices via first radio resources indicated by one or more first configured uplink grants, one or more first transport blocks;
determining, based on a quantity of the one or more first transport blocks, a size of group common downlink control information (DCI);
transmitting, to the plurality of wireless devices, a control message comprising an indication of the determined size of the group common DCI;
receiving, from the plurality of wireless devices via one or more second radio resources indicated by a second configured uplink grant, one or more second transport blocks; and
transmitting, to the plurality of wireless devices, group common DCI having the determined size, wherein the group common DCI comprises at least one field indicating hybrid automatic repeat request (HARQ) feedback associated with the one or more second transport blocks.

9. The method of claim 8, wherein the control message comprises one or more radio resource control messages comprising an identifier of the group common DCI.

10. The method of claim 9, further comprising determining, based on an index of a wireless device of the plurality of wireless devices, a position of the at least one field indicating HARQ feedback in the group common DCI.

11. The method of claim 10, wherein the one or more radio resource control messages comprise the index.

12. The method of claim 9, wherein the one or more radio resource control messages comprise:
a periodicity of the second configured uplink grant; and
an offset, with respect to a first system frame number, of a resource of the one or more second radio resources.

13. The method of claim 8, further comprising:
generating, based on the determined size of the group common DCI being insufficient to indicate the HARQ feedback of a portion of the one or more second transport blocks, second group common DCI comprising at least one field indicating HARQ feedback associated with the portion of the one or more second transport blocks; and
transmitting, to a wireless device of the plurality of wireless devices, the second group common DCI.

14. The method of claim 8, further comprising:
based on receiving the one or more second transport blocks, starting a timer, wherein transmitting the group common DCI occurs before an expiration of the timer.

15. A method comprising:
transmitting, by a wireless device to a base station via first radio resources indicated by one or more first configured uplink grants, one or more first transport blocks;

receiving, from the base station, a control message comprising an indication of a size of downlink control information (DCI);

transmitting, to the base station via one or more second radio resources indicated by a second configured uplink grant, one or more second transport blocks; and receiving, from the base station, DCI having the size indicated by the control message, wherein the DCI comprises:
   an identifier indicating the wireless device; and
   a field indicating an acknowledgement associated with the one or more second transport blocks.

16. The method of claim 15, wherein the control message comprises one or more radio resource control messages indicating an identifier of the DCI.

17. The method of claim 16, wherein the one or more radio resource control messages comprise at least one of:
   a periodicity of the second configured uplink grant; or
   an offset of a resource of the one or more second radio resources, wherein the offset is with respect to a first system frame number.

18. The method of claim 15, further comprising:
monitoring a control channel for the DCI having the size indicated by the control message.

19. The method of claim 15, further comprising:
starting, based on the transmitting of the one or more second transport blocks, a timer.

20. The method of claim 15, wherein the field indicating the acknowledgement further indicates a hybrid automatic repeat request (HARQ) process number.

21. A method comprising:
transmitting, by a wireless device to a base station via first radio resources indicated by one or more first configured uplink grants, one or more first transport blocks;

receiving, from the base station, a control message comprising an indication of a size of group common downlink control information (DCI);

transmitting, to the base station via one or more second radio resources indicated by a second configured uplink grant, one or more second transport blocks; and receiving, from the base station, group common DCI having the size indicated by the control message, wherein the group common DCI comprises:
   an identifier indicating the wireless device; and
   a field indicating hybrid automatic repeat request (HARQ) feedback.

22. The method of claim 21, further comprising:
receiving one or more radio resource control messages comprising an identifier of the group common DCI.

23. The method of claim 22, wherein the one or more radio resource control messages further comprise at least one of:
   an index of the wireless device;
   a periodicity of the second configured uplink grant; or
   an offset, with respect to a first system frame number, of a resource of the one or more second radio resources.

24. The method of claim 21, further comprising:
monitoring a control channel for the group common DCI having the size indicated by the control message.

25. The method of claim 21, further comprising:
starting, based on the transmitting of the one or more second transport blocks, a timer.

26. The method of claim 21, wherein the field indicating the HARQ feedback comprises a HARQ process number.

* * * * *